(12) United States Patent
Chiffey et al.

(10) Patent No.: US 12,296,319 B2
(45) Date of Patent: May 13, 2025

(54) COMPOSITE, ZONED OXIDATION CATALYS FOR A COMPRESSION IGNITION INTERNAL COMBUSTION ENGINE

(71) Applicant: JOHNSON MATTHEY PUBLIC LIMITED COMPANY, London (GB)

(72) Inventors: Andrew Chiffey, Royston (GB); Kieran Cole, Rosyton (GB); Oliver Cooper, Royston (GB); Christopher Daly, Royston (GB); Lee Gilbert, Royston (GB); Robert Hanley, Royston (GB); David Micallef, Royston (GB); Francois Moreau, Royston (GB); Paul Phillips, Royston (GB); George Platt, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 18/493,835

(22) Filed: Oct. 25, 2023

(65) Prior Publication Data
US 2024/0091745 A1    Mar. 21, 2024

Related U.S. Application Data

(63) Continuation of application No. 17/594,694, filed as application No. PCT/EP2020/068165 on Jun. 26, 2020, now Pat. No. 11,845,064.

(30) Foreign Application Priority Data

Jun. 26, 2019 (EP) .................................. 19182733
Oct. 16, 2019 (GB) .................................. 1914958
Mar. 31, 2020 (GB) .................................. 2004768

(51) Int. Cl.
*B01J 21/04* (2006.01)
*B01D 53/94* (2006.01)
(Continued)

(52) U.S. Cl.
CPC ............... *B01J 23/44* (2013.01); *B01J 21/08* (2013.01); *B01J 23/42* (2013.01); *B01J 37/0215* (2013.01);
(Continued)

(58) Field of Classification Search
CPC ... B01J 21/04; B01J 21/08; B01J 21/12; B01J 23/02; B01J 23/42; B01J 23/44;
(Continued)

(56) References Cited

U.S. PATENT DOCUMENTS 7,749,472 B2    7/2010  Chen
7,998,424 B2    8/2011  Bergeal et al.
(Continued)

FOREIGN PATENT DOCUMENTS

CN    101421019 A    4/2009
CN    105283241 A    1/2016
(Continued)

OTHER PUBLICATIONS

Chris Ruehl et al., Environ. Sci. Technol., 2018, 52, 5868-5874 "Emissions During and Real-world Frequency of Heavy-duty Diesel Particulate Filter Regeneration".

*Primary Examiner* — Cam N. Nguyen
(74) *Attorney, Agent, or Firm* — BakerHostetler

(57) ABSTRACT

A composite oxidation catalyst for use in an exhaust system for treating an exhaust gas produced by a vehicular compression ignition internal combustion engine is disclosed. The composite oxidation catalyst comprises a honeycomb flow-through substrate monolith and two catalyst washcoat zones arranged axially in series on and along the substrate surface.

20 Claims, 5 Drawing Sheets

(51) Int. Cl.

| | |
|---|---|
| *B01J 21/08* | (2006.01) |
| *B01J 23/02* | (2006.01) |
| *B01J 23/42* | (2006.01) |
| *B01J 23/44* | (2006.01) |
| *B01J 23/46* | (2006.01) |
| *B01J 23/58* | (2006.01) |
| *B01J 37/02* | (2006.01) |
| *F01N 3/02* | (2006.01) |
| *F01N 3/023* | (2006.01) |
| *F01N 3/10* | (2006.01) |

(52) U.S. Cl.
CPC ............. *F01N 3/0231* (2013.01); *F01N 3/10* (2013.01); *F01N 2570/10* (2013.01); *F01N 2570/12* (2013.01); *F01N 2570/14* (2013.01)

(58) Field of Classification Search
CPC ......... B01J 23/46; B01J 23/58; F01N 3/0231; F01N 3/10; B01D 53/944; B01D 53/945
USPC ........ 502/258–262, 332–334, 339, 355, 415, 502/439
See application file for complete search history.

(56) References Cited

U.S. PATENT DOCUMENTS

| | | | |
|---|---|---|---|
| 8,540,952 B2 | 9/2013 | Swallow | |
| 8,652,429 B2 | 2/2014 | Sumiya | |
| 8,667,785 B2 | 3/2014 | Blakeman | |
| 8,668,891 B2* | 3/2014 | Blakeman | F01N 13/02 60/299 |
| 9,005,559 B2 | 4/2015 | Sumiya | |
| 9,034,286 B2 | 5/2015 | Bergeal | |
| 9,046,022 B2* | 6/2015 | Blakeman | B01J 23/44 |
| 9,259,684 B2 | 2/2016 | Blakeman | |
| 9,333,461 B2* | 5/2016 | Castagnola | B01J 23/42 |
| 9,333,490 B2 | 5/2016 | Kazi | |
| 9,341,098 B2 | 5/2016 | Cole et al. | |
| 9,366,166 B2 | 6/2016 | Blakeman | |
| 9,527,034 B2 | 12/2016 | Bergeal | |
| 9,527,035 B2 | 12/2016 | Bergeal | |
| 9,597,661 B2 | 3/2017 | Blakeman | |
| 9,611,773 B2 | 4/2017 | Brown | |
| 9,636,634 B2 | 5/2017 | Chiffey et al. | |
| 9,643,161 B2 | 5/2017 | Chiffey | |
| 9,707,542 B2 | 7/2017 | Bergeal | |
| 9,737,852 B2 | 8/2017 | Massner et al. | |
| 9,764,310 B2 | 9/2017 | Markatou | |
| 9,849,423 B2 | 12/2017 | Chiffey | |
| 9,868,115 B2* | 1/2018 | Sumiya | B01J 29/7007 |
| 9,987,618 B2 | 6/2018 | Chiffey | |
| 9,993,771 B2* | 6/2018 | Voss | B01D 53/944 |
| 10,105,692 B2 | 10/2018 | Andersen et al. | |
| 10,155,197 B2 | 12/2018 | Cole | |
| 10,201,807 B2 | 2/2019 | Larsson et al. | |
| 10,207,254 B2* | 2/2019 | Blakeman | B01J 23/63 |
| 10,240,500 B2 | 3/2019 | Chiffey | |
| 10,286,359 B2 | 5/2019 | Chiffey | |
| 10,328,388 B2 | 6/2019 | Dumbuya | |
| 10,376,867 B2* | 8/2019 | Blakeman | B01J 35/19 |
| 10,449,518 B2 | 10/2019 | Markatou | |
| 10,569,257 B2 | 2/2020 | Chiffey | |
| 10,625,208 B2* | 4/2020 | Bergeal | B01D 53/922 |
| 10,688,475 B2 | 6/2020 | Blakeman | |
| 10,767,528 B2* | 9/2020 | Hengst | F01N 3/035 |
| 10,773,251 B2 | 9/2020 | Blakeman | |
| 10,801,384 B2 | 10/2020 | Hengst | |
| 10,807,081 B2 | 10/2020 | Larsson | |
| 10,821,401 B2 | 11/2020 | Chiffey | |
| 10,843,171 B2 | 11/2020 | Markatou | |
| 10,864,502 B2 | 12/2020 | Sung | |
| 11,052,378 B2 | 7/2021 | Hengst | |
| 11,103,855 B2 | 8/2021 | Chiffey | |
| 11,161,098 B2 | 11/2021 | Nunan et al. | |
| 11,167,246 B2 | 11/2021 | Chiffey | |
| 11,338,245 B2 | 5/2022 | Chiffey | |
| 11,344,845 B2* | 5/2022 | Voss | B01D 53/944 |
| 11,439,987 B2 | 9/2022 | Ji | |
| 11,845,064 B2* | 12/2023 | Chiffey | F01N 3/28 |
| 12,023,627 B2* | 7/2024 | Voss | F01N 3/0231 |
| 2005/0069476 A1 | 3/2005 | Blakeman | |
| 2005/0227867 A1 | 10/2005 | Chen | |
| 2006/0251549 A1 | 11/2006 | Kumar et al. | |
| 2008/0038172 A1 | 2/2008 | Chen et al. | |
| 2008/0045405 A1 | 2/2008 | Beutel et al. | |
| 2009/0217652 A1 | 9/2009 | Bergeal | |
| 2009/0288402 A1 | 11/2009 | Voss | |
| 2009/0317686 A1 | 12/2009 | Huston | |
| 2010/0172814 A1 | 7/2010 | Bull et al. | |
| 2011/0286900 A1 | 11/2011 | Caudle et al. | |
| 2014/0186244 A1 | 7/2014 | Blakeman et al. | |
| 2014/0271429 A1 | 9/2014 | Kazi et al. | |
| 2015/0033715 A1 | 2/2015 | Markatou | |
| 2015/0071839 A1 | 3/2015 | Massner | |
| 2015/0165423 A1 | 6/2015 | Sung et al. | |
| 2015/0202572 A1 | 7/2015 | Chiffey et al. | |
| 2015/0202611 A1 | 7/2015 | Chiffey | |
| 2015/0273452 A1 | 10/2015 | Chiffey et al. | |
| 2017/0007987 A1 | 1/2017 | Han et al. | |
| 2017/0043322 A1* | 2/2017 | Chandler | B01J 35/19 |
| 2017/0189854 A1 | 7/2017 | Andersen et al. | |
| 2017/0216770 A1 | 8/2017 | Chiffey | |
| 2018/0065083 A1 | 3/2018 | Bidal | |
| 2018/0065084 A1 | 3/2018 | Chiffey | |
| 2018/0065086 A1 | 3/2018 | Bidal | |
| 2018/0104677 A1 | 4/2018 | Blakeman | |
| 2018/0214824 A1 | 8/2018 | Dumbuya | |
| 2018/0280877 A1 | 10/2018 | Chen et al. | |
| 2019/0201844 A1 | 7/2019 | Hayama | |
| 2019/0217278 A1 | 7/2019 | Chiffey | |
| 2019/0262772 A1 | 8/2019 | Chiffey | |
| 2019/0308173 A1 | 10/2019 | Markatou et al. | |
| 2019/0383184 A1 | 12/2019 | Dumbuya et al. | |
| 2020/0206721 A1 | 7/2020 | Chiffey | |
| 2023/0104565 A1* | 4/2023 | Chiffey | B01D 53/944 422/171 |
| 2023/0211323 A1* | 7/2023 | Chiffey | F01N 3/106 422/180 |
| 2023/0278018 A1* | 9/2023 | Chiffey | B01J 23/10 |
| 2024/0307822 A1* | 9/2024 | Voss | B01D 53/944 |

FOREIGN PATENT DOCUMENTS

| | | |
|---|---|---|
| CN | 105934274 A | 9/2016 |
| CN | 105188930 B | 4/2018 |
| CN | 109894113 A | 6/2019 |
| CN | 108138624 B | 6/2021 |
| DE | 102016123120 A1 | 6/2017 |
| EP | 2105197 A1 | 9/2009 |
| EP | 2431094 A4 | 11/2012 |
| EP | 1775788 B1 | 5/2013 |
| EP | 2051799 B1 | 1/2016 |
| EP | 3170553 A3 | 5/2017 |
| EP | 2922630 B1 | 8/2018 |
| EP | 3356659 A1 | 8/2018 |
| EP | 2651540 B1 | 5/2019 |
| EP | 3328541 B1 | 6/2021 |
| EP | 3865209 A1 | 8/2021 |
| EP | 3888774 A1 | 10/2021 |
| GB | 2604801 A | 9/2022 |
| JP | 2005-530614 A | 10/2005 |
| JP | 2009522094 B2 | 6/2009 |
| JP | 2010500922 A | 1/2010 |
| JP | 2011000502 A | 1/2011 |
| JP | 2013146706 A | 8/2013 |
| JP | 2015501719 B2 | 1/2015 |
| JP | 2015-516534 A | 6/2015 |
| JP | 2016513584 A | 5/2016 |
| JP | 2016531737 A | 10/2016 |
| JP | 2017508606 A | 3/2017 |
| KR | 10-2008-0081031 A | 9/2008 |
| RU | 2650522 C2 | 4/2018 |
| RU | 2668272 C2 | 9/2018 |

(56) References Cited

FOREIGN PATENT DOCUMENTS

| | | | |
|---|---|---|---|
| RU | 2685426 | C1 | 4/2019 |
| WO | 0180342 | A1 | 10/2001 |
| WO | 2004002611 | A1 | 1/2004 |
| WO | 2007077462 | A1 | 7/2007 |
| WO | 2008022160 | A1 | 2/2008 |
| WO | 2012079598 | A1 | 6/2012 |
| WO | 2014151677 | A1 | 9/2014 |
| WO | 2015095058 | A1 | 6/2015 |
| WO | 2015110818 | A1 | 7/2015 |
| WO | 2015118323 | A1 | 8/2015 |
| WO | 2017055857 | A1 | 4/2017 |
| WO | 2018216817 | A1 | 11/2018 |

\* cited by examiner

COMPOSITE, ZONED OXIDATION CATALYS FOR A COMPRESSION IGNITION INTERNAL COMBUSTION ENGINE

CROSS-REFERENCE TO RELATED APPLICATIONS

The present application is a continuation of U.S. Ser. No. 17/594,694, filed Oct. 26, 2021 (now U.S. Pat. No. 11,845, 064), which is a national stage entry of PCT/EP2020/ 068165, filed Jun. 26, 2020, which claims the benefit of priority to GB 1914958.2, filed Oct. 16, 2019, EP 19182733.6, filed Jun. 26, 2019, and GB 2004768.4, filed Mar. 31, 2020, the entire contents of each of which are incorporated herein by reference.

FIELD OF THE INVENTION

The invention relates to a composite, zoned oxidation catalyst for use in an exhaust system for treating an exhaust gas produced by a vehicular compression ignition internal combustion engine, preferably for a heavy-duty diesel vehicle, and upstream of a particulate matter filter in the exhaust system. The invention further relates to an exhaust system, or a vehicle, comprising the composite, zoned oxidation catalyst. The invention also relates to the use of a composite, zoned oxidation catalyst for generating an exotherm for regenerating a downstream particulate matter filter; and a method for preparing the composite, zoned oxidation catalyst.

BACKGROUND TO THE INVENTION

Combustion engines produce exhaust gases that contain pollutants, such as carbon monoxide (CO), unburned hydrocarbons (HCs), oxides of nitrogen ($NO_x$) and particulate matter (PM). Emissions standards for pollutants in an exhaust gas produced by a combustion engine, particularly for vehicular engines, are becoming increasingly stringent. There is a need to provide improved catalysts and exhaust systems for treating and removing the pollutants in such exhaust gases that can meet these standards and which are cost-effective.

The exhaust gas from gasoline and diesel engines is commonly treated with a catalyst that can oxidise (i) carbon monoxide (CO) to carbon dioxide ($CO_2$); and (ii) hydrocarbons (HCs) to water ($H_2O$) and carbon dioxide ($CO_2$). Three-way catalysts (TWCs) are typically employed to treat the exhaust gas from a gasoline engine by reducing oxides of nitrogen ($NO_x$) to nitrogen ($N_2$), water ($H_2O$) and carbon dioxide ($CO_2$) simultaneously with the oxidation reactions (i) and (ii). The exhaust gas from a compression ignition engine, such as a diesel engine, is typically treated with an oxidation catalyst (commonly called a diesel oxidation catalyst (DOC)) that performs oxidation reactions (i) and (ii). Some diesel oxidation catalysts are also able to oxidise nitrogen monoxide (NO) to nitrogen dioxide ($NO_2$), which can aid removal of $NO_x$ using an additional, downstream emissions control device.

Oxidation catalysts for compression ignition internal combustion engines typically contain one or more platinum group metals. The specific platinum group metal(s) selected for inclusion in an oxidation catalyst will depend on a variety of factors, such as reactivity toward specific pollutants and under differing exhaust gas conditions, cost, durability at high temperatures, chemical compatibility with the support material and any other components of the catalyst, and susceptibility to poisoning by impurities. For example, platinum (Pt) and palladium (Pd) are each able to oxidise carbon monoxide (CO) and hydrocarbons (HCs) in an exhaust gas from a compression ignition engine. Palladium is more susceptible to poisoning by sulfur in fuel compared to platinum but has greater thermal durability.

When the internal combustion engine is a compression ignition engine, such as a diesel engine, for providing the motive power to a vehicle, then the vehicle may be a light-duty diesel vehicle or a heavy-duty diesel vehicle.

The term "light-duty diesel vehicle (LDV)" is defined in US or European legislation. In the US, a light-duty diesel vehicle (LDV) refers to a diesel vehicle having a gross weight of ≤3,855.5 kg (≤8,500 pounds (US lbs)).

In Europe, a light-duty diesel vehicle is defined as a vehicle in the categories $M_1$, $M_2$, $N_1$ and $N_2$ with a reference mass of ≤2,610 kg (EU5/6).

In USA, a heavy-duty diesel vehicle (HDV) as defined in legislation, is a diesel vehicle having a gross vehicle weight rating of >3,855.5 kg (>8,500 pounds (US lbs)) in the Federal jurisdiction and above 6,350 kg (14,000 pounds) in California (model year 1995 and later).

In Europe, a heavy-duty diesel vehicle is a vehicle designed and constructed for the carriage of goods and having a maximum mass (i.e. "maximum technically permissible laden mass") of more than 3.5 tonnes (i.e. metric tons) but either not exceeding 12 tonnes ($N_2$ category) or exceeding 12 tonnes ($N_3$ category), i.e. trucks; or a vehicle designed and constructed for the carriage of passengers comprising more than 8 seats in addition to the driver's seat and having a maximum mass either not exceeding 5 tonnes ($M_2$ category); or exceeding 5 tonnes ($M_3$ category), i.e. buses and coaches, according to EU legislation (Council Directive 2007/46/EC). China broadly follows the European definition.

In Japan, an HDV is a heavy commercial vehicle defined as having a gross vehicle weight >7,500 kg.

In Russia and South Korea, the emission standards for heavy-duty vehicles are based on the European standards and so the above definitions for Europe apply.

In Brazil, an HDV is a motor vehicle for the transportation of passengers and/or goods, with a maximum gross vehicle weight higher than 3,856 kg or a vehicle curb weight higher than 2,720 kg.

In India, an HDV is a vehicle of gross vehicle weight >3,500 kg.

Strategies for meeting current emissions standards for heavy-duty diesel engines typically adopt an exhaust system architecture comprising a series of catalysed substrates and injectors. In order, from upstream to downstream (upstream being relative to an engine connected or connectable to the exhaust system), the exhaust system comprises a hydrocarbon fuel injector, a diesel oxidation catalyst (DOC), a catalysed soot filter (CSF, i.e. a catalysed diesel particulate filter (DPF)), a urea (ammonia precursor) injector, one or more selective catalytic reduction (SCR) catalyst and an ammonia slip (ASC) catalyst, also known as an ammonia oxidation (AMOX).

The function of the DOC during normal operation is to control CO and HC emissions, to promote the conversion of NO to $NO_2$ for downstream passive filter regeneration (the combustion of particulate matter held on a filter in $NO_2$ at lower exhaust gas temperatures than in $O_2$ in the exhaust gas, i.e. the so-called CRT® effect), as well as acting as an exotherm generation catalyst during active CSF regeneration performed via injection of hydrocarbon fuel into exhaust gas. For the avoidance of doubt, the fuel injection/ exotherm generation event does not take place during normal operation: normal operation is considered to be the period between fuel injection/exotherm generation events (see the C. Ruehl et al paper discussed hereinbelow). The CSF controls particulate matter (PM) emissions and promotes the NO→NO$_2$ conversion to enhance the SCR performance. Urea, a precursor of ammonia, is injected downstream of the CSF and mixed with the exhaust gas. NOx is converted over the SCR catalyst(s) via reaction with ammonia (NH$_3$), and the unreacted NH$_3$ is oxidized over the ammonia slip catalyst (ASC).

SCR catalysts are designed to catalyse the reduction of NO$_x$ selectively using a nitrogenous reductant, typically NH$_3$ which may be derived from an ammonia precursor such as urea, which reductant is injected into a flowing exhaust gas upstream from the SCR catalyst in an amount to promote the principal NOx reduction reactions of:

$$4NH_3+4NO+O_2 \rightarrow 4N_2+6H_2O; \tag{1}$$

$$4NH_3+2NO_2+O_2 \rightarrow 3N_2+6H_2O; \text{ and} \tag{2}$$

$$NO+NO_2+2NH_3 \rightarrow 2N_2+3/2H_2O \text{(the preferred, so-called "fast SCR reaction")}. \tag{3}$$

It will be understood that each of reactions (1)-(3) can occur in parallel, but the kinetically fastest reaction will be favoured. Therefore, in an exhaust gas containing a NO$_2$:NO$_x$ ratio of 0.5, the kinetically favoured fast SCR reaction dominates. For most, but not all, applications, some level of exhaust gas recirculation (EGR) is used to reduce engine-out NOx to a level that could then be reduced further by urea-SCR aftertreatment. A DPF is needed to reduce the increased engine-out PM emissions that occur due to the use of EGR, as well as to ensure compliance with the Euro VI particulate number emission limit. Using high efficiency SCR, some Euro VI engines can reduce the use of EGR—for instance through part-time and/or uncooled EGR—or to eliminate EGR entirely. This has led to three main Euro VI engine strategies:

1. Cooled EGR+SCR,
2. Hot (uncooled) EGR+SCR, and
3. SCR only.

Using these strategies, typical heavy-duty engine-out emissions are about 60 ppm CO and about 10 ppm unburned hydrocarbon fuel. However, all such systems include diesel particulate filters. Diesel particulate matter filter systems for vehicles involve the interaction of filter materials with regeneration techniques. "Regeneration" is the selected method of combusting diesel particulate matter held on a filter. Regeneration is conducted infrequently, but the period between regeneration events is dependent on several factors including engine design, filtration efficiency during normal operation, engine load during normal operation etc. According to a recent paper, empiric regeneration frequencies for heavy-duty diesel trucks varied from 3-100 hours and 23-4078 miles (see C. Ruehl et al, Environ. Sci. Technol, 2018, 52(10), pp 5868-5874).

Regeneration techniques can be broadly divided into the categories of passive, active and combinations of both passive and active. In passive systems, the oxidation temperature of the particulate matter is lowered to a level where the filter can be auto-regenerated during regular vehicle operation. Examples of such passive systems include catalysing the filter medium; addition of a catalyst fuel additive so that the particulate matter on the filter includes in its composition catalyst for promoting soot combustion; and generating nitrogen dioxide (NO$_2$) upstream of the filter for combusting the particulate matter held on the filter: particulate matter combusts in NO$_2$ at lower temperatures than in oxygen. This is the so-called CRT® effect (see e.g. EP0341832).

Active systems actively trigger filter regeneration by raising the temperature of particulate matter trapped in the filter. In practice, this can be done on a vehicle by combusting hydrocarbon fuel already carried on the vehicle and/or by electric heating. Two methods for combusting fuel include in-cylinder engine management methods, such as late-cycle injection of additional fuel; or injection and combustion of fuel in the exhaust gas, i.e. after the exhaust gas has exited the engine cylinder itself.

In passive-active systems, the "passive" filter catalyst or upstream (CRT® effect-promoting) NO oxidation catalyst etc. allows active regeneration to be performed at lower exhaust gas temperatures and/or for shorter durations compared to non-catalytic active systems. In either case, the fuel economy penalty associated with active regeneration can be minimized (at an added cost of the catalyst). Regeneration at a lower temperature can also lower thermal stress and increase the lifespan of the filter.

The present invention relates to active regeneration systems or active-passive regeneration systems.

Applicant's WO 2013/088152 A1 discloses a catalytic aftertreatment system for a diesel engine exhaust gas, which system comprising a diesel oxidation catalyst (DOC) and an aftertreatment device located downstream of the DOC, which aftertreatment device requires periodic heat treatment, and means to generate a temperature increase within the aftertreatment device, said DOC comprising an upstream zone of length from 12.7-50.81 mm (0.5 to 2 inches) of higher oxidation activity for hydrocarbons (HC) than the remainder of the DOC. The disclosure explains that during active regeneration of a filter, an exotherm generated while an initially "lit-off" upstream DOC is being contacted with injected hydrocarbon fuel may surprisingly become extinguished even while the DOC is being contacted with the injected hydrocarbon fuel.

US patent application publication no. US 2014/0271429 A1 discloses an oxidation catalyst composite including a zone coated diesel oxidation catalyst on a substrate with a first washcoat zone adjacent the substrate inlet end of the substrate with a Pt/Pd ratio that is less than 3:1 and a PGM loading at least twice that of a second washcoat zone, which is adjacent the outlet end of the substrate, wherein the first washcoat zone has a length that is shorter than the second washcoat zone.

US patent application publication no. US 2009/288402 discloses a zoned diesel oxidation catalyst containing a higher precious metal loading in the inlet zone that the outlet zone and an equal or shorter length inlet zone are described.

EP 2000639 A1 discloses a method in which the range of temperatures at which a high-concentration hydrocarbon can be burned is said to be widened or a high-temperature gas is more rapidly supplied to a later-stage catalyst. The method for purifying an exhaust gas discharged from an internal combustion engine comprises using a catalyst for increasing the temperature of the exhaust gas to purify the exhaust gas, and is characterized in that a hydrocarbon is introduced in an amount of 1,000-40,000 vol·ppm, in terms of methane amount, of the exhaust gas into an exhaust-gas passageway of the internal combustion engine on the upstream side of the temperature increase catalyst in the flow of the exhaust gas. That is, if a diesel fuel hydrocarbon compound is a chain of 16 carbon atoms, according to the definition used in EP '639 A1, this hydrocarbon chain represents 16 times the quantity of methane ($CH_4$).

The catalyst in EP '639 A1 is obtained by supporting a catalytically active component (A) consisting of (a) platinum, (b) an oxide of at least one metal selected from the group consisting of magnesium, an alkaline earth metal and an alkali metal optionally selected from the group consisting of magnesium, calcium, barium, strontium and potassium, and (c) at least one member selected from the group consisting of palladium and rhodium, on refractory inorganic oxide powder (B), and supporting the inorganic oxide powder having the catalytically active component supported thereon, on a refractory three-dimensional structure body.

Applicant's WO 2015/015182 discloses an oxidation catalyst for treating an exhaust gas from a diesel engine comprising: a substrate; a first washcoat region disposed on the substrate, wherein the first washcoat region comprises a first platinum group metal and a first support material; a second washcoat region adjacent to the first washcoat region, wherein the second washcoat region comprises a second platinum group metal and a second support material; a third washcoat region disposed on the substrate, wherein the third washcoat region comprises a third platinum group metal and a third support material; and wherein either: (i) the third washcoat region is adjacent to the second washcoat region; or (ii) the second washcoat region is disposed or supported on the third washcoat region. The first washcoat region may or may not comprise an alkaline earth metal.

Applicant's WO 2014/132034 A1 discloses an oxidation catalyst for treating an exhaust gas produced by a combustion engine, wherein the oxidation catalyst comprises a substrate and a catalyst layer, wherein the catalyst layer comprises: a first support material; a first platinum group metal; and a second platinum group metal; wherein the catalyst layer is disposed on a surface of the substrate, and the catalyst layer has a non-uniform distribution of the first platinum group metal in a direction perpendicular to the surface of the substrate. The oxidation catalyst can be used to oxidise carbon monoxide (CO), hydrocarbons (HCs) and also oxides of nitrogen (NOx) in such an exhaust gas.

WO 2009/076574 discloses an emission treatment system and method for remediating the nitrogen oxides (NOx), particulate matter, and gaseous hydrocarbons present in diesel engine exhaust streams are described. The emission treatment system has an oxidation catalyst upstream of a soot filter upstream from a NOx reducing catalyst. The oxidation catalyst comprises an inlet zone with an axial length and an outlet zone with an axial length, the inlet zone comprising at least one of platinum and palladium in a first loading, the outlet zone comprising palladium in a second loading, the outlet zone comprising substantially no platinum—by which is meant that platinum is not intentionally provided in the zone, but unintentionally less than about 1 wt. % of the metal can comprise platinum—the first loading being greater than the second loading and the axial length of the inlet zone being less than or equal to the axial length of the outlet zone. The diesel oxidation catalyst contains catalyst effective to produce substantially no additional $NO_2$ in the exhaust gas stream after passing through the diesel oxidation catalyst for about 90% of the operating window of the diesel oxidation catalyst.

Applicant's WO 2006/056811 discloses an apparatus comprising a compression ignition engine and an exhaust system therefor comprising at least one exhaust system component for treating exhaust gas and means for generating an exotherm for heating the at least one exhaust system component, which exotherm generating means consisting essentially of a catalyst and means for injecting hydrocarbon into exhaust gas for combustion on the catalyst, which catalyst consisting essentially of both a palladium (Pd) component and a platinum (Pt) component, and an optional support material, disposed on a substrate monolith.

Applicant's WO 2014/080200 discloses an exhaust system for a compression ignition engine comprising an oxidation catalyst for treating carbon monoxide (CO) and hydrocarbons (HCs) in exhaust gas from the compression ignition engine, wherein the oxidation catalyst comprises: a platinum group metal (PGM) component selected from the group consisting of a platinum (Pt) component, a palladium (Pd) component and a combination thereof; an alkaline earth metal component; a support material comprising a modified alumina incorporating a heteroatom component; and a substrate, wherein the platinum group metal (PGM) component, the alkaline earth metal component and the support material are disposed on the substrate. The Examples illustrate testing conducted on light-duty diesel exhaust gas compositions using alkaline earth metal loadings of 3.53 g/L (100 g/ft$^3$).

Applicant's WO 2014/080202 discloses a catalysed soot filter comprising an oxidation catalyst for treating carbon monoxide (CO) and hydrocarbons (HCs) in exhaust gas from a compression ignition engine disposed on a filtering substrate, wherein the oxidation catalyst comprises: a platinum group metal (PGM) component selected from the group consisting of a platinum (Pt) component, a palladium (Pd) component and a combination thereof; an alkaline earth metal component; a support material comprising a modified alumina incorporating a heteroatom component. Example 8 shows that nitrogen monoxide oxidation is affected by the presence of barium oxide in such catalyst formulations.

WO 2010/118125 discloses an oxidation catalyst composite for the oxidation of unburned hydrocarbons (HC), and carbon monoxide (CO) and the reduction of nitrogen oxides (NOx) from a diesel engine comprising at least two washcoat layers, a first washcoat comprising a palladium component and a second washcoat containing platinum and at least about 50% of the total platinum is located in the rear of the catalyst.

Applicant's WO 2015/110818 A1 discloses an oxidation catalyst for treating an exhaust gas from a diesel engine and an exhaust system comprising the oxidation catalyst. The oxidation catalyst comprises: a first washcoat region for oxidising carbon monoxide (CO) and hydrocarbons (HCs), wherein the first washcoat region comprises a first platinum group metal (PGM) and a first support material; a second washcoat region for oxidising nitric oxide (NO), wherein the second washcoat region comprises platinum (Pt), manganese (Mn) and a second support material; and a substrate having an inlet end and an outlet end; wherein the second washcoat region is arranged to contact the exhaust gas at the outlet end of the substrate and after contact of the exhaust gas with the first washcoat region.

Applicant's WO 2017/093720 discloses an oxidation catalyst is described for treating an exhaust gas produced by a diesel engine, wherein the oxidation catalyst comprises: a substrate; a capture material for capturing at least one phosphorus containing impurity and/or at least one sulfur containing impurity in the exhaust gas produced by the diesel engine; and a catalytic region disposed on the substrate; wherein the catalytic region comprises a catalytic material comprising a platinum group metal (PGM) selected from the group consisting of platinum (Pt), palladium (Pd) and a combination of platinum (Pt) and palladium (Pd).

There are believed to be two basic mechanisms where catalysts for treating exhaust gas from internal combustion engines can become poisoned: (i) selective poisoning, in which a contaminant reacts directly with an active site or catalyst support causing a reduction in activity or a catastrophic loss in activity; and (ii) non-selective poisoning, which causes a loss of performance by sterically hindering access to active sites or pores in a catalyst support by fouling (or masking) a surface of the support or active sites. The inventors have found that zinc and (at low temperature) phosphorus (as phosphoric acid droplets) and oil droplets as such (all derived from the fuel or lubricants) are non-selective poisons of the exotherm generation function of the oxidation catalysts of active or active-passive systems disclosed in Applicant's WO 2013/088152 A1. Poisons which chemically react with catalyst components (mechanism (i)) include (at higher temperature) phosphorus, which can also poison the exotherm generation function of the oxidation catalyst. A major source of phosphorus and zinc in exhaust gas is likely to be from the additives zinc dialkyl dithio phosphate (ZDDP), used in mineral-based oils, or in synthetic oil zinc dithiophosphate (ZDTP). These additives are used to protect the moving parts of the engine, such as the camshaft, from wear through use. Heavy-Duty vehicle engine oils have higher concentrations of additives than lubricants for use in light-duty vehicle engines, such as those used in passenger cars, so the problem of zinc and phosphorus deactivation is particularly problematic for Heavy-Duty vehicle engines. Phosphorus and zinc deposits cannot be removed from the catalyst, except under conditions which are likely to cause thermal deactivation of the oxidation catalyst and other catalyst components in the exhaust system (that is, very high operating temperatures). A review of poisons and poisoning mechanisms including phosphorus and zinc can be found, for example, in A. J. J. Wilkins et al., Platinum Metals Review, 1990, 34(1) 16-24.

Platinum group metals as commodities are relatively rare, naturally occurring metallic chemical elements of high economic value relative to industrial base metals, such as copper. Shortly before the filing date of this specification, the spot price on the London Metal Exchange for copper was US$5,463 per tonne, whereas the London Bullion Market Association spot price for platinum was US$28.35 per gram (US$845 per ounce), equivalent to US$29,806,530 per tonne (there are 35,274 ounces in a metric tonne).

However, the corresponding spot price for palladium was US$69.4 per gram (US$1,968 per ounce). That is, by weight, palladium is presently over twice the cost of platinum. There is therefore a general interest in reducing the quantity of palladium in diesel oxidation catalysts relative to platinum and, if possible, to reduce the quantity of platinum group metals in diesel oxidation catalysts by suitable promotion with less costly metallic elements.

The present invention is based on the active or active-passive systems disclosed in Applicant's WO 2013/088152 A1 with the goal of reducing the quantity of total platinum group metal present in the diesel oxidation catalyst in general and more specifically reducing the weight amount of palladium relative to platinum and/or improving the efficiency of the active filter regeneration by using less fuel to achieve a desired filter inlet temperature and/or achieving a higher filter inlet temperature for the same quantity of fuel injected upstream of a prior art oxidation catalyst for generating an exotherm therefrom and/or enabling exotherm generation over the oxidation catalyst from a lower initial exhaust temperature at the oxidation catalyst inlet. Additionally, the inventors have developed a composite oxidation catalyst, i.e. a multifunction catalyst arrangement on a single substrate, wherein one or more of the above goals can be combined with stable $NO_2$ generation for operation of downstream catalyst functions, including the CRT® effect for combustion of particulate matter on a downstream filter and/or promotion of a so-called fast reaction on a selective catalytic reduction (SCR) catalyst. A further advantage of the preferred arrangement is a multifunction catalyst having improved hydrocarbon slip control. In a preferred arrangement, in addition to one or more or all of the abovementioned advantages, a guard bed feature can be incorporated into the composite oxidation catalyst designs to reduce or prevent catalyst poisoning by phosphorus and/or zinc derived from engine lubricant additives thereby substantially maintaining catalyst performance, i.e. durability, over a longer term.

SUMMARY OF THE INVENTION

The inventors have surprisingly found that by combining a by-weight equivalent or preferably platinum-rich platinum and palladium PGM components with an alkaline earth metal component into a catalyst washcoat zone at an inlet end of an oxidation catalyst disposed upstream from a filter substrate in the system of a vehicular compression ignition engine, especially a vehicular heavy-duty diesel engine, one or more of the desired improvements are obtained.

According to a first aspect, the invention provides a composite oxidation catalyst for use in an exhaust system for treating an exhaust gas produced by a vehicular compression ignition internal combustion engine, preferably for a heavy-duty diesel vehicle, and upstream of a particulate matter filter in the exhaust system, which composite oxidation catalyst comprising:

a substrate, optionally a honeycomb flow-through substrate monolith, having a total length L and a longitudinal axis and having a substrate surface extending axially between a first substrate end and a second substrate end; and three or more catalyst washcoat zones arranged axially in series on and along the substrate surface, wherein a first catalyst washcoat zone having a length $L_1$, wherein $L_1<L$, is defined at one end by the first substrate end and at a second end by a first end of a second catalyst washcoat zone having a length $L_2$, wherein $L_2<L$, wherein the first catalyst washcoat zone comprises a first refractory metal oxide support material and two or more platinum group metal components supported thereon comprising both platinum and palladium at a weight ratio of platinum to palladium of $\geq 1$; the second catalyst washcoat zone comprises a second refractory metal oxide support material and one or more platinum group metal components supported thereon; and a third catalyst washcoat zone comprising a third refractory metal oxide support material and one or more platinum group metal components supported thereon is defined at a second end thereof by the second substrate end, wherein a total platinum group metal loading in the first catalyst washcoat zone defined in grams of platinum group metal per litre of substrate volume (g/L) is greater than a total platinum group metal loading in the second catalyst washcoat zone, wherein a total platinum group metal loading in the third catalyst washcoat zone defined in grams of platinum group metal per litre of substrate volume (g/L) is less than the total platinum group metal loading in the second catalyst washcoat zone and wherein the first catalyst washcoat zone comprises one or more first alkaline earth metal components supported on the first refractory metal oxide support material.

The product as claimed can also be labelled with an indication that the first substrate end should be oriented to the upstream side when fitted in any of the second and third invention aspects set out hereinbelow.

It will be understood that the feature that determines the axial length of a catalyst washcoat zone is the platinum group metal loading in grams of platinum group metal per litre of substrate volume (g/L). Typically, a platinum group metal loading at any point along the axial length of a catalyst washcoat zone varies by no more than +/−20% from a mean average along the axial length of the zone as a whole, optionally +/−15% such as 10+/−10%. Localised platinum group metal loading can be determined by X-Ray Fluorescence (XRF) or Electron Probe Micro Analysis (EPMA).

According to a second aspect, the invention provides a compression ignition internal combustion engine for a heavy-duty diesel vehicle comprising an exhaust system, which exhaust system comprising a composite oxidation catalyst according to the first invention aspect and a soot filter substrate disposed downstream from the composite oxidation catalyst, wherein the first substrate end of the composite oxidation catalyst is oriented to an upstream side.

The compression ignition internal combustion engine according to the second invention aspect can be used in a heavy-duty diesel vehicle, i.e. the definition of heavy-duty vehicle for the EU from the background section hereinabove shall apply.

According to a third aspect, the invention provides the use of a composite oxidation catalyst according to the first invention aspect for heating a soot filter disposed downstream from the composite oxidation catalyst in an exhaust system of a vehicular compression ignition engine by generating an exotherm from an increased concentration of hydrocarbon fuel in exhaust gas flowing in the exhaust system relative to normal operating conditions by contacting the composite oxidation catalyst with exhaust gas comprising the increased concentration of hydrocarbon fuel.

According to a fourth aspect, the invention provides a method of making a composite oxidation catalyst according to the first invention aspect, for use in an exhaust system for treating an exhaust gas produced by a vehicular compression ignition internal combustion engine, which method comprising the steps of:
(a) applying a catalyst washcoat layer to the substrate surface for a length extending from one end of the substrate to less than the total length of the substrate, which catalyst washcoat layer comprising a refractory metal oxide support material and one or more platinum group metal components; and
(b) impregnating the catalyst washcoat layer in a zone of length $L_1$ defined at one end by the first, substrate end with a solution containing one or more platinum group metal, wherein the one or more alkaline earth metal component is present in the catalyst washcoat layer of step (a) and/or an impregnation solution used in step (b), the method further comprising a step (a') before step (a) or after step (a) but in either case before step (b) of applying a second catalyst washcoat layer to the substrate for a length extending from the second substrate end to less than the total length of the substrate, such that the first catalyst washcoat layer in part overlaps the second catalyst washcoat layer or the second catalyst washcoat layer in part overlaps the first catalyst washcoat layer, wherein the second catalyst washcoat layer comprises a refractory metal oxide support material and one or more platinum group metal components. It will be understood that the catalyst washcoat layer of step (a) can comprise a platinum component, a palladium component or both platinum and a palladium components and the solution of step (b) can comprise platinum, palladium or both platinum and palladium, so long as the combination of steps (a) and (b) arrives at a first catalyst washcoat zone having a length $L_1$ comprising two or more supported platinum group metal components comprising both platinum and palladium at a weight ratio of platinum to palladium of ≥1.

More specific features of aspects of the invention can improve the durability of the composite oxidation catalyst to withstand phosphorus and/or zinc poisoning derived from engine lubricants, improve management of NO oxidation for downstream processes such as selective catalytic reduction of oxides of nitrogen ($NO_x$) and reduce costs by limiting the relative quantities of palladium in the composite oxidation catalyst according to the invention relative to platinum.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Figure 1:
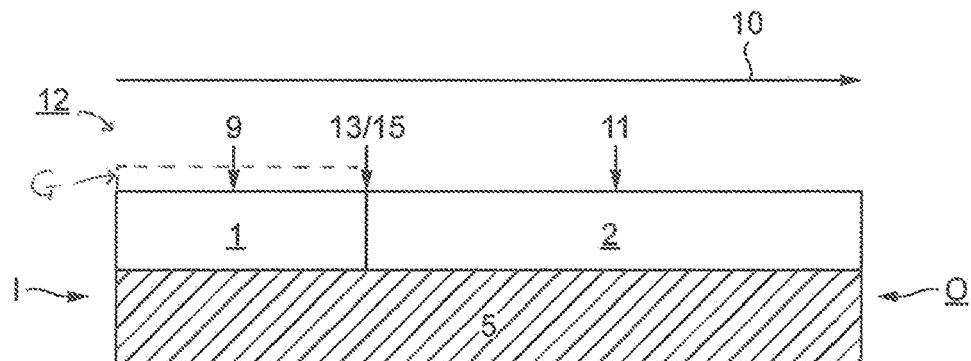
FIG. 1 shows a reference composite oxidation catalyst (12) comprising a first catalyst washcoat zone (1) disposed at an inlet end (I) of a flow-through honeycomb substrate monolith (5) having a total length L and a second catalyst washcoat zone (2) adjacent to the first catalyst washcoat zone (1) disposed at an outlet end (O) of the substrate (5), which first and second catalyst washcoat zones are disposed in series on and along a surface of the substrate. That is, when in use, the substrate of the composite oxidation catalyst is oriented so that exhaust gas from the engine enters the composite oxidation catalyst first via the inlet (or upstream) end (I) and exits the composite oxidation catalyst via the outlet (or downstream) end (O) and the exhaust gas flow is in the direction indicated by the arrow at reference numeral 10. This same orientation and order of contacting the composite oxidation catalyst with exhaust gas is applied across all embodiments disclosed in the FIGS. 1-5 inclusive and described herein.

The composite oxidation catalyst of FIG. 1 can be made by coating substrate (5) along its entire axial length L with a first catalyst washcoat layer comprising a first refractory metal oxide support material and an aqueous solution of one or more platinum group metal salts, drying and firing the coated part; and then impregnating a portion only of the substrate coated with the first catalyst washcoat layer to a length $L_1$, wherein $L_1<L$, with an aqueous solution of a relatively high concentration of one or more platinum group metal and optionally one or more alkaline earth metal components to form a first catalyst washcoat zone (1), wherein the second catalyst washcoat (2) comprises the unimpregnated first catalyst washcoat layer. Alternatively, the first catalyst washcoat layer itself can comprise one or more alkaline earth metal components rather than such alkaline earth metal components being present in the impregnation medium. Of course, alkaline earth metal components can also be present in both the impregnation medium and the first catalyst washcoat layer. For an explanation of "impregnation" techniques, see hereinbelow. The arrangement is such that, in the finished product, the portion of the first catalyst washcoat layer having length $L_1$ comprises two or more supported platinum group metal components comprising both platinum and palladium at a weight ratio of platinum to palladium of ≥1.

Alternatively, the composite oxidation catalyst shown in FIG. 1 can be obtained or is obtainable by coating the substrate (5), in either order, from a first end thereof with a first catalyst washcoat layer for forming the first washcoat catalyst zone and comprising a first refractory metal oxide support material, two or more platinum group metal components comprising both platinum and palladium, e.g. platinum and palladium are the only platinum group metal components, and one or more alkaline earth metal components for an axial length $L_1$ (see the item labelled 9 in FIG. 1); and with a second, different catalyst washcoat layer comprising a second refractory metal oxide support material and one or more second platinum group metal and optionally one or more second alkaline earth metal components for forming a second oxidation catalyst zone (see the item labelled 11) for an axial length $L_2$ such that a second end (13) of the first catalyst washcoat layer (9) and a first end (15) of the second (11) catalyst washcoat layer abut one another without there being substantially any overlap between the first and second washcoat layers. In the latter method of making the embodiment of FIG. 1, it will be understood that the axial length of the first catalyst washcoat zone $L_1$ is the same, or is substantially the same, as the axial length of the first catalyst washcoat layer (9); and the axial length of the second catalyst washcoat zone $L_2$ is the same, or is substantially the same, as the axial length of the second catalyst washcoat zone $L_2$.

Each of the embodiments shown in FIGS. 2-5 inclusive include a preferred optional feature of a porous washcoat overlayer overlying the first catalyst washcoat zone (1) as a guard bed to reduce or prevent the first catalyst washcoat zone from becoming poisoned by phosphorus and/or zinc deposits derived from lubricant additives such as ZDDP or ZDTP. The optional guard bed feature ("G") is shown in dotted line in each of the embodiments of FIGS. 2-5 inclusive. The porous washcoat overlayer is also shown in the reference composite oxidation catalyst shown in FIG. 1.

Figure 2:
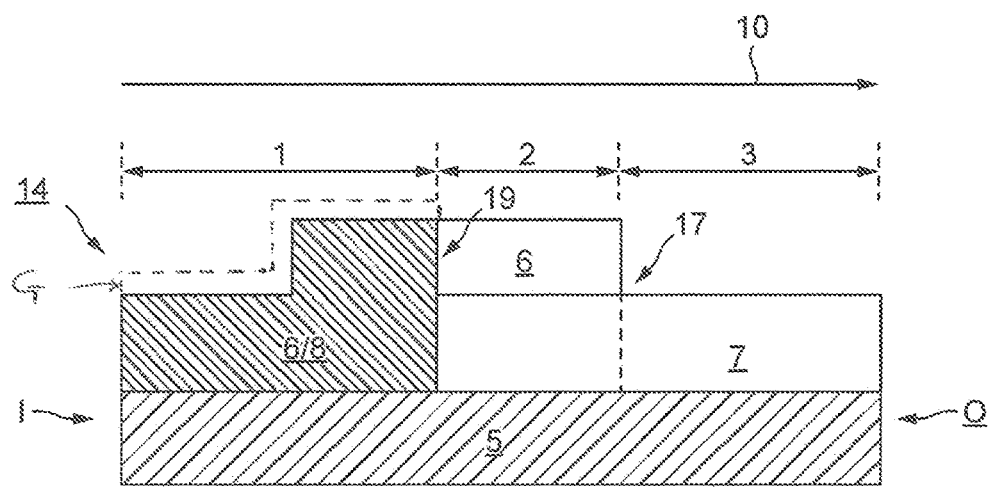
Figure 3:
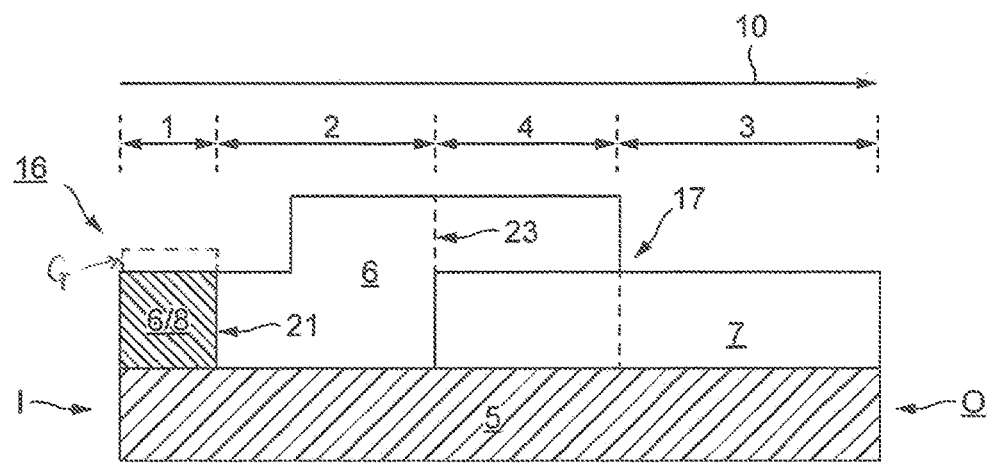

FIGS. 2 and 3 show composite oxidation catalysts (14, 16 respectively) according to the invention based on the same principle of manufacture, i.e. a second catalyst washcoat layer (7) is applied from a second end—corresponding to the outlet end (O)—of substrate (5) for an axial length $L_4$ less than a total axial length L (i.e. $L_4$<L) of a flow-through honeycomb substrate monolith (5). The second catalyst washcoat layer comprises a second refractory metal oxide support material and one or more platinum group metal component and optionally one or more second alkaline earth metal components. The substrate coated with the second catalyst washcoat layer (7) is then itself coated with a first catalyst washcoat layer (6) from the opposite end of substrate (5)—corresponding to the inlet or first substrate end (I)—to that from which the second catalyst washcoat layer was coated onto the substrate (5). The first catalyst washcoat layer comprises a first refractory metal oxide support material and one or more platinum group metal component and optionally one or more first alkaline earth metal components. The axial coating length ($L_3$) of the first catalyst washcoat layer (6) is less than the total axial substrate length L but is long enough to overlap the length ($L_4$) of the second catalyst washcoat layer (7), creating a region where the first (6) and second (7) catalyst washcoat layers are present in a two-layer construct: in other words, a "zone". The axial length of the zone of overlap of the first washcoat layer and the second washcoat layer can be defined as "$L_5$" and is shown as "2" in FIG. 2, i.e. the second washcoat catalyst zone; and as "4" in FIG. 3, i.e. the fourth washcoat catalyst zone.

It can be seen that the zone of length $L_5$ comprising the overlap of the first (6) and second (7) catalyst washcoat layers comprises a sum total of that quantity of one or more platinum group metal and optionally one or more alkaline earth metal present in both the first catalyst washcoat layer (6) and the second (7) catalyst washcoat layer in the region of the overlap. It can also be seen that because the overlap region of the first (6) and second (7) catalyst washcoat layers represents a zone of its own, the zone (labelled 3 in both FIGS. 2 and 3) comprising a single layer of the second catalyst washcoat layer (7) defined at a first end (17) by a second (downstream or outlet) end of the overlap region of the first (6) and second (7) catalyst washcoat layers and at a second end by the second substrate end (or outlet end (O)) will have a lower total platinum group metal loading than the immediately preceding, adjacent upstream overlap zone (zone 2 in FIG. 2; and zone 4 in FIG. 3).

In the arrangement shown in FIG. 2, the zone of overlap of the first (6) and second (7) catalyst washcoat layers is a second catalyst washcoat zone (labelled 2 in FIG. 2). A portion of the total length of the first catalyst washcoat layer (6), which is a first catalyst washcoat zone (labelled 1) and defined at a first end by the inlet/first substrate end (I) and at a second end by a first (upstream, i.e. nearest the inlet end) end (19) of the second catalyst washcoat zone (2), which point corresponding also to the first or upstream end of the second catalyst washcoat layer (7) comprises a greater total platinum group metal loading (in g/L) than the second catalyst washcoat zone (2). It can also be seen that because zone 2 shown in FIG. 2 comprises an overlap of the first (6) and the second (7) washcoat layers, that the axial length $L_3$ of the first catalyst washcoat layer (6) is equivalent to the sum of the axial lengths of the first (1) and second (2) catalyst washcoat zones. Also, the length of the first catalyst washcoat layer (6) present in the first washcoat zone (1) is the total length of the catalyst washcoat layer 6 less the length of the first washcoat layer present in the overlap zone 2, i.e. $L_5$.

In practice, the feature of the total platinum group metal loading in the first catalyst washcoat zone (1) being greater than the total platinum group metal loading in the second catalyst washcoat zone (2) in each of the embodiments shown in FIGS. 2-5 inclusive can be obtained by impregnating a desired length (8) ($L_1$) of the underlying first catalyst washcoat layer (6) with a relatively high concentration of platinum group metal salts in, e.g. an aqueous solution thereof and optionally also containing aqueous salts of one or more alkaline earth metal. "Impregnation" is a method known in art by the skilled person and is disclosed, e.g. in "Catalytic Air Pollution Control—Commercial Technology", 3$^{rd}$ Edition, Ronald M. Heck et al., John Wiley & Sons, Inc. (2009) at paragraph 2.3. In FIG. 2, the axial length $L_1$ of the first catalyst washcoat zone (labelled 1) is substantially the length of the first catalyst washcoat layer (6) up to the point where the first catalyst washcoat layer (6) begins to overlap the second catalyst washcoat layer (7) at point 19.

Where the washcoat for forming the first catalyst washcoat layer (6) does not comprise one of platinum and palladium, the e.g. impregnation medium should contain solute salts of palladium or platinum, whichever is not present in the first catalyst washcoat layer (6), so that the desired length (8) ($L_1$) of the underlying first catalyst washcoat layer comprises two or more supported platinum group metal components comprising both platinum and palladium at a weight ratio of platinum to palladium of ≥1. Of course, in any combination, the first catalyst washcoat layer itself can comprise platinum, palladium or both platinum and palladium; and separately the impregnation medium can comprise platinum, palladium or both platinum and palladium, i.e. the PGM content of the first catalyst washcoat layer and the impregnation medium can be the same or different, so long as the resulting desired length (8) ($L_1$) of the underlying first catalyst washcoat layer comprises two or more supported platinum group metal components comprising both platinum and palladium at a weight ratio of platinum to palladium of ≥1. Where the washcoat for forming the first catalyst washcoat layer (6) does not comprise one or more alkaline earth metal components, the e.g. impregnation medium should contain salts of one or more alkaline earth metal. Of course, it is also possible for both the washcoat for forming the first catalyst washcoat layer (6) and the impregnation medium to contain one or more alkaline earth metal, in which case the or each alkaline earth metal or metals in the washcoat composition and in the impregnation medium can be the same or different.

The third catalyst washcoat zone (labelled 3) is defined at its second (or outlet (O)) end by the second substrate end and has an axial length $L_6$. A first end, i.e. nearest the first substrate (or inlet (I)) end, of the third catalyst washcoat zone (3) is defined hereinabove as (17).

It can be seen from the arrangement shown in FIG. 2 and as described hereinabove that each catalyst washcoat zone can be made up in part from a portion only of the axial length of a catalyst washcoat layer. Therefore, the underlying refractory metal oxide support material in a catalyst washcoat zone of which the catalyst washcoat layer is part. It follows that, where a catalyst washcoat zone comprises an overlap of catalyst washcoat layers, the refractory metal oxide support material in the catalyst washcoat zone formed from the overlap comprises the refractory metal oxide support in each of the catalyst washcoat layers present in the overlap. So, where the refractory metal oxide support material in a first catalyst washcoat layer in the overlap zone is different from the refractory metal oxide support material in the second catalyst washcoat layer, there will be two (or more) refractory metal oxide support materials in the overlap catalyst washcoat zone as a whole. Of course, it is also possible for an individual catalyst washcoat layer to comprise two or more different refractory metal oxide support materials, in which case a catalyst washcoat zone formed from a single layer of that catalyst washcoat layer will contain two or more different refractory metal oxide support materials. Similarly, where the refractory metal oxide support material is the same in each of the two catalyst washcoat layers which form a catalyst washcoat zone on the substrate by an overlap, there will be only one refractory metal oxide support material in that overlap catalyst washcoat zone.

The arrangement shown in FIG. 3 is similar to that shown in FIG. 2 and described hereinabove, except in that the axial length $L_1$ of the first catalyst washcoat zone (labelled 1) is a shorter length of the single layer of the first catalyst washcoat layer (6) formed, e.g. by impregnating a shorter length (8) of substrate (5) coated with the first catalyst washcoat layer (6) with the relatively high concentration of aqueous one or more platinum group metal salt(s) and optionally also salts of one or more alkaline earth metal. In this embodiment, a second catalyst washcoat zone (labelled 2) is defined at a first end, i.e. nearest the first substrate end or inlet, by a second end (21) of the first catalyst washcoat zone 1, e.g. the extent of the impregnation (8) of the first catalyst washcoat layer (6), and at a second end by a first end (23) of the overlap region of the first catalyst washcoat layer (6) with the underlying second catalyst washcoat layer (7) nearest the inlet end (I). The feature of a total platinum group metal loading in the first catalyst washcoat zone being greater than a total platinum group metal loading in the second catalyst washcoat zone is met by e.g. impregnating the underlying first catalyst washcoat layer, which comprises one or more platinum group metal components, with a relatively high concentration of one or more platinum group metals. Such impregnation medium can also include aqueous salts of one or more alkaline earth metals.

According to the invention definition, the third catalyst washcoat layer (labelled 3) is defined at its second (or outlet (O)) end by the second substrate end. Therefore, in the embodiment shown in FIG. 3, the zone comprised of the overlap of the first catalyst washcoat layer (6) and the second catalyst washcoat layer (7)—which is axially located between the second catalyst washcoat zone (2) and the third catalyst washcoat zone (3)—is numbered as the fourth catalyst washcoat zone and is labelled "4" in FIG. 3. It can be seen from FIG. 3 that the axial length of the first washcoat layer (6) is the sum of the axial lengths of the first (1), second (2) and fourth (4) catalyst washcoat zones. It can also be seen that the axial length of zone 2 is the total axial length $L_3$ of the first catalyst washcoat layer (6) less the axial length in both the overlap zone, zone 4, i.e. equivalent to $L_5$, and the length $L_1$ of the first catalyst washcoat zone 1. The axial length of zone 3 is defined at its second (outlet (O) or downstream end) by the second substrate end and has an axial length $L_6$.

Figure 4:
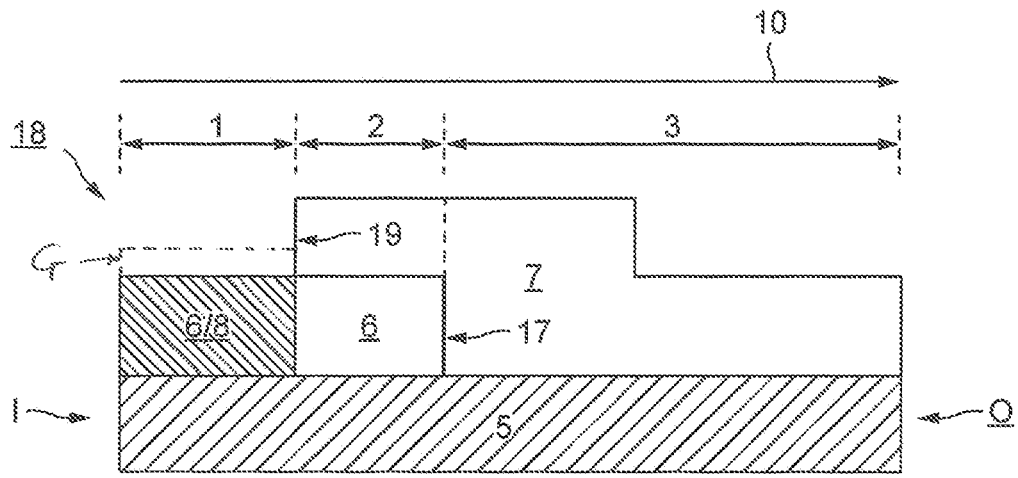
Figure 5:
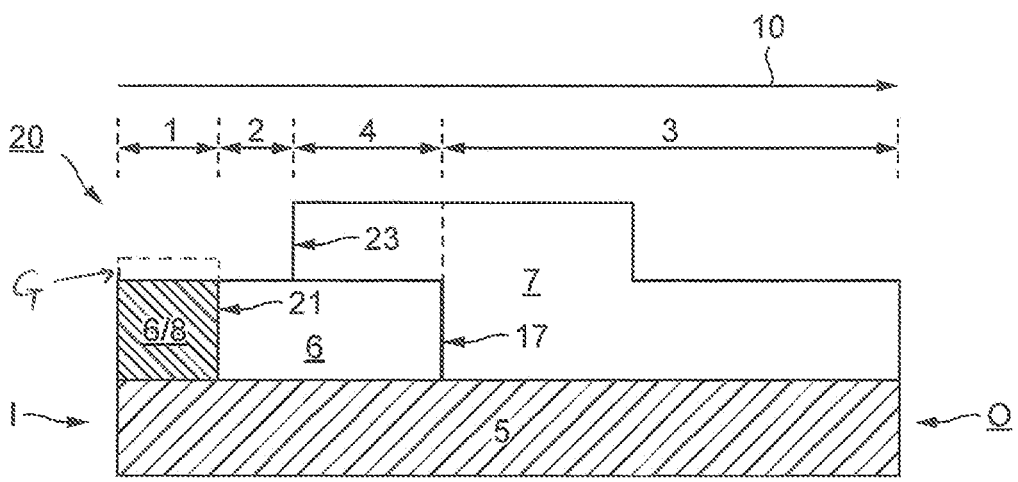

The arrangements shown in FIGS. 4 and 5 (composite oxidation catalysts 18 and 20 respectively) are similar to those shown in FIGS. 2 and 3 respectively, except in that in the embodiments shown in FIGS. 4 and 5, the first washcoat layer (6) comprising a first refractory metal oxide support material, one or more platinum group metal component and optionally one or more first alkaline earth metal component supported thereon, is coated onto the flow-through honeycomb substrate monolith (5) first from the inlet end (I) to a length $L_3$. The substrate coated with the first catalyst washcoat layer (6) is then itself coated with a second catalyst washcoat layer (7) (i.e. to a length where $L_4$<1) from the opposite end of substrate (5)—corresponding to the outlet end (O)—to that from which the first catalyst washcoat layer (6) was coated onto substrate (5). The axial coating length of the second catalyst washcoat layer (7) is less than the total axial substrate length L but is long enough to overlap the first catalyst washcoat layer (6), creating a region wherein the second (7) and first (6) catalyst washcoat layers are present in a two-layer zone. To avoid repetition, Applicant refers the reader to the explanations given hereinabove regarding the description of axial zone length, zone boundary definitions, total zone platinum group metal loading, zone refractory metal oxide support material description etc. by analogy.

Figure 6:
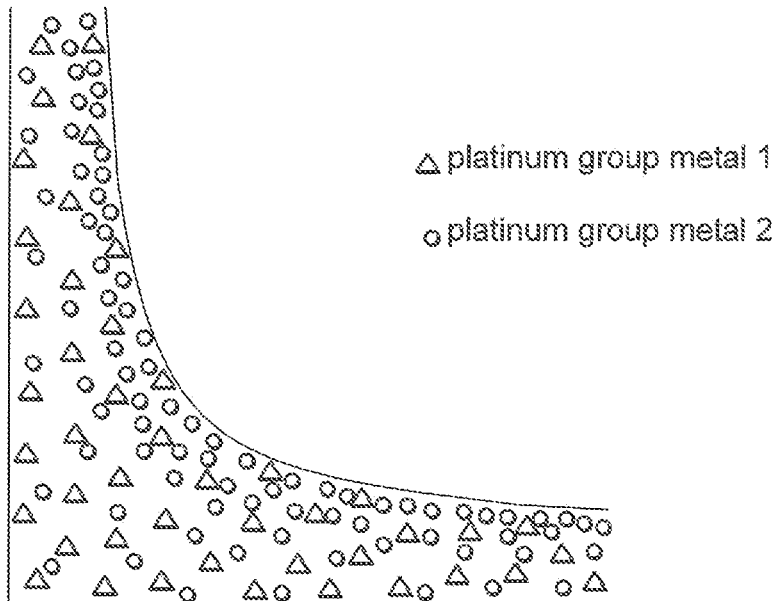

FIG. 6 is a schematic illustration of a single layer, such as a layer of the first catalyst washcoat zone, according to embodiments of the invention, which has a uniform or homogenous distribution of a first platinum group metal (e.g. platinum group metal 1 as represented by Δ) and a non-uniform (i.e. non-homogenous) distribution of a second platinum group metal (e.g. platinum group metal 2 as represented by ○).

Figure 7:
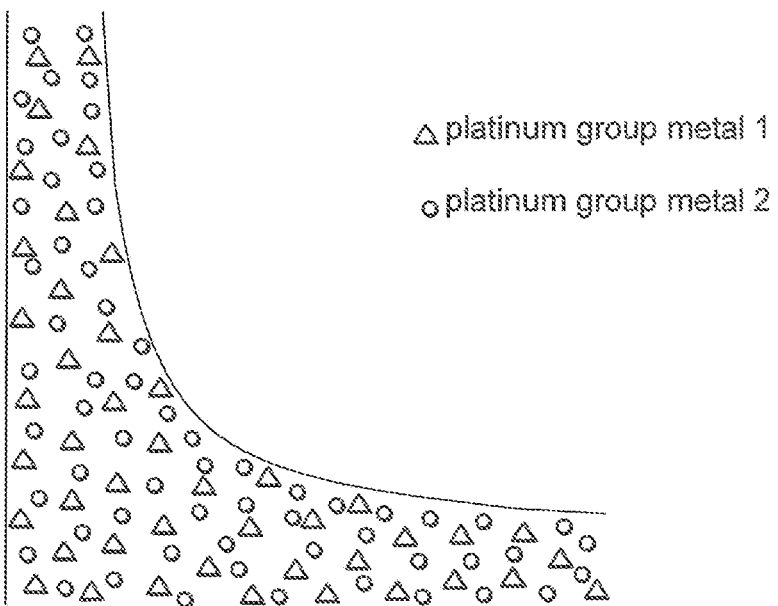
Figure 8A:
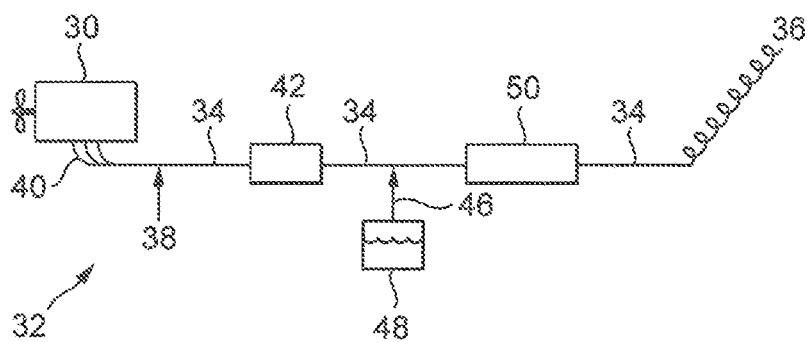
Figure 8B:
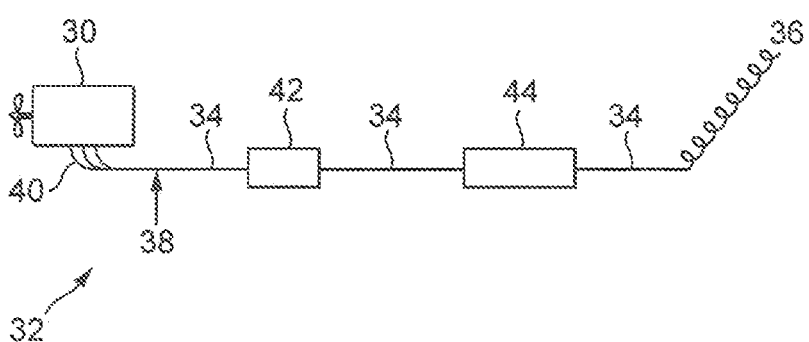
Figure 8C:
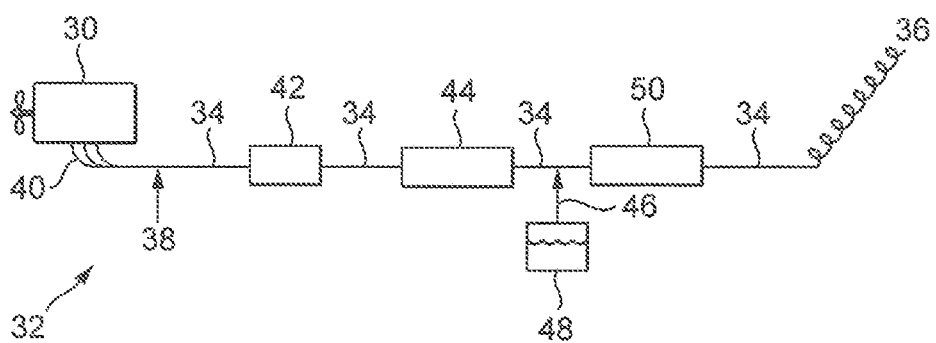
Figure 8D:
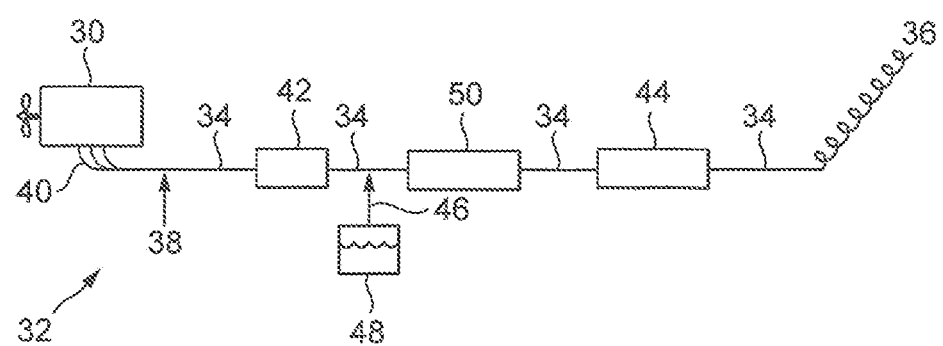

FIG. 7 is a schematic illustration showing the uniform distribution of two platinum group metals (e.g. platinum group metal 1 as represented by Δ and platinum group metal 2 as represented by ○) in embodiments of a single layer catalyst washcoat zone of the invention.

FIGS. 8A-D show various system arrangements comprising composite oxidation catalysts according to the first aspect of the invention, such as any of those disclosed in each of FIGS. 2-5 inclusive.

DETAILED DESCRIPTION OF THE INVENTION

For the avoidance of doubt, the composite oxidation catalyst described herein is termed an "oxidation catalyst" because it can oxidise pollutants in an exhaust gas during normal lean-burn operation of the compression ignition engine, which produces a lean exhaust gas, primarily carbon monoxide and unburned hydrocarbons. The composite oxidation catalyst can also oxidise nitrogen monoxide in the exhaust gas to nitrogen dioxide to promote downstream catalytic activity, such as the CRT® effect and/or promote the selective catalytic reduction reaction and such NO oxidation activity can be enhanced by using the features of one or more of the dependent claims appended hereto. Since it is preferably used for treating exhaust gases produced by a diesel compression ignition engine, it may also be referred to as a "diesel oxidation catalyst". However, infrequently, the composite oxidation catalyst according to the present invention is intended to generate an exotherm from additional hydrocarbons introduced into the exhaust gas thereby to heat a downstream particulate matter filter and thereby to regenerate it (i.e. combust soot trapped thereon (active regeneration)).

The activity of the composite oxidation catalyst is not limited to oxidation reactions, although the oxidation catalyst should be able to oxidise one or more pollutants in an exhaust gas of a compression ignition engine during normal lean-burn operation. For example, assuming appropriate conditions, the oxidation catalyst may additionally be able to perform a reduction reaction, such as the reduction of oxides of nitrogen ($NO_x$) using hydrocarbon in the exhaust gas as reductant (so-called lean $NO_x$ catalysis, $DeNO_x$ catalysis or hydrocarbon-SCR) and/or may be able to temporarily store one or more pollutants from the exhaust gas, such as the temporary adsorption of $NO_x$ and/or hydrocarbons. For the further avoidance of doubt, use of the composite oxidation catalyst to generate an exotherm from additional hydrocarbon fuel injected into the exhaust gas is not "normal use" (see the discussion on regeneration frequency in the background section hereinabove). That is, "normal lean-burn operation" is that period between exotherm generation events.

Regarding NO oxidation activity, preferably the composite oxidation catalyst as a whole promotes NO oxidation over >10% of the operating window of the oxidation catalyst during normal use, such as >20%, >30%, >40% or >50%. This is in marked contrast the oxidation catalyst disclosed in WO 2009/076574 discussed hereinabove, wherein the diesel oxidation catalyst is effective to produce substantially no additional $NO_2$ in the exhaust gas stream after passing through the diesel oxidation catalyst over about 90% of the operating window of the diesel oxidation catalyst. The composite oxidation catalyst according to the present invention does this by including at least one zone in the oxidation catalyst having a weight ratio of platinum to palladium of >1, such as >1.5:1 or >2:1, optionally platinum only as the only platinum group metal present in that particular zone, i.e. a weight ratio of platinum to palladium of 1:0 (or "infinity" (∞)). Optionally for catalyst washcoat zones other than the first catalyst washcoat zone, such other zones may show increased NO oxidation where there is a lower alkaline earth metal loading or substantially no alkaline earth metal present in a zone or zones other than the first catalyst washcoat zone.

Methods of making a reference catalyst as shown in FIG. 1 having two catalyst washcoat zones include a method according to the fourth invention aspect, wherein in step (a) the catalyst washcoat extends along the total length L of the substrate. It will be appreciated that in this method, the first refractory metal oxide support material is the same as the second refractory metal oxide support material. Alternatively, the reference composite oxidation catalyst shown in FIG. 1 can be obtained or is obtainable by coating the substrate (5), in either order, from a first end thereof with a first catalyst washcoat layer for forming the first washcoat catalyst zone and comprising a first refractory metal oxide support material, two or more platinum group metal components comprising both platinum and palladium and one or more alkaline earth metal components for an axial length $L_1$ (see the item labelled 9 in FIG. 1); and with a second, different catalyst washcoat layer comprising a second refractory metal oxide support material and one or more second platinum group metal and optionally one or more second alkaline earth metal components for forming a second oxidation catalyst zone (see the item labelled 11) for an axial length $L_2$ such that a second end (13) of the first catalyst washcoat layer (9) and a first end (15) of the second (11) catalyst washcoat layer abut one another without there being substantially any overlap between the first and second washcoat layers. In the latter method of making the reference composite oxidation catalyst of FIG. 1, it will be understood that the axial length of the first catalyst washcoat zone $L_1$ is the same, or is substantially the same, as the axial length of the first catalyst washcoat layer (9); and the axial length of the second catalyst washcoat zone $L_2$ is the same, or is substantially the same, as the axial length of the second catalyst washcoat zone $L_2$. Further details of methods of making the two-zone composite oxidation catalyst are described hereinabove in connection with FIG. 1.

According to the first aspect, the composite oxidation catalyst comprises three or more than three catalyst washcoat zones, wherein a third catalyst washcoat zone comprising a third refractory metal oxide support material and one or more platinum group metal components supported thereon is defined at a second end thereof by the second substrate end and wherein a total platinum group metal loading in the third catalyst washcoat zone defined in grams of platinum group metal per litre of substrate volume (g/L) is less than the total platinum group metal loading in the second catalyst washcoat zone.

A composite oxidation catalyst according to the first aspect of the invention can comprise four catalyst washcoat zones, wherein a fourth catalyst washcoat zone is located between a second catalyst washcoat zone and a third catalyst washcoat zone, which fourth catalyst washcoat zone comprises a fourth refractory metal oxide support material and one or more platinum group metal component supported thereon and is defined at a first end thereof by a second end of the second catalyst washcoat zone and at a second end thereof by a first end of the third catalyst washcoat zone and wherein a total platinum group metal loading in the fourth catalyst washcoat zone defined in grams of platinum group metal per litre of substrate volume (g/L) is greater than the total platinum group metal loading in each of the second catalyst washcoat zone and the third catalyst washcoat zone.

Preferably in the composite oxidation catalyst according to the first aspect of the invention comprising four catalyst washcoat zones, the composite oxidation catalyst comprises a first catalyst washcoat layer and a second catalyst washcoat layer, wherein the first catalyst washcoat layer comprises a refractory metal oxide support material and one or more platinum group metal components supported thereon, has a length $L_3$, wherein $L_3<L$, and is defined at one end by the first substrate end; and the second catalyst washcoat layer comprises a refractory metal oxide support material and one or more platinum group metal components supported thereon, has a length $L_4$, wherein $L_4<L$, and is defined at a second end by the second substrate end, wherein the fourth catalyst washcoat zone comprises a two-layer overlap region of the first catalyst washcoat layer and the second catalyst washcoat layer and wherein the third catalyst washcoat zone comprises a single layer of the second catalyst washcoat layer that is not comprised of the overlap region. Methods of making such a composite oxidation catalyst are described hereinabove with reference to the embodiments shown in FIGS. 3 and 5 and with further reference to the embodiments shown in FIGS. 2 and 4 and their associated description.

A composite oxidation catalyst comprising three catalyst washcoat zones can comprise a third catalyst washcoat zone defined at a first end thereof by a second end of the second catalyst washcoat zone (see e.g. the arrangements shown in FIGS. 2 and 4).

Such composite oxidation catalyst can comprise a first catalyst washcoat layer and a second catalyst washcoat layer, wherein the first catalyst washcoat layer comprises a refractory metal oxide support material and one or more platinum group metal components supported thereon, has a length $L_3$, wherein $L_3<L$, and is defined at one end by the first substrate end; and the second catalyst washcoat layer comprises a refractory metal oxide support material and one or more platinum group metal component supported thereon, has a length $L_4$, wherein $L_4<L$, and is defined at a second end by the second substrate end, wherein the second catalyst washcoat zone comprises a two-layer overlap region of the first catalyst washcoat layer and the second catalyst washcoat layer and wherein the third catalyst washcoat zone comprises a single layer of the second catalyst washcoat layer that is not comprised of the overlap region.

In the three and four zone arrangements described hereinabove, preferably the one or more platinum group metal component in the third catalyst washcoat zone consists essentially of platinum. It will be appreciated that, where the one or more platinum group metal in the third catalyst washcoat zone consists essentially of platinum, in arrangements featuring an overlap of first and second catalyst washcoat layers, the second catalyst washcoat layer that forms the third catalyst washcoat zone also consists essentially of platinum.

It will further be appreciated that in composite oxidation catalysts having two zones as described herein, the second catalyst washcoat zone can comprise one or more alkaline earth metal, such as barium and/or strontium, preferably barium.

It will also be appreciated that in composite oxidation catalysts having three zones as described herein, the second catalyst washcoat zone, the third catalyst washcoat zone or both the second catalyst washcoat zone and the third catalyst washcoat zone can each comprise one or more alkaline earth metal, such as barium and/or strontium, preferably barium.

It will be further appreciated that in composite oxidation catalysts having four zones as described herein, the second catalyst washcoat zone, the third catalyst washcoat zone and/or the fourth catalyst washcoat zone can each comprise one or more alkaline earth metal, such as barium and/or strontium, preferably barium.

It will further be appreciated that in composite oxidation catalysts having three or four zones as described herein, the first catalyst washcoat layer, the second catalyst washcoat layer and/or both the first catalyst washcoat layer and the second catalyst washcoat layer can each comprise one or more alkaline earth metal, such as barium and/or strontium, preferably barium.

Methods of making three or four zone composite oxidation catalysts according to the invention include a method according to the fourth invention aspect.

Where the above method is used to make a composite oxidation catalyst according to the invention having three or more zones, it will be understood that the axial length $L_1$ of the impregnation step can determine the number of catalyst washcoat zones present along the axial substrate length. This is further explained with reference to FIGS. 2, 3, 4 and 5 herein.

Where $L_1$ is less than an axial length between the first substrate end and a first end of the second catalyst washcoat, representing an end of an overlap region of the first catalyst washcoat layer and the second catalyst washcoat layer nearest the first substrate end, the second catalyst washcoat zone comprises a single layer of the first catalyst washcoat layer defined at one end by the second end of the first catalyst washcoat zone $L_1$ and at a second end by a first end of the overlap region of the first catalyst washcoat layer and the second catalyst washcoat layer nearest the first substrate end. In this case, a fourth catalyst washcoat zone is defined by the first end of the overlap region of the first and second washcoat layers nearest the first substrate end, wherein the platinum group metal loading in the first catalyst washcoat zone (g/L)>fourth catalyst washcoat zone >second catalyst washcoat zone. A third catalyst washcoat zone is defined at a second end by the substrate end opposite from the substrate end from which the first catalyst washcoat layer extends and at a first end by the end of an overlap region of the first catalyst washcoat layer and the second catalyst washcoat layer nearest the end from which the second catalyst washcoat layer extends, i.e. also corresponding to the second end of the fourth catalyst washcoat zone. This arrangement is shown in FIGS. 3 and 5 herein.

Where $L_1$ is the same length as the axial length of the single layer of the first catalyst washcoat layer extending from the first substrate end until the first catalyst washcoat layer enters the overlap region of the second catalyst washcoat zone, the oxidation catalyst as a whole comprises three axially arranged catalyst washcoat zones, which can be numbered sequentially in series from the first substrate end as first, second and third catalyst washcoat zones.

Although not a method according to the invention, an oxidation catalyst having three or more catalyst washcoat zones according to the invention can be made in an adaptation to the method for making an oxidation catalyst according to the fourth invention aspect having two catalyst washcoat zones described hereinabove, as follows. Firstly, the substrate is coated with a first catalyst washcoat layer along its total length L. Secondly, a second catalyst washcoat layer comprising a refractory metal oxide support material and one or more platinum group metal components can be coated from a first substrate end on top of the first catalyst washcoat layer to an axial length less than the total substrate length L or else the first catalyst washcoat layer can be impregnated from the first substrate end with an impregnation solution comprising one or more platinum group metal salts and optionally one or more alkaline earth metal salts to a length less than the total substrate length L. The second catalyst washcoat layer or the impregnated first catalyst washcoat layer will in part form the middle or second of the three catalyst washcoat zones arranged axially along the substrate. Thirdly, a third catalyst washcoat layer comprising a refractory metal oxide support material and one or more platinum group metal components being the first catalyst washcoat zone $L_1$ can be coated from the first substrate end on top of the second catalyst washcoat layer (or else impregnated onto the impregnated first washcoat layer for a zone length $L_1$ corresponding to the first catalyst washcoat zone) to an axial length less than the second catalyst washcoat layer or the axial length of the first impregnation of the second step above. It will be appreciated that the platinum group metal content of the first catalyst washcoat zone $L_1$ comprises a combination of the platinum group metal composition of the underlying first catalyst washcoat layer, the second catalyst washcoat layer or impregnation solution and the third catalyst washcoat layer or impregnation solution, so long as in $L_1$ as a whole the combination of layers and impregnation solutions comprises both platinum and palladium at a weight ratio of 1. The one or more alkaline earth metal components can be present in the washcoat or impregnation step of the first, second and/or third application steps.

It is preferred that at least the third step is performed as an impregnation to a length $L_1$ corresponding to step (b) from the fourth invention aspect. This is because multiple layer-on-layer coatings reduce the cross-sectional area of the substrate open frontal area for allowing gas to pass, thereby undesirably increasing back pressure in the system.

In use in an exhaust system for a vehicular compression ignition engine, the first substrate end of the oxidation catalyst according to the first aspect of the invention comprising the first catalyst washcoat zone is oriented to the upstream side, i.e. nearest the engine. That is, the first substrate end can be defined as a first, upstream inlet substrate end and the second substrate end can be defined as a second, downstream substrate (or outlet) end.

Platinum Group Metal Loading

In general, each catalyst washcoat zone in the composite oxidation catalyst according to the present invention comprises one or more; or two or more platinum group metal components selected from the group consisting of platinum, palladium, rhodium, iridium, ruthenium and a mixture or alloy of any two or more thereof, except in the case of the first catalyst washcoat zone, which according to the first aspect of the invention comprises both platinum and palladium at a weight ratio of platinum to palladium of $\geq 1$. Where a catalyst washcoat zone—other than the first catalyst washcoat zone—comprises only one platinum group metal, preferably it is platinum, i.e. the one or more platinum group metal component consists essentially of or consists of platinum.

Specifically, the two or more platinum group metal components in the first catalyst washcoat zone and/or the first catalyst washcoat layer comprises both platinum and palladium, e.g. the two or more platinum group metal components consist essentially of or consist of platinum and palladium. Preferably the only platinum group metals present in the first catalyst washcoat zone and/or the first catalyst washcoat layer are platinum and palladium. It will be appreciated that where the first catalyst washcoat layer comprises both platinum and palladium, any catalyst washcoat zone including the first catalyst washcoat layer will also comprise both platinum and palladium.

It is further preferred that the one or more platinum group metal components in the second catalyst washcoat zone comprises, i.e. intentionally comprises, platinum, such as both platinum and palladium or platinum may be the only platinum group metal present in the second catalyst washcoat zone, e.g. the one or more platinum group metal component in the second catalyst washcoat zone consists of platinum; or the more than one platinum group metal component in the second catalyst washcoat zone consists of both platinum and palladium. Optionally, the content of platinum in the second catalyst washcoat zone is greater than 1 wt. % of the total metal including platinum group metals and base metals (e.g. alkaline earth metals) supported on the refractory metal oxide support material in the zone. This feature is intended to distinguish the disclosure of WO 2009/076574 acknowledged in the background section hereinabove.

Preferably where the substrate comprises three or more catalyst washcoat zones, the third catalyst washcoat zone or the second catalyst washcoat layer comprises platinum, i.e. intentionally comprises platinum, such as both platinum and palladium or platinum may be the only platinum group metal present in the third catalyst washcoat zone or the second catalyst washcoat layer. Optionally, the content of platinum in the third catalyst washcoat zone is greater than 1 wt. % of the total metal including platinum group metals and base metals (e.g. alkaline earth metals) supported on the refractory metal oxide support material in the zone. This feature is intended to distinguish the disclosure of WO 2009/076574 acknowledged in the background section hereinabove.

In a preferred arrangement, platinum is the only platinum group metal in the second catalyst washcoat layer, i.e. the one or more platinum group metal component in the second catalyst washcoat layer consists of platinum (a Pt:Pd weight ratio of 1:0), because this feature provides more stable $NO_2$ generation for operation of downstream catalyst functions, particularly in arrangements where the second catalyst washcoat layer overlaps with the first catalyst washcoat layer, as is shown in FIGS. 4 and 5. Therefore, for stable $NO_2$ generation, the arrangement wherein the one or more platinum group metal component in the second catalyst washcoat layer consists of platinum is preferred where the second catalyst washcoat layer overlaps the first catalyst washcoat layer. In preferred arrangements wherein the platinum is the only platinum group metal present in the third catalyst washcoat zone or the second catalyst washcoat layer, i.e. a Pt:Pd weight ratio of 1:0, the third catalyst washcoat zone or the second catalyst washcoat layer comprises manganese (see hereinbelow).

Preferably, the second catalyst washcoat zone comprises both platinum and palladium, e.g. the more than one platinum group metal component in the second catalyst washcoat zone consists of platinum and palladium because this feature improves hydrocarbon slip control.

Therefore, in general, in order to distinguish the disclosure of WO 2009/076574 acknowledged in the background section hereinabove any catalyst washcoat zone which is defined at a second end thereof by the second (outlet) end of the substrate intentionally comprises platinum, wherein, optionally, the content of platinum in the catalyst washcoat zone is greater than 1 wt. % of the total metal including platinum group metals and base metals (e.g. alkaline earth metals) supported on the refractory metal oxide support material in the zone.

Typically, a total platinum group metal loading on the substrate as a whole (calculated as elemental metal) is 0.177 to 2.119 g/L (5 to 60 g/ft$^3$), preferably 0.283 to 1.766 g/L (8 to 50 g/ft$^3$) for application to heavy-duty diesel engine exhaust systems.

A weight ratio of Pt:Pd on the substrate as a whole (calculated as elemental metal) is preferably 3:2 to 9:1, preferably 2:1 to 7:1, most preferably 3:1 to 5:1.

The platinum group metal loading in the first catalyst washcoat zone (calculated as elemental metal) is preferably less than 3.531 g/L (less than 100 g/ft$^3$), preferably 0.883 to 2.649 g/L (25-75 g/ft$^3$) and most preferably 1.236 to 2.295 g/L (35-65 g/ft$^3$). It will be appreciated that the first catalyst washcoat zone can comprise an "underlying" platinum group metal loading in a first catalyst washcoat layer, generally a single layer of the first catalyst washcoat layer, which is subsequently impregnated with a high concentration solution of platinum group metal salts, before being dried and calcined. As a result, the first catalyst washcoat zone is a combination of the platinum group metal loadings from both the first catalyst washcoat layer and the impregnation solution.

The platinum group metal loading in the second and subsequent catalyst washcoat zones as a whole, i.e. the total platinum group metal in catalyst washcoat zones other than the first catalyst washcoat zone (calculated as elemental metal), can depend on the embodiment used. So, for example, in the reference catalyst shown in FIG. 1 comprising a total of two zones only, the total platinum group metal loading in the second catalyst washcoat zone is preferably 0.035 to 0.353 g/L (1 to 10 g/ft$^3$).

However, in embodiments comprising three catalyst washcoat zones, wherein the second catalyst washcoat zone comprises an overlap region of first and second catalyst washcoat layers (see the embodiments in FIGS. 2 and 4, for example)—or embodiments comprising four catalyst washcoat zones wherein the fourth catalyst washcoat zone comprises an overlap region of first and second catalyst washcoat layers (see the embodiments in FIGS. 3 and 5, for example)—the total platinum group metal loading in the second (or fourth) catalyst washcoat zone can be 0.353 to 1.412 g/L (10 to 40 g/ft$^3$), preferably 0.530 to 1.236 g/L (15 to 35 g/ft$^3$).

In embodiments comprising three or four catalyst washcoat zones, such as those shown in any one of FIGS. 2-5 inclusive, the total platinum group metal loading in the third catalyst washcoat zone can be 0.035 to 1.059 g/L (1 to 30 g/ft$^3$), preferably 0.177 to 0.706 g/L (5 to 20 g/ft$^3$).

In embodiments comprising four catalyst washcoat zones, such as those shown in FIG. 3 or 5, the total platinum group metal loading in the second catalyst washcoat zone can be 0.035 to 1.059 g/L (1 to 30 g/ft$^3$), preferably 0.177 to 0.706 g/L (5 to 20 g/ft$^3$). However, the total washcoat loading in the second catalyst washcoat zone is always greater than in the third catalyst washcoat zone.

The one or more platinum group metal component supported on a refractory metal oxide support material and/or the one or more alkaline earth metal component can be prefixed to the refractory metal oxide support material prior to forming a washcoat layer therewith and so will be present throughout any washcoat layer coated with such washcoat coating. However, in a preferred methodology, a solute salt of the one or more platinum group metal components and optionally a solute salt of the one or more first alkaline earth metal components are present in an, e.g. aqueous, washcoat slurry also containing "fresh" refractory metal oxide material and applied to the substrate and the one or more platinum group metal components and the one or more first alkaline earth metal components are fixed to the refractory metal oxide support material through a drying and calcination process following coating of the washcoat slurry on to the substrate. By "fresh refractory metal oxide material", it is meant that no platinum group metal component and/or alkaline earth metal component has been pre-fixed to the refractory metal oxide component. This method is preferred because it is less energy intensive, i.e. it avoids a two-step process of firstly preparing a supported pre-fixed refractory metal oxide product and then using this pre-fixed product to prepare a washcoat slurry for coating. Furthermore, the inventors have discovered that it may be advantageous for exotherm generation that at least the first catalyst washcoat layer has a non-uniform distribution of the one or more platinum group metal components and/or the one or more alkaline earth metal components throughout its thickness (i.e. the direction perpendicular to the surface of the substrate represents the thickness of the catalyst layer). This advantageous feature is not available or not available to the same extent as to achieve the desired effect where the platinum group metal or alkaline earth metal are pre-fixed to the refractory metal oxide support material.

For an explanation of this aspect of Applicant's invention, see hereinbelow.

According to the fourth invention aspect, discussed also below, the first catalyst washcoat zone is obtained by or is obtainable by the steps of:

(a) applying a catalyst washcoat layer to the substrate surface for a length extending from one end of the substrate to less than the total length of the substrate, which catalyst washcoat layer comprising a refractory metal oxide support material and one or more platinum group metal component; and (b) impregnating the catalyst washcoat layer in a zone of length $L_1$ defined at one end by the first substrate end with a solution containing one or more platinum group metal, the method further comprising a step (a') before step (a) or after step (a) but in either case before step (b) of applying a second catalyst washcoat layer to the substrate for a length extending from the second substrate end to less than the total length of the substrate, such that the first catalyst washcoat layer in part overlaps the second catalyst washcoat layer or the second catalyst washcoat layer in part overlaps the first catalyst washcoat layer, wherein the second catalyst washcoat layer comprises a refractory metal oxide support material and one or more platinum group metal components.

It will be understood, therefore, that where a catalyst washcoat layer, e.g. the first catalyst washcoat layer comprising one or more platinum group metal components supported on a refractory metal oxide support material, is itself impregnated with a solution comprising one or more platinum group metal component, a platinum group metal composition of the resulting zone is a combination of the underlying catalyst washcoat layer and the impregnating solution. So, for example, a platinum to palladium mass (i.e. weight) ratio in the first catalyst washcoat zone as a whole is derived from the total platinum and palladium derived from both the catalyst washcoat layer, i.e. the first catalyst washcoat layer, and the impregnating solution.

As discussed hereinabove in relation to FIGS. 4 and 5, preferably the first catalyst washcoat layer extends from the first substrate end and the second catalyst washcoat layer extends from the second substrate end, whereby the second catalyst washcoat layer in part overlaps the first catalyst washcoat layer.

According to the invention, the first catalyst washcoat zone comprises both platinum (Pt) and palladium (Pd) at a weight ratio of platinum to palladium of ≥1. Although there is a general desire to reduce the amount of palladium in the composite oxidation catalyst relative to platinum to reduce the total cost of the platinum group metals in the catalyst, as can be seen from sample 9.5 in Example 9 hereinbelow, Applicant's experimental data suggest that it is undesirable to remove palladium from the first catalyst washcoat zone entirely without detrimentally affecting the exotherm generation functionality of the catalyst as it ages. In this regard, sample 9.5 in Example 9 shows that where the underlying washcoat layer having a Pt:Pd weight ratio of 2:1 is impregnated with an impregnation medium comprising no palladium, i.e. a Pt:Pd weight ratio of 1:0, to form the first catalyst washcoat zone having an approximate Pt:Pd weight ratio of 47:1, the ability of the resulting catalyst to promote an exotherm is compromised, i.e. the first catalyst washcoat zone is less stable to ageing. However, although less preferred, sample 9.5 in Example 9 remains an effective composite oxidation catalyst for the purposes of the present invention.

However, generally it is preferred that the weight ratio of platinum (Pt) to palladium (Pd) in the first catalyst washcoat zone is 10:1≥1:1, preferably 10:1≥1.5:1 or 6:1≥1.5:1, more preferably 4:1≥1.5:1, e.g. 6:1≥2:1, 4:1≥1.5:1 or 2:1≥1:1 since Example 9 also shows that the inlet temperature at <500° C. exotherm fail (° C.) test for aged composite oxidation catalysts having a first catalyst washcoat zone derived from the impregnation of an underlying catalyst washcoat layer comprising a Pt:Pd weight ratio of 2:1 with an impregnation medium having a Pt:Pd weight ratio of 1:1, 2:1, 3:1 and 4:1 are similar. It was also found that, in combination with the alkaline earth metal component, the Pt:Pd≥1:1 weight ratio feature improves exotherm light-off temperature (the light-off temperature is reduced) allowing for increased exotherm generation from lower exhaust gas temperatures in active and active-passive regeneration systems.

It will be understood that further reductions in total platinum group metal cost in the composite oxidation catalyst according to the invention for equivalent functionality can be obtained where the first catalyst washcoat zone comprises higher Pt:Pd weight ratio (because the current cost by weight of palladium is significantly more than that of platinum), e.g. at ≥1.5:1, such as the preferred 10:1≥1.5:1 range or at ≥2:1 in combination with an outlet zone, e.g. the third catalyst washcoat zone, defined at one end by the outlet end of the composite oxidation catalyst substrate comprising a pre-formed manganese doped mixed magnesium aluminium metal oxide. A composite oxidation catalyst having an outlet zone comprising this composition has been shown in Example 8 to improve exotherm performance and may enable the use of lower quantities of platinum group metal in the outlet zone or second catalyst washcoat layer in part forming the outlet (third catalyst washcoat) zone.

Preferably in embodiments comprising three or more catalyst washcoat zones, the one or more platinum group metals in the second catalyst washcoat zone comprises both platinum and palladium. In a particularly preferred feature, a mass ratio of platinum to palladium in the second catalyst washcoat zone is greater than a mass ratio of platinum to palladium in the first catalyst washcoat zone. In combination with a platinum group metal loading in the second catalyst washcoat zone, the advantage of this Pt:Pd mass ratio in the second catalyst washcoat zone is that the catalyst improves hydrocarbon slip control, CO oxidation and NO oxidation.

In this regard, in embodiments consisting of two zones, e.g. as is shown in FIG. 1—allowing for any overlap from production methodology (see "Definitions" section hereinbelow)—preferably the second catalyst washcoat zone comprises a Pt-rich PGM composition comprising palladium, preferably at a weight ratio of ≥10:1, ≥5:1, ≥3:1 or 2:1. In combination with a first catalyst washcoat zone comprising Pt:Pd at ≥1:1, this feature has been found to be advantageous because a Pt-only (i.e. a Pt:Pd weight ratio of 1:0) second catalyst washcoat zone has been found to be detrimental to exotherm light-off and HC slip in an aged catalyst. In this regard, the presence of Pd in addition to Pt in the second catalyst washcoat zone can improve the stability to ageing of the second catalyst washcoat zone, i.e. maintaining oxidation activity through ageing. However, in combination with manganese, a Pt:Pd weight ratio of 1:0 in the second catalyst washcoat zone has been found to be beneficial for NO oxidation (see Example 8 and hereinbelow).

In composite oxidation catalysts according to the invention comprising three catalyst washcoat zones, preferably a mass ratio of platinum to palladium increases from the first catalyst washcoat zone to the second catalyst washcoat zone to the third catalyst washcoat zone. This can be done, for example, in the embodiments shown in FIGS. 2 and 4 wherein the second catalyst washcoat layer (7) has a higher Pt:Pd mass ratio than the first catalyst washcoat layer, preferably a mass ratio of 1:0, i.e. Pt only and substantially no Pd, so that the single layer of the second catalyst washcoat layer in the third catalyst washcoat zone (3) has the highest Pt:Pd ratio of any of the catalyst washcoat zones arranged on the substrate. However, the same comments apply as those described in connection with composite oxidation catalysts comprising only two catalyst washcoat zones, i.e. stability to ageing for the third catalyst washcoat zone can be improved by including some palladium e.g. at ≥10:1, ≥5:1, ≥3:1 or ≥2:1 or while still maintaining the preferred arrangement of the mass ratio of platinum to palladium increasing from the first catalyst washcoat zone to the second catalyst washcoat zone to the third catalyst washcoat zone. In the context of three-zone composite oxidation catalysts, reference is also made to the benefit of also including manganese in the third catalyst washcoat zone (3) (see Example 8 and hereinbelow).

Furthermore, in a composite oxidation catalyst having four catalyst washcoat zones, a mass ratio of platinum to palladium in each successive catalyst washcoat zone at the inlet end arrayed in series along the substrate length L after the first catalyst washcoat zone is greater than an immediately preceding catalyst washcoat zone. This can again be accomplished, for example, in the embodiments shown in FIGS. 3 and 5 wherein the second catalyst washcoat layer (7) has a higher Pt:Pd mass ratio than the first catalyst washcoat layer, preferably a mass ratio of 1:0, i.e. Pt only and substantially no Pd, so that the single layer of the second catalyst washcoat layer in the third catalyst washcoat zone (3) has the highest Pt:Pd ratio of any of the catalyst washcoat zones. However, the same comments apply as those described in connection with composite oxidation catalysts comprising only two catalyst washcoat zones, i.e. stability to ageing for the third catalyst washcoat zone can be improved by including some palladium e.g. at or while still maintaining the preferred arrangement of the mass ratio of platinum to palladium increasing from the first catalyst washcoat zone to the second catalyst washcoat zone to the third catalyst washcoat zone. In the context of four-zone composite oxidation catalysts, reference is also made to the benefit of also including manganese in the third catalyst washcoat zone (3) (see Example 8 and hereinbelow).

It will be appreciated that—in the context of a four-zone composite oxidation catalyst according to the invention—the feature "in each successive catalyst washcoat zone arrayed in series along the substrate length L after the first catalyst washcoat zone at the inlet end is greater than an immediately preceding catalyst washcoat zone" is a different order from the numbering of the catalyst washcoat zones in FIGS. 3 and 5. That is, in FIGS. 3 and 5, the order of numbering the washcoat catalyst zones from the first catalyst washcoat zone (1) is 1→2→4→3. This is because the third catalyst washcoat zone (3) is defined at a second end by the second substrate end (or outlet end). However, the feature "in each successive catalyst washcoat zone arrayed in series along the substrate length L after the first catalyst washcoat zone at the inlet end is greater than an immediately preceding catalyst washcoat zone" requires e.g. that a mass ratio of Pt:Pd in the fourth catalyst washcoat zone is greater than that in the immediately preceding second catalyst washcoat zone (2) and that the Pt:Pd mass ratio in the third catalyst washcoat zone (3) is greater than the immediately preceding fourth catalyst washcoat zone (4).

Preferably, the one or more platinum group metal in the second catalyst washcoat zone comprises both platinum and palladium, wherein a mass ratio of platinum to palladium is >1:1 preferably 10:1>3:2 such as 5:1>3:2.

Typically, the first catalyst washcoat zone or first catalyst washcoat layer does not comprise rhodium.

It may be preferable that the second catalyst washcoat zone or the second catalyst washcoat layer does not comprise rhodium.

The third or fourth catalyst washcoat zone may not comprise rhodium.

It may further be preferable that the composite oxidation catalyst according to the invention is substantially free from rhodium altogether.

The inventors have also found that there may be an advantage for improved exotherm generation where there is a non-uniform distribution of the one or more platinum group metal component and/or the one or more first alkaline earth metal component in a direction perpendicular to the surface of the substrate. This is discussed in greater detail under the heading below.

Alkaline Earth Metal Component

It will be understood that the purpose of the alkaline earth in the composite oxidation catalyst according to the invention is not to store $NO_x$ for later release and reduction by the lean $NO_x$ catalysis process discussed above. This is the purpose of a specially designed catalyst called a lean $NO_x$ trap (LNT) which can also include alkaline earth metal, platinum group metals and optionally ceria, doped ceria or ceria mixed oxide components, but which LNT must be used in combination with specially programmed engine control unit. This engine control operates lean of the stoichiometric mode of operation, during which period $NO_x$ is absorbed on the LNT, and an operation mode wherein a pulse of rich exhaust gas containing additional reducing species, such as CO and/or hydrocarbons contact the LNT, thereby desorbing absorbed $NO_x$ and reducing it via the lean $NO_x$ catalysis reaction over the platinum group metal. In use of the LNT, the frequency of the lean/rich cycle is of the order of about 60 seconds lean and 5 second rich. Desulfation of the LNT is less frequent but the period of enrichment may be longer. However, control of the desulfation event also requires a specially programmed engine control unit.

The composite oxidation catalyst of the present invention may be distinguished from a LNT in at least two significant ways. Firstly, LNTs are not used in treating exhaust gas from heavy-duty diesel engines, which instead use SCR catalysts. This is primarily because a LNT catalyst for a heavy-duty diesel vehicle would need to be so voluminously large that the cost of the platinum group metals required would make the cost of the catalyst prohibitive. Secondly, preferably the composite oxidation catalyst of the present invention contains substantially no ceria, doped ceria or ceria mixed oxide or composite oxide components.

According to the first invention aspect, the first catalyst washcoat zone comprises one or more first alkaline earth metal component supported on the first, refractory metal oxide support material. The inventors have found that, for the purpose of generating an exotherm from hydrocarbon fuel, the presence of an alkaline earth metal component, preferably comprising barium, improves HC conversion to such an extent that the quantity of one or more platinum group metal in the first catalyst washcoat zone can be reduced by approximately 0.347 g/L (7 g/ft$^3$) and still have the same activity. It is believed that the relatively high platinum group metal loading in the first catalyst washcoat zone rapidly starts and accelerates the exotherm reaction, whilst the presence of the one or more alkaline earth metal stabilises the PGM, e.g. by reducing sintering and improving thermal durability.

The one or more alkaline earth metal component in the first catalyst washcoat zone is preferably barium (Ba) or strontium (Sr), preferably Ba, e.g. the one or more first alkaline earth metal components in the first catalyst washcoat zone consists of barium.

Reasons for preferring barium over other alkaline earth metals is explained under the heading "Non-uniform distribution of alkaline earth metal component and/or platinum group metal component in washcoat layer" hereinbelow.

A total alkaline earth metal component loading in the first catalyst washcoat zone can be from 0.353 to 3.531 g/L (10-100 g/ft$^3$) calculated as elemental metal, preferably 0.706 to 2.825 g/L (20-80 g/ft$^3$). Too much alkaline earth metal component can be detrimental to exotherm generation. In this regard, the ratio of the total mass of the alkaline earth metal component to the total mass of the platinum group metal (PGM) component can be 1:1 to 1:2, preferably 1:1 to 50:80.

According to the method of the fourth invention aspect, the one or more first alkaline earth metal components can be present in the catalyst washcoat layer applied in step (a) and/or in the impregnation solution of step (b), but it is preferably present in the catalyst washcoat layer, e.g. the first catalyst washcoat layer, of step (a) of the fourth invention aspect. This is because, where the alkaline earth metal, e.g. barium, salts are present in the impregnation medium of step (b), they can be more difficult to control using preferred pH ranges for use of the platinum group metal salts in the impregnation medium and so many migrate by wicking away from the target first catalyst washcoat zone. Since there is more control available of eventual alkaline earth metal location in the finished product where the alkaline earth metal component is present in a washcoat, which is then dried and calcined after coating, this alternative is preferred.

It will be understood that where a catalyst washcoat layer, e.g. the first catalyst washcoat layer, comprising one or more alkaline earth metal is applied in step (a) of the fourth invention aspect and which catalyst washcoat layer is itself impregnated with a solution in step (b) of the fourth invention aspect comprising one or more alkaline earth metal components, a composition of the resulting impregnated zone is a combination of the content of alkaline earth metal component in the underlying catalyst washcoat layer and in the impregnating solution.

The second catalyst washcoat zone can also comprise one or more alkaline earth metal component, preferably comprising barium. This may be derived from one or more first alkaline earth metal component, preferably barium, being present in the catalyst washcoat layer of the fourth invention aspect of step (a), e.g. the first catalyst washcoat layer, or where the composite oxidation catalyst comprises a third or fourth catalyst washcoat zone, the second catalyst washcoat layer. The one or more alkaline earth metal component present in the second catalyst washcoat layer may be referred to herein as one or more second alkaline earth metal component. The third and fourth catalyst washcoat layer may also include one or more second alkaline earth metal component, preferably barium.

The inventors have also found that there may be an advantage for improved exotherm generation at least from the first catalyst washcoat zone where there is a non-uniform distribution of the one or more platinum group metal component and/or the one or more first alkaline earth metal component in a direction perpendicular to the surface of the substrate. This is discussed in greater details under the heading below.

Refractory Metal Oxide Support Material

The first, second, third or fourth refractory metal oxide support material or the refractory metal oxide support material of the first and/or second catalyst washcoat layer is each generally selected from the group consisting of alumina, magnesia, silica, zirconia, titania, ceria and a composite oxide or a mixed oxide of two or more thereof. In principle any suitable refractory metal oxide support material may be used as the first refractory metal oxide support material. The support material of each of the first, second, third or fourth refractory metal oxide support material or the refractory metal oxide support material of the first or second catalyst washcoat layer can be the same as each other or different from each other. However, it will be appreciated that where the composite oxidation catalyst shown in FIG. 1 can be a single washcoat layer of length L impregnated at a first end to an axial length $L_1$ to define a first catalyst washcoat zone (1) and a second catalyst washcoat zone (2), the refractory metal oxide support material in the first and second catalyst washcoat zones will be the same.

Furthermore, in the embodiments comprising three and four catalyst washcoats zones shown in FIGS. 2-5 inclusive, if the refractory metal oxide support material(s) used in the first catalyst washcoat (6) is "X", because the first, second and (where present) fourth catalyst washcoat zones comprise a portion only of the whole length $L_3$ of the first catalyst washcoat layer (6), each of the first, second and (where present) fourth catalyst washcoat zones will each comprise the refractory metal oxide support material(s) "X", i.e. the first, second and (where present) fourth refractory metal oxide support material(s) will be the same. Similarly, where the second catalyst washcoat layer (7) in the embodiments shown in FIGS. 2-5 comprises refractory metal oxide support material(s) "Y", the third catalyst washcoat zone and where present the second or fourth catalyst washcoat zones which comprise overlap regions comprise a portion only of the whole length $L_4$ of the second catalyst washcoat layer (7) and so each of these zones will comprise the refractory metal oxide support material(s) "Y".

It is preferred that the refractory metal oxide support material is selected from the group consisting of alumina, silica, zirconia, ceria and a composite oxide or a mixed oxide of two or more thereof, most preferably selected from the group consisting of alumina, silica and zirconia and a composite oxide or a mixed oxide of two or more thereof. Mixed oxides or composite oxides include silica-alumina and ceria-zirconia, most preferably silica-alumina. Preferably, the refractory metal oxide support material does not comprise ceria or a mixed oxide or composite oxide including ceria. More preferably, the refractory oxide is selected from the group consisting of alumina, silica and silica-alumina. The refractory oxide may be alumina. The refractory oxide may be silica. The refractory oxide may be silica-alumina.

Because the first catalyst washcoat zone comprises one or more first alkaline earth metal component supported on the first refractory metal oxide support material, preferably the first refractory metal oxide support material of the first catalyst washcoat zone or the underlying catalyst washcoat, e.g. the first catalyst washcoat, comprises, or consists essentially of, alumina doped with a heteroatom component. The heteroatom component typically comprises silicon, manganese (see hereinbelow), magnesium, barium, lanthanum, cerium, titanium, or zirconium or a combination of two or more thereof. The heteroatom component may comprise, or consist essentially of, or consist of, an oxide of silicon, an oxide of manganese, an oxide of magnesium, an oxide of barium, an oxide of lanthanum, an oxide of cerium, an oxide of titanium or an oxide of zirconium. More preferably, the alumina doped with a heteroatom component is alumina doped with silica or alumina doped with magnesium oxide or alumina doped with manganese oxide. Even more preferably, the alumina doped with a heteroatom component is alumina doped with silica. Alumina doped with a heteroatom component can be prepared using methods known in the art or, for example, by a method described in U.S. Pat. No. 5,045,519.

The inclusion of a dopant may stabilise the refractory metal oxide support material or promote catalytic reaction of the supported platinum group metal. Typically, the dopant may be selected from the group consisting of zirconium (Zr), titanium (Ti), silicon (Si), yttrium (Y), lanthanum (La), praseodymium (Pr), samarium (Sm), neodymium (Nd), barium (Ba) and an oxide thereof. In general, the dopant is different to the refractory metal oxide (i.e. the cation of the refractory metal oxide). Thus, for example, when the refractory metal oxide is titania, then the dopant is not titanium or an oxide thereof.

When the refractory metal oxide support material is doped with a dopant, then typically the refractory metal oxide support material comprises a total amount of dopant of 0.1 to 10% by weight. It is preferred that the total amount of dopant is 0.25 to 7% by weight, more preferably 2.5 to 6.0% by weight. Preferably the dopant is silica, because oxidation catalysts comprising such support materials in combination with platinum group metals and alkaline earth metals promote oxidation reactions, such as CO and hydrocarbon oxidation.

When the refractory metal oxide support material is a silica-alumina, then generally the refractory oxide consists essentially of 20 to 95% by weight of alumina and 5 to 80% by weight of silica (e.g. 50 to 95% by weight alumina and 5 to 50% by weight silica), preferably 35 to 80% by weight of alumina and 20 to 65% by weight silica (e.g. 55 to 80% by weight alumina and 20 to 45% by weight silica), even more preferably 45 to 75% by weight of alumina and 25 to 55% by weight silica. Silica-aluminas having higher silica content, e.g. approximately 30% by weight silica content, can provide greater sulfur tolerance to the composite oxidation catalyst as a whole.

When the refractory oxide is ceria-zirconia, then generally the refractory oxide consists essentially of 20 to 95% by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia.

Typically, the first and second catalyst washcoat layers comprises an amount of the first refractory metal oxide support material of 6.1 to 213.6 g/L (0.1 to 3.5 g in$^{-3}$) (e.g. 15.3 to 183.1 g/L (0.25 to 3.0 g in$^{-3}$)), preferably 18.3 to 152.6 g/L (0.3 to 2.5 g in$^{-3}$), still more preferably 30.5 to 122.0 g/L (0.5 to 2.0 g in$^{-3}$), and even more preferably 36.6 to 106.8 g/L (0.6 to 1.75 g in$^{-3}$) (e.g. 45.8 to 91.5 g/L (0.75 to 1.5 g in$^{-3}$)).

In general, the refractory metal oxide support materials for use in the present invention is in particulate form. The first support material may have a $D_{90}$ particle size of ≤50 μm, preferably ≤30 μm, and more preferably ≤20 μm (as determined by conventional laser diffraction techniques). The particle size distribution of the refractory metal oxide support material is selected to aid adhesion to the substrate. The particles are generally obtained by milling.

Additionally, the or each support material in each of the first, second, third or fourth refractory metal oxide support material and/or the refractory metal oxide support material of the first or second catalyst washcoat may or may not comprise, or consist essentially of, a hydrocarbon adsorbent. The hydrocarbon adsorbent may be selected from a zeolite, active charcoal, porous graphite and a combination of two or more thereof. Where present, it is preferred that the hydrocarbon adsorbent is a zeolite, most preferably an aluminosilicate zeolite.

When the support material comprises a hydrocarbon adsorbent, then typically the total amount of hydrocarbon adsorbent is 3.1 to 183.1 g/L (0.05 to 3.00 g in$^{-3}$), particularly 6.1 to 1.22.0 g/L (0.10 to 2.00 g in$^{-3}$) (e.g. 12.2 to 48.8 g/L (0.2 to 0.8 g in$^{-3}$)).

When the hydrocarbon adsorbent is a zeolite, then preferably each zeolite is a medium pore zeolite (e.g. a zeolite having a maximum ring size of ten tetrahedral atoms) or a large pore zeolite (e.g. a zeolite having a maximum ring size of twelve tetrahedral atoms).

Examples of suitable zeolites or types of zeolite include faujasite (FAU), clinoptilolite, mordenite, silicalite (MFI), ferrierite, zeolite X (FAU), zeolite Y (FAU), ultrastable zeolite Y (FAU), AEI zeolite, ZSM-5 zeolite, ZSM-12 zeolite (MTW), ZSM-20 zeolite, ZSM-34 zeolite, CHA zeolite, SSZ-13 zeolite, SAPO-5 zeolite (AFI), offretite, a beta zeolite or a copper CHA zeolite. Where present, the zeolite is preferably ZSM-5 (a medium pore zeolite), a beta zeolite (a large pore zeolite) or a Y zeolite (a large pore zeolite). Where present, Y zeolite or Beta zeolite is preferred, with Beta zeolite being most preferred.

However, it is preferred according to the present invention that the oxidation catalyst (not including any phosphorus and/or zinc guard bed layer, for an explanation of which feature, see hereinbelow) does not comprise hydrocarbon adsorbents at all, particularly zeolites, because zeolites can be hydrothermally degraded during exotherm generation events, making their inclusion less desirable. The inclusion of hydrocarbon adsorbents in oxidation catalysts for heavy-duty vehicles is also less necessary because the exhaust gas temperatures emitted from heavy duty diesel engines rarely fluctuate in use below temperatures where hydrocarbon adsorption would be desirable to improve overall cycle hydrocarbon conversion.

Catalyst Washcoat Zone Length

In reference catalysts as is shown in FIG. 1 comprising two catalyst washcoat zones only, the length of the first catalyst washcoat zone can be <50%, preferably 20 to 40% of the total substrate length.

In embodiments of the invention comprising three or four catalyst washcoat zones, e.g. those shown in any one of FIGS. 2-5 inclusive, the length of the first washcoat zone can be 15 to 35% of the total substrate length (L).

In embodiments comprising three or four catalyst washcoat zones, e.g. those shown in any one of FIGS. 2-5 inclusive, the length of the overlap region of the first and second catalyst washcoat layers (6, 7), i.e. the length of the second catalyst washcoat zone in FIGS. 2 and 4 or the length of the fourth catalyst washcoat zone in FIGS. 3 and 5 can be 10-40%, preferably 10-30% of the total substrate length (L).

In embodiments comprising three or four catalyst washcoat zones, e.g. those shown in any one of FIGS. 2-5 inclusive, the length of the third catalyst washcoat zone can be 10 to 40% of the total substrate length (L), more preferably 15-35%, such as 20-30% of the total substrate length (L).

In embodiments comprising four catalyst washcoat zones, e.g. those shown in FIGS. 3 and 5, the second catalyst washcoat zone in FIGS. 3 and 5 can be 1-40%, preferably 5-30% of the total substrate length (L).

In a particularly preferred embodiment, the inlet catalyst washcoat layer 6 is coated on the substrate first to a length of approximately 80% L and then the outlet catalyst washcoat layer 7 is coated on the substrate to a length of approximately 50% L, i.e. overlapping catalyst washcoat layer 6 by 30% L. The length of the first washcoat zone can be 15 to 35% of the total substrate length (L).

Since substrate lengths can vary, it is generally more useful to refer to lengths of the first, second and, where present, third and fourth catalyst washcoat zones by their axial lengths relative to the total axial substrate length, i.e. as a percentage or fraction. Generally, substrates with application in the present invention are 7.62 to 15.24 cm (3 to 6 inches) in length inclusive, more typically 10.16 to 15.24 g/L (4 to 6 inches). It is possible, therefore, to refer to a washcoat layer length or a washcoat zone length by reference to the percentage zone length×the total substrate length (L).

Non-Uniform Distribution of Alkaline Earth Metal Component and/or Platinum Group Metal Component in Washcoat Layer This aspect is illustrated in FIGS. 6 and 7 and as briefly described in the description of the drawings hereinabove.

In the first invention aspect, the first catalyst washcoat zone can have a non-uniform distribution of one or more platinum group metal components and/or one or more first alkaline earth metal components in a direction perpendicular to the surface of the substrate as determined by electron probe microanalysis (EPMA), wherein a concentration of the one or more platinum group metal components and/or the first alkaline earth metal components decreases in a perpendicular direction toward the surface of the substrate as determined by EPMA.

It has been found that a non-uniform vertical distribution of one or more platinum group metal components and/or one or more first alkaline earth metal components can be achieved within a single layer. Thus, the benefits associated with layering to achieve a non-uniform vertical distribution of these components through the layers of the catalyst can be obtained by using a single layer or fewer layers.

In the composite oxidation catalyst of the invention, the first catalyst washcoat zone can have a non-uniform distribution of one or more platinum group metal components and/or one or more first alkaline earth metal components in a direction perpendicular to the surface of the substrate, optionally in a single layer, e.g. a catalyst washcoat layer, such as the first catalyst washcoat layer (i.e. the catalyst layer does not comprise a plurality of layers).

Preferably, the catalyst washcoat layer has a non-uniform distribution of the one or more platinum group metal components and/or one or more alkaline earth metal components throughout its thickness (i.e. the direction perpendicular to the surface of the substrate represents the thickness of the catalyst layer), most preferably both the one or more platinum group metal components and the one or more alkaline earth metal components.

Typically, the catalyst washcoat layer has a first surface and a second surface. Generally, the first surface is parallel (e.g. substantially parallel) to the second surface (i.e. the plane containing the first surface is parallel to the plane containing the second surface). The first surface and second surface are typically parallel to the surface of the substrate. Thus, the direction perpendicular to the surface of the substrate is also perpendicular to the first surface and/or the second surface.

The perpendicular distance between the first surface and the second surface is generally the thickness of the catalyst washcoat layer.

The first surface may be an exposed surface of the catalyst layer or an additional layer (e.g. second layer) may be disposed or supported on the first surface. The first surface is generally on the upper side (i.e. it is the top surface) of the catalyst layer. By exposed, it is meant that the first surface is not completely or substantially covered by another material and typically an exhaust gas passing through the catalyst comes into contact with the first surface before the second surface.

The second surface is not an exposed surface of the catalyst washcoat layer. Generally, the second surface is in direct contact with a surface of the substrate and/or a surface of another layer. Thus, the second surface is generally the underside (i.e. it is the bottom or lowest surface) of the catalyst washcoat layer.

Preferably, the amount of the one or more platinum group metal components and/or the one or more first alkaline earth metal components decreases in a perpendicular direction toward the surface of the substrate (i.e. the amount of the one or more platinum group metal components and/or the one or more first alkaline earth metal components decreases from the first surface to the second surface). The amount of the one or more platinum group metal components and/or the one or more first alkaline earth metal components may continuously decrease or discontinuously decrease, preferably continuously decrease, in a perpendicular direction toward the surface of the substrate. Thus, when, for example, the first catalyst washcoat zone comprises a single layer, which is a catalyst washcoat layer, then the amount of the one or more platinum group metal components and/or the one or more first alkaline earth metal components decreases from an exposed surface of the catalyst washcoat layer toward the surface of the substrate.

The catalyst washcoat layer may have a linear or non-linear rate of decrease in the amount of the one or more platinum group metal components and/or the one or more first alkaline earth metal components in a perpendicular direction toward the surface of the substrate (i.e. a linear or a non-linear rate of decrease in the amount of the first platinum group metal in a perpendicular direction from the first surface to the second surface).

Typically, at least 60% of the total amount of the one or more platinum group metal components and/or the one or more first alkaline earth metal components (e.g. of the catalyst washcoat layer) can be distributed between the first surface and a point or a plane in the catalyst washcoat layer that is half way between the first surface and the second surface (e.g. at 50% of the perpendicular distance between the first surface and the second surface). The plane is typically parallel to the first surface. The reference to "halfway between" in this context generally refers to the mean halfway distance between the first surface and the second surface. It is preferred that at least 70%, more preferably at least 75%, such as at least 80%, still more preferably at least 90%, of the total amount of the one or more platinum group metal components and/or the one or more first alkaline earth metal components (e.g. of the catalyst washcoat layer) can be distributed between the first surface and a point or a plane in the catalyst washcoat layer that is half way between the first surface and the second surface.

Generally, at least 60% of the total amount of the one or more platinum group metal components and/or the one or more first alkaline earth metal components (e.g. of the catalyst washcoat layer) can be distributed between the first surface and a point or a plane in the catalyst washcoat layer that is 25% of the perpendicular distance from the first surface to the second surface. The plane is typically parallel to the first surface. It is preferred that at least 70%, more preferably at least 75%, such as at least 80%, still more preferably at least 90%, of the total amount of the one or more platinum group metal components and/or the one or more first alkaline earth metal components (e.g. of the catalyst washcoat layer) can be distributed between the first surface and a point or a plane in the catalyst washcoat layer that is 25% of the perpendicular distance from the first surface to the second surface.

At least 60% of the total amount of the one or more platinum group metal components and/or the one or more first alkaline earth metal components (e.g. of the catalyst washcoat layer) can be distributed between the first surface and a point or a plane in the catalyst washcoat layer that is 10% of the perpendicular distance from the first surface to the second surface. The plane is typically parallel to the first surface. It is preferred that at least 70%, more preferably at least 75%, such as at least 80%, still more preferably at least 90%, of the total amount of the one or more platinum group metal components and/or the one or more first alkaline earth metal components (e.g. of the catalyst washcoat layer) can be distributed between the first surface and a point or a plane in the catalyst washcoat layer that is 10% of the perpendicular distance from the first surface to the second surface.

The non-uniform distribution of the first platinum group metal in a direction perpendicular to the surface of the substrate may, in general, be a gradated distribution of the one or more platinum group metal components and/or the one or more first alkaline earth metal components. Alternatively, the non-uniform distribution of the first platinum group metal in a direction perpendicular to the surface of the substrate may be a stepwise distribution of the one or more platinum group metal components and/or the one or more first alkaline earth metal components.

The catalyst washcoat layer may have a uniform horizontal distribution or a non-uniform horizontal distribution of the one or more platinum group metal components and/or the one or more first alkaline earth metal components.

Typically, the distribution of the one or more platinum group metal components and/or the one or more first alkaline earth metal components in a direction parallel to the surface of the substrate (i.e. a longitudinal plane) and perpendicular to a central longitudinal axis of the substrate (i.e. direction parallel to the inlet end face and/or the outlet end face of the substrate) is uniform or non-uniform. It is preferred that the distribution of the first platinum group metal in a direction parallel to the surface of the substrate and perpendicular to a central longitudinal axis of the substrate is uniform.

Generally, the distribution of the one or more platinum group metal components and/or the one or more first alkaline earth metal components in a direction parallel to the surface of the substrate (i.e. a longitudinal plane) and parallel to a central longitudinal axis of the substrate (i.e. direction perpendicular to the inlet end face and/or the outlet end face of the substrate) may be uniform or non-uniform. It is preferred that the distribution of the one or more platinum group metal components and/or the one or more first alkaline earth metal components in a direction parallel to the surface of the substrate and parallel to a central longitudinal axis of the substrate is uniform.

Methods of obtaining the non-uniform distribution of one or more platinum group metal components and/or the one or more first alkaline earth metal components in the first catalyst washcoat zone in a direction perpendicular to the surface of the substrate is regular heat drying of solute salt of one or more platinum group metal components impregnated into a washcoat coating comprising one or more platinum group metal and the first refractory metal oxide support material, wherein the one or more first alkaline earth metal components are present in the washcoat coating and/or as a solute salt in an impregnation medium with the solute salt of one or more platinum group metal components. Preferably, the first alkaline earth metal components are present in the washcoat coating onto which the one or more platinum group metal components are impregnated. Impregnation is a common general knowledge technique discussed e.g. at Chapter 2.3 of Heck et al., "Catalytic Air Pollution Control—Commercial Technology", third edition (2009), John Wiley & Sons, Inc. This reference chapter also discusses heat drying and calcination. The inventors found that an alternative drying method, freeze drying (see for example WO 2009/080155), which forms well dispersed alkaline earth metal particles in a direction perpendicular to the surface of the substrate, produces less useful exotherms. Further explanation can be found under the "Methods of Making" heading hereinbelow.

It is preferred that the alkaline earth metal is barium. We have found in using non-barium alkaline earth metals, e.g. as their acetates, that non-barium alkaline earth metal salts are less mobile in the drying step and so tend not to form such a non-uniform distribution as for alkaline earth metals salts such as strontium, calcium or magnesium. Applicant believes that the presence of platinum group metal, particularly palladium, and barium at the upper surface of the catalyst washcoat layer, e.g. in a so-called "crust" is beneficial to the exotherm generation function which is the primary intention of the composite oxidation catalyst of the present invention. Preferably, therefore, in addition to there being a non-uniform distribution of a barium component in a direction perpendicular to the surface of the substrate as determined by EPMA, wherein a concentration if the barium component decreases in a perpendicular direction toward the surface of the substrate, also the concentration of palladium decreases in a perpendicular direction toward the surface of the substrate.

Phosphorus and/or Zinc Guard Bed

As explained in the introduction to this specification, lubricants for heavy-duty vehicles have a relatively high content of additives comprising zinc and/or phosphorus. As a result, when in use, over a lifetime of vehicular use, catalysts in exhaust systems of heavy-duty vehicles are exposed to relatively high quantities of zinc and/or phosphorus compounds. Applicant's inventors analysed an oxidation catalyst which was the first catalysed substrate disposed in the exhaust system downstream of a vehicular Euro 6 heavy-duty diesel engine at end of vehicle life (about 1 million kilometres) and found between 1.0 and 1.5 wt. % phosphorus present on the oxidation catalyst in the first quarter of the coated substrate measured from the substrate inlet end.

In the present invention, the first catalyst washcoat zone has the highest loading of platinum group metal on the substrate and is present in the zone defined at the first substrate end corresponding to the inlet end when in use. According to the invention, the highest loading of platinum group metal in a platinum-rich combination of platinum and palladium is a key feature of the composite oxidation catalyst for generating an exotherm from increased quantities of hydrocarbon present in the exhaust gas. Therefore, the presence of the catalyst poisons zinc and/or phosphorus in exhaust gas entering the inlet end of the composite oxidation catalyst can have a disproportionate effect on reducing the activity of the catalyst to generate an exotherm from hydrocarbon, by requiring additional hydrocarbon to achieve a desired exotherm temperature, thus indirectly reducing vehicle fuel economy; and/or by increasing the hydrocarbon light-off temperature, i.e. the temperature at which the catalyst is active to begin oxidising hydrocarbons and so generating an exotherm relative to an oxidation catalyst homogenously coated with the same washcoat composition (see also Examples 4, 5 and 6 hereinbelow). Thus, hydrocarbons introduced into exhaust gas at relatively lower temperatures at which ordinarily it would be expected that a particular exotherm would be generated may result in a lower exotherm and increased hydrocarbon slip and so higher hydrocarbon emissions to atmosphere and/or hydrocarbon fouling of downstream exhaust system components or processes and/or an on-board diagnostic (OBD) failure mode.

Applicant's inventors have researched into ways of reducing or preventing the poisoning effects of phosphorus and/or zinc compounds on the composite oxidation catalyst function and have found that, by disposing a washcoat layer as an overlayer on the first catalyst washcoat zone at sufficient loading (correlating to a washcoat layer thickness), optionally wherein the washcoat contains a particulate metal oxide of sufficient mean pore size diameter and/or the resulting washcoat has sufficient mean interparticle pore size, contact by phosphorus and/or zinc compounds with the underlying first catalyst washcoat zone can be prevented or reduced and a higher proportion of fresh catalyst activity retained while the catalyst is in use than a catalyst without using such additional feature while retaining mass transfer access of exhaust gas to the underlying first catalyst washcoat zone.

Accordingly, in a preferred arrangement, the composite oxidation catalyst according to the first aspect of the invention comprises a washcoat overlayer extending axially from the first substrate end for protecting at least part of an underlying first catalyst washcoat zone from phosphorus and/or zinc poisoning when in use, which washcoat overlayer comprising a particulate metal oxide loading of ≥48.8 g/L (≥0.8 g/in³).

Applicant's research has found that the depth of the washcoat overlayer appears to be important for achieving the desired function as a guard bed for phosphorus and/or zinc compounds, because a relatively low loading of a washcoat overlayer of 30.5 g/L (0.5 g/in³) was found not to be as effective as a washcoat overlayer loading of 61.0 g/L (1.0 g/in³) (see Examples 4, 5 and 6 hereinbelow).

The washcoat overlayer may consist essentially of the particulate metal oxide, wherein the washcoat overlayer may comprise certain binders or additives to assist in processing e.g. powder flow, washcoat rheology modifiers etc. That is, although catalyst components such as barium or one or more platinum group metals may wick or migrate into the washcoat overlayer from an underlayer during manufacture of the composite oxidation catalyst, the particulate metal oxide is coated, e.g. in a washcoat, which does not include such metals and it is not intended that such metals should enter the washcoat overlayer. In this context, the term "consisting essentially" used hereinabove is intended to embrace an end-product wherein any such metals unintendedly migrate into the washcoat overlayer.

Typically, the washcoat overlayer has a loading of the particulate metal oxide of 48.8 to 213.6 g/L (0.8 to 3.5 g in preferably 54.9 to 152.6 g/L (0.9 to 2.5 g in$^{-3}$), still more preferably (1.0 to 2.0 g in$^{-3}$), such as 67.1 to 106.8 g/L (1.1 to 1.75 g in$^{-3}$).

Preferably the washcoat overlayer is coated directly on the washcoat of the first catalyst washcoat zone. However, it is within the scope of the present invention for there to be one or more washcoat layers in between the first catalyst washcoat zone and the washcoat overlayer of the preferred arrangement.

It will be appreciated that the application of the guard bed feature is generally applicable to all embodiments of the present invention and so is readily combinable with each and every embodiment of the present invention as indicated specifically in the embodiments disclosed in FIGS. 1 to 5 inclusive, as indicated by the optional dotted line feature "G".

The washcoat overlayer can comprise one or more of the following additional optional features:
  (a) the particulate metal oxide in the washcoat overlayer has a mean pore diameter of ≥10 nm and/or the washcoat overlayer has a mean interparticle pore diameter of ≥nm;
  (b) the particulate metal oxide in the washcoat overlayer is selected from the group consisting of alumina, silica, titania, zirconia, ceria and a mixed or composite oxide of any two or more thereof or an aluminosilicate zeolite. Preferably, the particulate metal oxide is a silica-doped alumina or an alumina having a mean pore diameter of ≥15 nm;
  (c) the particulate metal oxide in the washcoat overlayer has a specific surface area of >100 m²/g;
  (d) the washcoat overlayer extends axially for up to 150% of the axial length of the underlying first catalyst washcoat layer from the first substrate end in order thereby to protect it from phosphorus and/or zinc poisoning when in use in an exhaust system of a heavy-duty diesel engine, preferably for >50% of the axial length of the underlying first catalyst washcoat zone, such as >60%, >70%, >80%, >90% or >100% or up to 120% of the axial length thereof; and
  (e) the particulate metal oxide in the washcoat overlayer supports a platinum group metal, which is platinum or a combination of platinum and palladium at a Pt:Pd weight ratio of ≥1:1, optionally wherein the platinum group metal loading in the washcoat overlayer is 0.035 to 1.236 g/L (1-35 gft$^{-3}$). The platinum group metal is intentionally introduced into the washcoat overlayer.

The particulate metal oxide can have one or both of a mean pore diameter and an interparticle pore diameter of ≥10 nm. Preferably the mean pore diameter or the interparticle pore diameter is ≥12 nm or ≥15 nm. Applicant has found that certain parameters of particulate metal oxides can undesirably reduce the hydrocarbon oxidation activity of the underlying first catalyst washcoat zone. Thus, when Applicant tested colloidal silica (Ludox™) as a possible particulate metal oxide for use in the washcoat overlayer, it was found that the washcoat layer was insufficiently porous and permeable sufficiently to maintain the oxidation function of the underlying first catalyst washcoat layer. That is, the hydrocarbon oxidation in the composite oxidation catalyst including the colloidal silica as the particulate metal oxide was gas mass transfer limited. Although a lower loading of colloidal silica could have improved mass transfer, the protection effect of the washcoat overlayer was expected to be insufficient (cf. the washcoat loading limitation of ≥48.8 g/L (≥0.8 g/in³) discussed hereinabove). Therefore, in order to better maintain the primary hydrocarbon oxidation function of the composite oxidation catalyst, the particulate metal oxide has a mean pore diameter of ≥10 nm and/or the washcoat overlayer has a mean interparticle pore diameter of ≥10 nm.

In embodiments featuring the washcoat overlayer without the supported platinum group metal, Applicant's inventors have found that certain particulate metal oxides having relatively low mean pore diameter, e.g. particulate ceria having a fresh mean pore diameter of 8 nm, can be efficacious in the present invention. However, preferably, the particulate metal oxide in the washcoat overlayer has a mean pore diameter of ≥10 nm and/or the washcoat overlayer has a mean interparticle pore diameter of ≥10 nm, preferably a mean pore diameter of ≥10 nm. That is, a particulate metal oxide e.g. a ceria material, which has an intrinsically low mean pore diameter may find application in the present invention by appropriate particle size distribution selection (see also hereinbelow) so that the mean interparticle pore diameter in the washcoat layer is ≥10 nm.

The mean interparticle pore diameter of a washcoat overlayer can be determined by mercury porosimetry.

The mean pore diameter of a particulate metal oxide can be determined by N$_2$ adsorption-desorption isotherms using the Barrett-Joyner-Halenda (BJH) methodology.

Where a particulate metal oxide has a bimodal pore diameter, the requirement is met where at least one of the two modes is at above a particle diameter of ≥10 nm. For the avoidance of doubt, the preferred particulate refractory metal oxide alumina doped with silica meets at least the general definition in this paragraph.

Aluminosilicate zeolites generally do not meet the requirement of a mean pore diameter of ≥10 nm. The feature that an interparticle pore diameter of ≥10 nm can be obtained by appropriate selection of particle size, i.e. particle size distribution. As explained hereinabove in connection with colloidal silica, where the particles of the washcoat are too fine, the interparticle pores are too small to maintain mass transfer of exhaust gas with the underlying first catalyst washcoat layer. By appropriate selection of particle size, it is possible to obtain interparticle pores between particles of appropriate size to meet the preferred condition of an interparticle pore diameter of ≥10 nm.

For example, the particles of the particulate metal oxide may have a D90 of <100 micron. The particles of the particulate metal oxide may preferably have a D90 of <75 micron, such as <50 micron (e.g. <30 micron), and more preferably <20 micron, such as <15 micron. When the refractory oxide has a smaller D90 better packing and adhesion can be obtained.

As is known in the art, the D90 is a value of the particle size at which 90% of the particles in a distribution have a particle size below this value. For the avoidance of doubt, d90 measurements can be obtained by Laser Diffraction Particle Size Analysis using a Malvern Mastersizer 2000™, which is a volume-based technique (i.e. D90 may also be referred to as Dv90 (or D(v, 0.90)) and applies a mathematical Mie theory model to determine a particle size distribution.

Typically, the particles of the particulate metal oxide have a D90 of >0.1 micron. It is preferred that the particles of the particulate metal oxide have a D90 of >1.0 micron, such as >5.0 micron.

Particulate metal oxides that meet the required conditions for use in the guard bed washcoat overlayer according to the preferred arrangement and have application in the present invention include alumina, silica, titania, zirconia, ceria and a mixed or composite oxide of any two or more thereof, such as silica-doped titania, ceria-zirconia mixed oxide, the preferred silica-doped alumina or an aluminosilicate zeolite. For example, the particulate metal oxide may be selected from the group consisting of alumina, ceria, silica doped-alumina, titania-alumina, zirconia-alumina, ceria-alumina, ceria-zirconia-alumina, silica-titania, silica-zirconia, zirconia-titania, ceria-zirconia and alumina-magnesium oxide. Preferably, the particulate metal oxide is selected from the group consisting of alumina, silica doped-alumina, titania-alumina, zirconia-alumina, silica-titania, silica-zirconia, zirconia-titania and alumina-magnesium oxide, i.e. the particulate metal oxide does not include cerium as discussed hereinabove.

The particulate metal oxide may optionally be doped (e.g. with a dopant). The dopant may be selected from the group consisting of zirconium (Zr), titanium (Ti), silicon (Si), yttrium (Y), lanthanum (La), praseodymium (Pr), samarium (Sm), neodymium (Nd) and an oxide thereof. The inclusion of a dopant can thermally stabilise the particulate metal oxide. It is to be understood that any reference to "doped" in this context refers to a material where the bulk or host lattice of the particulate metal oxide is substitution doped or interstitially doped with a dopant. In some instances, small amounts of the dopant may be present at a surface of the particulate metal oxide. However, most of the dopant will generally be present in the body of the particulate metal oxide.

When the particulate metal oxide is doped, the total amount of dopant is 0.5 to 15% by weight, preferably 1 to 10% by weight (e.g. about 5% by weight) of the particulate metal oxide. A preferred particulate metal oxide is the refractory metal oxide alumina doped with silica, which can meet the requirement of having a mean pore diameter of ≥10 nm and also can have a specific surface area ≥about 120 m²/g (see hereinbelow).

In embodiments wherein the particulate metal oxide comprises aluminosilicate zeolite, examples of suitable zeolites or zeolite framework types include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-13 zeolite, offretite, a beta zeolite or a copper CHA zeolite. The zeolite is preferably ZSM-5, a beta zeolite or a Y zeolite. The aluminosilicate zeolite can include one or more base metals, such as at least one of copper, iron or manganese. For example, where the aluminosilicate zeolite is has the CHA framework type code, the CHA can be promoted with copper. Alternatively, the aluminosilicate zeolite can be intended to be free-from base metals.

The particulate metal oxide can be a refractory metal oxide, a term which—according to the definition used in the present application—excludes aluminosilicate zeolites.

A particularly preferred particulate metal oxide for use in the present invention is the refractory metal oxide silica doped with alumina within the total amount of silica dopant disclosed hereinabove comprising no intended precious metal including platinum group metal. An alumina having a mean pore size of ≥15 nm is also preferred. Such materials are referred to herein as "wide pore aluminas" and are known e.g. from EP1077769 A1.

The specific surface area of the particulate metal oxide is also believed to be important because the higher the specific surface area of the particulate metal oxide component, the greater the expected capacity of the washcoat overlayer to adsorb, e.g. glassy zinc phosphate compounds derived from the lubricant additives.

The particles of the particulate metal oxide for use in the washcoat overlayer of the fresh composite oxidation catalyst according to the invention have a mean specific surface area (SSA)≥about 100 m²/g (>about 100 m²/g), preferably ≥about 120 m²/g (>about 120 m²/g), such as ≥about 150 m²/g (>about 150 m²/g), ≥about 180 m²/g (>about 180 m²/g) or ≥about 200 m²/g (>about 200 m²/g). Generally, aluminosilicate zeolites have SSAs at above ≥about 200 m²/g.

The mean specific surface area (SSA) of the particles of the refractory oxide can be determined by nitrogen physisorption at −196° C. using the volumetric method. The mean SSA is determined using the BET adsorption isotherm equation.

In preferred embodiments. the particulate metal oxide in the washcoat overlayer supports a platinum group metal, which is platinum or a combination of platinum and palladium at a Pt:Pd weight ratio of ≥1:1. It will be understood that a Pt:Pd weight ratio of 1:0, i.e. Pt only, falls within the scope of the range "≥1:1".

Preferably, the platinum group metal loading in the washcoat overlayer is 0.035 to 1.236 g/L (1 to 35 gft$^{-3}$), preferably 0.088 to 0.883 g/L (2.5 to 25 g/ft$^{-3}$), such as 0.177 to 0.618 g/L (5 to 17.5 gft$^{-3}$).

Manganese Addition to Outlet Catalyst Washcoat Layer for Improved NO$_2$ Management and Exotherm Behaviour During research into the development of the four-zone composite oxidation catalyst shown in FIG. 5, Applicant has found that manganese added to the third catalyst washcoat zone defined at a second end thereof by the second (i.e. outlet) substrate end as part of the second catalyst washcoat layer (7) applied from a second (outlet) substrate end can beneficially promote exotherm generation and/or avoid generated exotherm extinction during active filter regeneration, enhance the activity of a downstream SCR catalyst to reduce oxides of nitrogen (NO$_x$) to N$_2$ and/or improve nitrogenous reductant injection management for use in the downstream SCR catalyst. These observations can be applied equally inter alia to three- and four-zone composite oxidation catalysts according to the invention.

With regard to enhancing the activity of a downstream SCR catalyst to reduce $NO_x$ to $N_2$, as described hereinabove, it is known that, in an exhaust gas comprising both nitrogen monoxide and nitrogen dioxide, SCR catalysis proceeds via a combination of SCR reactions comprising reactions (1)-(3) inclusive, all of which reduce NOx to elemental nitrogen ($N_2$).

A relevant undesirable, non-selective side-reaction is according to reaction (4):

$$2NH_3 + 2NO_2 \rightarrow N_2O + 3H_2O + N_2 \quad (4)$$

In practice, reactions (1)-(3) inclusive occur simultaneously, with the dominant reaction being that which is favoured inter alia according to the kinetics of the reaction and the relative concentrations of the reactants. Kinetically, reaction (2) is relatively slow compared with reaction (1), and reaction (3) is quickest of all. Therefore, according to this chemistry, SCR catalysis operates most efficiently where the $NO_2/NO_x$ ratio in the exhaust gas entering the downstream SCR catalyst is approximately 0.5, i.e. a ratio of 1:1 $NO:NO_2$, according to reaction (3).

Applicant's researchers have found that by including manganese in the third catalyst washcoat zone of the composite oxidation catalyst shown in FIG. 5 as part of the second catalyst washcoat layer (7), peak passive NO oxidation activity, i.e. NO oxidation activity taking place between active exotherm/regeneration events, can be suppressed. "Peak passive NO oxidation activity" is illustrated by the values in the "Fresh $NO_2/NOx$ at 300° C. (%)" column of Tables 7 and 8.

By suppressing peak oxidation activity using manganese, Applicant's researchers found that $NO_2/NO_x$ for a "fresh" and "aged" composite oxidation catalyst can be moderated for a significant portion of a vehicle's useful life to a more stable 0.55 to 0.45, i.e. a "sweet-spot" for performing reaction (3) on a downstream SCR catalyst, instead of the kinetically slower, less efficient $NO_x$ reduction reaction (2). If the activity of the fresh catalyst passively to oxidise NO is too high, peak $NO_2/NO_x$ content in the exhaust gas can be increased to in excess of 0.65, not only pushing the exhaust gas composition away from the preferred $NO:NO_2$ ratio of 1:1 to promote reaction (3) in a downstream SCR catalyst, but, secondly, also promoting the slowest reaction (2). Furthermore, excess $NO_2$ can undesirably lead to the formation of $N_2O$ according to reaction (4).

On improving nitrogenous reductant injection management for use in a downstream SCR catalyst, Applicant's researchers also found that where the third zone comprised manganese, the difference (delta) between the fresh and aged passive NO oxidation activity of the composite oxidation catalyst as a whole was reduced (see the results presented in Tables 7 and 8). That is, the resulting $NO_2/NO_x$ value in the exhaust gas downstream of the composite oxidation catalyst was more predictable over the lifetime of the vehicle exhaust system as the catalyst starts fresh and becomes steadily aged through use. In practice, this observation is significant because the SCR catalytic reaction generally requires the provision of a nitrogenous reductant (see reactions (1) to (3) hereinabove). Typically, this nitrogenous reductant is ammonia ($NH_3$), which is carried on a vehicle in the form of a precursor, urea, for delivery into a flowing exhaust gas via an injector. In contact with hot exhaust gas, the urea decomposes to ammonia and water vapour. It can be seen from reactions (1) to (3) that, depending on what reaction is dominant at any particular time, subtly different quantities of ammonia nitrogenous reductant are required to achieve the most efficient reduction of total $NO_x$ if $NH_3$ slip is to be avoided.

An additional level of complexity is that the ability of an oxidation catalyst to oxidise NO to $NO_2$ generally diminishes over time through use; so-called "ageing". This loss of activity over time leads to increased burden in designing control systems for delivering nitrogenous reductant because the gradual loss in activity will need to be compensated for in system program algorithms. However, by lowering the delta between fresh and aged NO oxidation activity, in addition to suppressing higher NO oxidation activity thereby "focusing" $NO_2/NO_x$ to around 0.5 as described hereinabove, it should be less complicated for a heavy-duty diesel vehicle manufacturers to manage system programming control of nitrogenous reductant injection over the lifetime of a vehicle.

Thirdly, and very surprisingly, as shown in Example 9 hereinbelow, Applicant's researchers found that the inclusion of manganese in the third washcoat zone/second washcoat layer can beneficially promote exotherm generation and/or avoid generated exotherm extinction during active filter regeneration. This observation could allow for the functionality of the composite oxidation catalyst to be maintained while exchanging lower cost base metal, i.e. manganese, for significantly higher cost platinum group metals.

In exhaust system after-treatment, manganese can be affected by sulphur poisoning. Palladium is also known to suffer from palladium poisoning. For this reason, it may be preferable to avoid including palladium in addition to the manganese in the manganese-containing catalyst washcoat layer and/or zone. However, as mentioned hereinabove, palladium at relatively low content can improve the stability of the platinum component in the zone. In this regard, it is preferred for the manganese-containing catalyst washcoat layer and/or zone to contain a platinum-rich weight ratio of Pt:Pd, e.g. ≥10:1, or else the one or more platinum group metals in the manganese-containing catalyst washcoat layer and/or zone can consist essentially of, or consist of, platinum (e.g. a Pt:Pd weight ratio of 1:0).

To benefit from the described technical effects of manganese inclusion, a platinum group metal loading in the manganese-containing catalyst washcoat layer and/or zone is preferably ≥0.071 g/L (≥2 gft$^{-3}$), preferably 0.177 to 0.530 g/L (5 to 15 gft$^{-3}$), such as 0.247 to 0.459 g/L (7 to 13 gft$^{-3}$).

Additionally, Applicant has found that the technical effect of manganese-reduced fresh-to-aged NO oxidation-to-$NO_2$ "delta" can be enhanced by appropriate selection of refractory metal oxide support material in the catalyst washcoat zone defined at a second end thereof by the second substrate end, e.g. the third catalyst washcoat zone, and/or in the second catalyst washcoat layer.

In this regard, Applicant noticed a benefit for alumina doped with a heteroatom support materials, wherein preferably the heteroatom is silicon and/or manganese; or is a mixed magnesium aluminium metal oxide. The manganese can be present as the heteroatom as such and/or introduced as a soluble salt in combination with a washcoat refractory metal oxide support material, such as the mixed magnesium aluminium metal oxide or silica-doped alumina support material, e.g. as manganese nitrate, followed by precipitation onto the support material using a reducing agent such as using citric acid, tetrabutylammonium hydroxide, formic acid, ascorbic acid etc. A refractory metal oxide support comprising doped manganese can in turn be impregnated with additional manganese.

Accordingly, the refractory metal oxide support material in a manganese-containing zone or layer can comprise alumina doped with silica, alumina doped with manganese, alumina doped with both silica and manganese, a mixed magnesium aluminium metal oxide or a "pre-formed" mixed magnesium aluminium metal oxide doped with manganese. The impregnated manganese component can be supported on the refractory metal oxide support material.

The mixed magnesium aluminium metal oxide can have a pre-calcined magnesium content, calculated as Mg, of less than or equal to 15 wt %, e.g. 0.1 to 12 wt. % or 2.0 to 10 wt. %. The calcined support material comprising mixed magnesium aluminium metal oxide can comprise a magnesium deficient, i.e. non-stoichiometric, spinel. Most preferably, the manganese-containing refractory metal oxide support material is the "pre-formed" mixed magnesium aluminium metal oxide doped with manganese. The amount of manganese dopant in the manganese-doped magnesium aluminium metal oxide can be 1-15 wt % calculated as $MnO_2$. Example 8 shows that samples comprising manganese-doped magnesium aluminium metal oxide showed a surprising improvement in exotherm generation from lower temperature as demonstrated by the "continuous exotherm" test, in addition to a reduced $NO_2/NO_x$ "delta" between fresh and aged catalysts.

Substrate

Substrates for carrying catalyst washcoat layer and catalyst washcoat zone components of the composite oxidation catalyst of the present invention are well known in the art. Generally, the substrate is made from a ceramic material or a metallic material.

It is preferred that the substrate is made or composed of cordierite ($SiO_2$—$Al_2O_3$—$MgO$), silicon carbide (SiC), aluminium titanate (AT), Fe—Cr—Al alloy, Ni—Cr—Al alloy, or a stainless-steel alloy.

Typically, the substrate is a monolith, i.e. a monolith substrate. It is preferred that the monolith is a flow-through honeycomb monolith substrate or a filtering monolith substrate, most preferably a honeycomb flow-through monolith substrate.

It is preferred that the composite oxidation catalyst of the invention is for use as a diesel oxidation catalyst (DOC) or a catalysed soot filter (CSF). In practice, catalyst formulations employed in DOCs and CSFs are similar. Generally, however, a principle difference between a DOC and a CSF is the substrate onto which the catalyst formulation is coated and the amount of platinum group metal in the coating.

A flow-through monolith typically comprises a honeycomb monolith (e.g. a metal or ceramic honeycomb monolith) having a plurality of channels extending therethrough, which channels are open at both ends. When the substrate is a flow-through monolith, then the composite oxidation catalyst of the invention is typically called a diesel oxidation catalyst (DOC) or is for use as a diesel oxidation catalyst (DOC).

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channel and the outlet channels have a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard. When the substrate is a filtering monolith, then the oxidation catalyst of the invention is typically a catalysed soot filter (CSF) or is for use as a catalysed soot filter (CSF).

In principle, the substrate may be of any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

Heavy-Duty Engines

For the avoidance of doubt, heavy-duty engines according to the second aspect of the invention are according to European legislation. For the further avoidance of doubt, heavy-duty engines for use in the present invention are not managed to operate a lean/rich cycle suitable for normal operation or desulfation of a LNT catalyst. In preferred arrangements, the exhaust system according to the invention does not include a LNT.

The heavy-duty compression ignition engine according to the second aspect of the present invention is preferably a diesel engine, optionally a compressed natural gas (CNG) engine. The heavy-duty diesel engine may be a homogeneous charge compression ignition (HCCI) engine, a pre-mixed charge compression ignition (PCCI) engine or a low temperature combustion (LTC) engine. It is preferred that the diesel engine is a conventional (i.e. traditional) diesel engine.

Methods of Making

Methods for making the oxidation catalyst of the invention are known in the art. See, for example, our WO 99/47260, WO 2007/077462 and WO 2011/080525. Similarly, the conditions for drying and calcining a washcoat are also well known.

As mentioned hereinabove, according to the first invention aspect, the oxidation catalyst comprises three or more catalyst washcoat zones, preferably four catalyst washcoat zones.

A method of making such a catalyst is according to the fourth invention aspect, wherein in step (a) the catalyst washcoat layer is a first catalyst washcoat layer which extends from the first substrate end to less than the total length of the substrate, which method further comprising a step (a') before step (a) or after step (a) but in either case before step (b) of applying a second catalyst washcoat layer to the substrate for a length extending from the second substrate end to less than the total length of the substrate, such that the first catalyst washcoat layer in part overlaps the second catalyst washcoat layer or the second catalyst washcoat layer in part overlaps the first catalyst washcoat layer, wherein the second catalyst washcoat layer comprises a refractory metal oxide support material and one or more platinum group metal component.

In this regard, preferably, the first catalyst washcoat layer can extend from the first substrate end and the second catalyst washcoat layer extends from the second substrate end, whereby the second catalyst washcoat layer in part overlaps the first catalyst washcoat layer.

In embodiments, this method can result in arrangements such as those shown in FIGS. 4 and 5, i.e. depending on the axial length of application of the second catalyst washcoat layer in step (a'), and so the axial length of an overlap of the first catalyst washcoat layer and the second catalyst washcoat layer, the first catalyst washcoat zone comprises a single layer of the first catalyst washcoat supported on the substrate surface. Depending on the axial length of application $L_1$ in step (b), the second or fourth catalyst washcoat zone can comprise the overlap of the first catalyst washcoat layer and the second catalyst washcoat layer. The third catalyst washcoat zone comprises a single washcoat layer supported on the substrate surface defined at a second end thereof by the second substrate end and at a first end thereof by a second end of the first catalyst washcoat layer, i.e. at a point where the second layer extending from the second substrate end in the direction of the first substrate end begins to overlap the first catalyst washcoat layer. Generally, the first end of the third catalyst washcoat zone is the second end of the second or fourth catalyst washcoat zone.

This arrangement is preferred because exhaust gas entering the oxidation catalyst of the invention at the first, inlet substrate end generally comes into contact with the overlap region catalyst washcoat zone before the third catalyst washcoat zone. The overlap catalyst washcoat zone (depending on the embodiment, either the second or fourth catalyst washcoat zone) acts as a "stabilizer" for the first catalyst washcoat zone. The overlap region catalyst washcoat zone acts as a "stabilizer" in the sense that it performs some or all of the oxidation reactions of the first catalyst washcoat zone, but the overlap region catalyst washcoat zone may have a higher light off temperature for HC and/or CO than that of the first catalyst washcoat zone.

It will be appreciated that in the fourth aspect of the invention, because the first catalyst washcoat zone is obtained in step (b) by impregnating the catalyst washcoat applied in step (a) that the refractory metal oxide support material in the first catalyst washcoat zone can be the same refractory metal oxide support material in the catalyst washcoat, e.g. the first catalyst washcoat layer, applied in step (a).

A first catalyst washcoat zone having a non-uniform distribution of one or more platinum group metal components and optionally one or more first alkaline earth metal components in a direction perpendicular to the surface of the substrate as determined by electron probe microanalysis (EPMA), wherein a concentration of the one or more platinum group metal components and optionally the first alkaline earth metal components decreases in a perpendicular direction toward the surface of the substrate as determined by EPMA, can be obtained, in general, by a method wherein one or more platinum group metal components and/or one or more first alkaline earth metal components does not fix rapidly to the refractory metal oxide support material and which is mobile within a drying washcoating. A washcoating containing one or more platinum group metal components can be applied to a substrate followed by a heat drying step and a calcination step using the conditions that allow movement of one or more platinum group metal components and optionally one or more first alkaline earth metal components within the coating before it is fixed into position. Such conditions are known in the art, particularly because conditions in the prior art are normally selected to rapidly fix the components of the coating (i.e. washcoat coating) to prevent their movement within the coating. That is, if there is an awareness of rapid fixing conditions to avoid movement of platinum group metal salts within a drying washcoat, by implication there is a recognition of conditions that allow for such movement.

The transfer of solutes to or away from a wet surface during evaporation is an effect that is known in other technical fields. The transfer of the first platinum group metal (i.e. a platinum group metal salt and/or an alkaline earth metal salt) within a wet coating can be represented by Richards' equation:

$$\frac{\partial \theta}{\partial t} = \frac{\partial}{\partial z}\left[K(\theta)\left(\frac{\partial \psi}{\partial z}\right) + 1\right]$$

wherein:
t is the time (e.g. the time before substantial or complete evaporation of the solvent (i.e. water)); θ is the solvent (i.e. water) content, typically of the coating; K is the hydraulic conductivity; z is the elevation; and ψ is the pressure head. The hydraulic conductivity can be approximated by the hydraulic conductivity of the first support material and/or any other support material that may be present.

A method of achieving a catalyst washcoat zone having a non-uniform distribution of one or more platinum group metal components and/or one or more first alkaline earth metal components in a direction perpendicular to the surface of the substrate comprises:
(a) providing an aqueous slurry comprising a refractory metal oxide support material, one or more platinum group metal components and optionally one or more alkaline earth metal components;
(b) applying the aqueous slurry onto a substrate to form a washcoating; and
(c) drying and calcining the washcoating, wherein the drying conditions allow at least the one or more platinum group metal components and optionally one or more alkaline earth metal components to flow toward or away from the substrate, such as to obtain a non-uniform distribution of the one or more platinum group metals and optionally one or more alkaline earth metal components in a direction perpendicular to a surface of the substrate.

The washcoating can comprise two or more platinum group metal components, wherein a first platinum group metal component can be referred to as a first platinum group metal component and a second platinum group metal component can be referred to as a second platinum group metal component.

Normally, at least one of the refractory metal oxide support material, the first platinum group metal component and the second platinum group metal component is insoluble. However, it is to be understood that the slurry may comprise a solution, such as when one or more precursors of the refractory metal oxide support material, a first platinum group metal component and a second platinum group metal component are all soluble (i.e. dissolved).

Typically, the refractory metal oxide support material precursor is a compound that undergoes conversion into the refractory metal oxide support material after drying and/or calcining the coating. Such refractory metal oxide support material precursors are well-known in the art and include, for example, boehmite as a precursor of gamma-alumina.

Generally, the first platinum group metal component is a salt of the first platinum group metal or is the first platinum group metal (i.e. it is the first platinum group metal as such). Preferably, the first platinum group metal component is a salt of the first platinum group metal. The salt of the first platinum group metal may be a nitrate salt of the first platinum group metal, an acetate salt of the first platinum group metal or a carboxylate salt (e.g. citrate salt) of the first platinum group metal.

The second platinum group metal component typically is a salt of the second platinum group metal or is the second platinum group metal (i.e. it is the second platinum group metal itself). It is preferred that the second platinum group metal component is a salt of the second platinum group metal. The salt of the second platinum group metal may be a nitrate salt of the second platinum group metal, an acetate salt of the second platinum group metal or a carboxylate salt (e.g. citrate salt) of the second platinum group metal.

When two or more different platinum group metals are used (e.g. the first platinum group metal is different from the second platinum group metal), then there may be a difference in the mobility of the first platinum group metal component compared with the second platinum group metal component that results from the difference in metals that are present that results in a different distribution profile of each platinum group metal relative the (or each) other platinum group metal in a washcoat layer (see FIG. 6). The same applies to the differential mobility of alkaline earth metal relative to one or more platinum group metal components present in a catalyst washcoat layer. It is possible to vary the mobility, and also the preferred perpendicular direction of flow within a catalyst washcoat layer, of the platinum group metal components by selecting an appropriate anion when the platinum group metal component is a salt of a platinum group metal. The platinum group metal components may also interact differently with the refractory metal oxide support material and may be selected on this basis. Similarly, it is possible to vary the mobility of alkaline earth metal components by appropriate selection of solute salt thereof, within a catalyst washcoat layer.

It is preferred that a counter-anion of the salt of the first platinum group metal is different to a counter-anion of the salt of the second platinum group metal. For example, the first platinum group metal component may be palladium nitrate and the second platinum group metal component may be a platinum carboxylate salt. The nitrate anion is different to the carboxylate anion.

The mobility of at least one of the platinum group metal components can be altered by supporting it on a support material (i.e. pre-fixing the platinum group metal component) before mixing with the other platinum group metal component. For example, the pre-fixed first platinum group metal/first refractory metal oxide support material may be mixed with a second refractory metal oxide support material and aqueous second platinum group metal salt and optionally an aqueous salt of one or more alkaline earth metals.

One way that the first platinum group metal component may be supported on the first refractory metal oxide support material precursor is by: (i) mixing a first refractory metal oxide support material precursor and a first platinum group metal component in solution, preferably to impregnate, or fill the pores of, the final first refractory metal oxide support material; and (ii) drying and/or calcining the aqueous solution to provide a first platinum group metal component (e.g. first platinum group metal) supported on the first refractory metal oxide support material. Step (i) may be followed by a step (i)(a) of adding a reducing agent to reduce the first platinum group metal component, preferably to impregnate, or fill the pores of, the first support material. In step (i) and/or (i)(a), it is preferred that the only platinum group metal component present is the first platinum group metal component.

Thus, step (a) of the above method may be a step of (a) providing an aqueous slurry comprising a second platinum group metal component and a first platinum group metal component supported on a first support material precursor.

With regard to step (b), methods for applying slurries or washcoats to a substrate are well known in the art (see for example Applicant's WO 99/47260).

In one embodiment, step (c) involves drying the coating using drying conditions that allow at least the first platinum group metal component and the second platinum group metal component to flow at different rates to one another in a direction perpendicular to a plane representing a substrate surface. In another embodiment, step (c) involves drying the coating using drying conditions that allow only the first platinum group metal component to flow toward or away from the substrate.

Step (c) determines the point at which the platinum group metal components are fixed, usually on to the substrate or a refractory metal oxide support material. The drying conditions that are used will depend on the identity of the materials (e.g. the platinum group metal components, the alkaline earth metal components, the refractory metal oxide support materials etc.) that are present in the coating and the size of the oxidation catalyst (e.g. the size of the substrate, which will vary depending on the application of the catalyst).

Typically, the drying conditions involve drying the coating for at least 15 minutes, preferably at least 20 minutes. A non-uniform distribution of the first platinum group metal and optional alkaline earth metal may be obtained using such conditions. Uniform distributions tend to be obtained when the drying time is about 5 minutes or less.

The coating may then be calcined at a temperature of 400 to 800° C., preferably 450 to 600° C., more preferably a temperature of at least 500° C.

As an example, it has been found that where a first catalyst washcoat layer comprises a first loading and weight ratio of platinum to palladium as the two or more platinum group metal components and the one or more alkaline earth metal component is barium, wherein both the platinum group metals and the barium are supported on a refractory metal oxide support material which is alumina doped with silica at a preferred silica content, and such first catalyst washcoat layer is impregnated with an aqueous solution of relatively high concentration platinum and palladium salts to form the first catalyst washcoat zone following application of the drying methods described hereinabove, palladium and barium migrate more readily to the exposed catalyst washcoat layer surface and are observed as a "crust" under EPMA. Without having been pre-fixed to the underlying refractory metal oxide support material, the platinum component shows some mobilisation towards the same exposed surface within the cross-section of the first catalyst washcoat layer, remains relatively more evenly distributed across the cross-section of the first catalyst washcoat layer than the palladium and the barium. The finished product has been found to demonstrate beneficial activity towards exotherm generation. This effect is also shown in part in Example 2 hereinbelow.

Exhaust Systems

Exhaust systems for use in the second aspect of the invention comprise a composite oxidation catalyst according to the invention and a soot filter substrate disposed downstream thereof, wherein the first substrate end of the composite oxidation catalyst is oriented to an upstream side.

The soot filter substrate may be—and typically is—coated with a catalyst formulation.

The catalyst formulation of the soot filter may be suitable for oxidising: (i) particulate matter (PM) and/or (ii) carbon monoxide (CO) and hydrocarbons (HCs). When the catalyst formulation is suitable for oxidising PM, then the resulting emissions control device is known as a catalysed soot filter (CSF). Typically, the catalyst formulation of a CSF comprises a platinum group metal, such as a first platinum group metal and/or a second platinum group metal as defined above.

SCR catalysts are also well known in the art and can be coated on a flow-through substrate or a filtering substrate, such as a wall-flow filter substrate. When the exhaust system for use in the second aspect of the invention comprises an SCR catalyst e.g. coated on a flow-through substrate monolith, then the exhaust system may further comprise an injector for injecting a nitrogenous reductant, such as ammonia or urea, into exhaust gas downstream of the catalyst for oxidising carbon monoxide (CO) and hydrocarbons (HCs)—be that the composite oxidation catalyst according to the invention or the CSF disposed downstream of the composite oxidation catalyst according to the invention—and upstream of the SCR catalyst. The exhaust system may further comprise an engine management means for enriching the exhaust gas with hydrocarbons in order to contact the composite oxidation catalyst with hydrocarbons to generate an exotherm for regenerating the downstream soot filter. Alternatively, or additionally, hydrocarbon injection can be facilitated via a standalone hydrocarbon injector for injecting hydrocarbon fuel into exhaust gas downstream from an engine manifold but upstream of the composite oxidation catalyst.

In the alternative to a CSF catalyst formulation, the soot filter substrate, preferably a wall-flow filter, can be coated with SCR catalyst, in which case it is referred to as a SCRF catalyst.

Generally, SCR catalysts are unable to reduce substantial amounts of $NO_x$ in an exhaust gas shortly after start-up of a compression ignition engine because the exhaust gas temperature (and hence the temperature of the catalyst) is too low. Lean $NO_x$ trap catalysts (e.g. $NO_x$ adsorber catalysts) have, for example, been employed upstream of SCR catalysts, so that $NO_x$ can be stored until the SCR catalyst becomes active at higher exhaust gas temperatures. However, lean $NO_x$ trap catalysts are often unable to adequately store $NO_x$ when there is a large mass flow of exhaust gas (e.g. when the engine is operated at a high-speed cycle).

Exhaust systems with application in the second aspect of the present invention are illustrated in the accompanying FIGS. 8A-D. In a first exhaust system embodiment (see FIG. 8A) comprises the composite oxidation catalyst of the invention on a flow-through honeycomb substrate monolith (see item 42 in FIG. 8A), and a selective catalytic reduction filter (SCRF) catalyst. Such an arrangement may be called a DOC/SCRF. This embodiment also relates to the use of the composite oxidation catalyst for treating an exhaust gas from a combustion engine, particularly a compression ignition engine, in combination with a selective catalytic reduction filter (SCRF) catalyst. Preferably the composite oxidation catalyst is, or is for use as, a diesel oxidation catalyst. The composite oxidation catalyst of the invention is typically followed by (e.g. is upstream of) the selective catalytic reduction filter (SCRF) catalyst. A nitrogenous reductant injector may be arranged between the composite oxidation catalyst and the selective catalytic reduction filter (SCRF) catalyst. Thus, the composite oxidation catalyst may be followed by (e.g. is upstream of) a nitrogenous reductant injector, and the nitrogenous reductant injector may be followed by (e.g. is upstream of) the selective catalytic reduction filter (SCRF) catalyst.

In a second exhaust system embodiment (see FIG. 8B), the exhaust system comprises the composite oxidation catalyst of the invention on a flow-through honeycomb substrate monolith and either an (uncatalyzed) diesel particulate filter (DPF) or a catalysed soot filter (CSF). Such an arrangement may be called a DOC/DPF or a DOC/CSF. This embodiment also relates to the use of the composite oxidation catalyst for treating an exhaust gas from a combustion engine, particularly a compression ignition engine, in combination with a diesel particulate filter or a catalysed soot filter. Preferably the composite oxidation catalyst is, or is for use as, a diesel oxidation catalyst. The composite oxidation catalyst is typically followed by (e.g. is upstream of) the diesel particulate filter or the catalysed soot filter (CSF). Thus, for example, an outlet of the composite oxidation catalyst is connected to an inlet of the diesel particulate filter or the catalysed soot filter.

A third exhaust system embodiment (see FIG. 8C) relates to an exhaust system comprising the composite oxidation catalyst of the invention on a flow-through honeycomb substrate monolith, a diesel particulate filter or a catalysed soot filter (CSF), and a selective catalytic reduction (SCR) catalyst. Such an arrangement may be called a DOC/DPF/SCR or a DOC/CSF/SCR. This embodiment also relates to the use of the composite oxidation catalyst for treating an exhaust gas from a combustion engine, particularly a compression ignition engine, in combination with either a diesel particulate filter or a catalysed soot filter (CSF), and a selective catalytic reduction (SCR) catalyst, preferably wherein the oxidation catalyst is, or is for use as, a diesel oxidation catalyst. The composite oxidation catalyst is typically followed by (e.g. is upstream of) the diesel particulate filter or the catalysed soot filter (CSF). The DPF or CSF is typically followed by (e.g. is upstream of) the selective catalytic reduction (SCR) catalyst. A nitrogenous reductant injector may be arranged between the DPF or CSF and the selective catalytic reduction (SCR) catalyst. Thus, the DPF or CSF may be followed by (e.g. is upstream of) a nitrogenous reductant injector, and the nitrogenous reductant injector may be followed by (e.g. is upstream of) the selective catalytic reduction (SCR) catalyst.

A fourth exhaust system embodiment (see FIG. 8A) relates to an exhaust system comprising the composite oxidation catalyst of the invention on a wall-flow substrate monolith (CSF—see item 42 in FIG. 8A), and a selective catalytic reduction (SCR) catalyst. This is also a CSF/SCR arrangement. A further aspect of this embodiment relates to the use of the composite oxidation catalyst for treating an exhaust gas from a compression ignition engine in combination with a diesel oxidation catalyst (DOC) and a selective catalytic reduction (SCR) catalyst, preferably wherein the composite oxidation catalyst is, or is for use as, a catalysed soot filter (CSF). The diesel oxidation catalyst (DOC) is typically followed by (e.g. is upstream of) the composite oxidation catalyst of the invention. The composite oxidation catalyst of the invention is typically followed by (e.g. is upstream of) the selective catalytic reduction (SCR) catalyst. A nitrogenous reductant injector may be arranged between the composite oxidation catalyst and the selective catalytic reduction (SCR) catalyst. Thus, the composite oxidation catalyst may be followed by (e.g. is upstream of) a nitrogenous reductant injector, and the nitrogenous reductant injector may be followed by (e.g. is upstream of) the selective catalytic reduction (SCR) catalyst.

In a fifth exhaust system embodiment (see FIG. 8D), the exhaust system comprises the composite oxidation catalyst of the invention, preferably as a DOC, a selective catalytic reduction (SCR) catalyst and either a catalysed soot filter (CSF) or a diesel particulate filter (DPF). The arrangement is either a DOC/SCR/CSF or a DOC/SCR/DPF. This embodiment also relates to the use of the composite oxidation catalyst for treating an exhaust gas from a combustion engine, particularly a compression ignition engine, in combination with a selective catalytic reduction (SCR) catalyst and either a catalysed soot filter (CSF) or a diesel particulate filter (DPF), preferably wherein the composite oxidation catalyst is, or is for use as, a diesel oxidation catalyst.

Such arrangements are illustrated in FIGS. 8A-D respectively, wherein item 30 is a heavy-duty diesel engine; item 32 is an exhaust system for the heavy-duty diesel engine; item 34 is a pipe for conveying exhaust gas from the heavy-duty diesel engine to a component (42, 44, 50) of the exhaust system or therefrom to atmosphere 36; item 38 is an injector for injecting hydrocarbon fuel into exhaust gas downstream from engine manifold 40 and upstream from a composite oxidation catalyst 42 according to the present invention, e.g. any one of those composite oxidation catalysts illustrated in FIGS. 2-5 inclusive, wherein the first catalyst washcoat zone 1 is oriented to the upstream side—the substrate of the composite oxidation catalyst can be a flow-through substrate monolith or a wall-flow filter substrate monolith; item 44 is a diesel particulate filter (DPF) or a catalysed soot filter (CSF); item 46 is an injector for injecting a nitrogenous reductant precursor fluid, e.g. urea, held in a reservoir 48 into flowing exhaust gas; item 50 is a selective catalytic reduction catalyst (SCR) coated on a flow-through substrate monolith or a wall-flow filter substrate monolith (SCRF).

Definitions

Any reference to the distribution of a platinum group metal (e.g. first platinum group metal or second platinum group metal) in a direction (e.g. a straight line) perpendicular to the surface of the substrate generally refers to a direction perpendicular to the same surface of the substrate upon which the catalyst layer is disposed. For reference purposes, the surface of the substrate is generally in the horizontal (i.e. longitudinal) plane. The direction perpendicular to the surface of the substrate is typically a direction in a cross-sectional plane through the catalyst layer (i.e. a cross-sectional plane that exposes the thickness of the catalyst layer) perpendicular to the surface of the substrate. The cross-sectional plane is generally in a vertical (i.e. transverse) plane. The cross-sectional plane is perpendicular to the surface on which the catalyst layer is disposed. More typically, the cross-sectional plane is substantially parallel to an inlet end face of the substrate and/or the outlet end face of the substrate (i.e. the plane containing the inlet end face and/or the plane containing the outlet end face). Any reference to "substantially parallel" in this context refers to an angle of less than 5°, preferably less than 2.5°, more preferably less than 1° (e.g. less than 0.5°), between the cross-sectional plane and the inlet end face or the outlet end face of the substrate.

Any reference to a "surface of the substrate" generally refers to the surface of a wall of a channel through the substrate.

The term "layer" (e.g. catalyst layer) as used herein refers to a thickness of material spread over a surface, such as a surface of a substrate or a surface of another layer, which typically has distinct boundaries or edges (i.e. it is possible to distinguish a first layer from a compositionally different second layer using conventional analytical techniques (e.g. transmission electron microscopy).

The term "uniform" as used herein with reference to the distribution of a platinum group metal generally refers to a composition (e.g. a layer) where the amount of platinum group metal at any point in the composition is within ±20% of the mean amount of platinum group metal in the entire composition (e.g. layer). It is preferred that the amount of platinum group metal at any point in the composition is within ±10%, more preferably ±5%, and even more preferably ±1%, of the mean amount of platinum group metal in the entire composition (e.g. layer). The mean amount of platinum group metal should correspond to the amount of platinum group metal that is measured out during preparation of that composition. The amount of platinum group metal at any point in a composition can be determined using conventional analytical techniques, such as by EDX analysis using a transmission electron microscope.

The term "mixed oxide" as used herein generally refers to a mixture of oxides in a single phase, as is conventionally known in the art.

The term "composite oxide" as used herein generally refers to a composition of oxides having more than one phase, as is conventionally known in the art.

The term "loading" is used to define a concentration quantity of a component such as a platinum group metal component, an alkaline earth metal component or a washcoat formulation comprising both one or more platinum group metal components and one or more alkaline earth metal components supported on a refractory metal oxide support material present in a catalyst washcoat zone, a catalyst washcoat layer or present on the substrate as a whole. It is possible to determine local concentrations of the or each platinum group metal component or the or each alkaline earth metal component by EPMA or XRF techniques. The units of loading used herein and in the prior art are generally expressed in $g\ ft^{-3}$ or $g\ in^{-3}$ or their SI unit equivalent grams per litre generally relate to the volume of the substrate that is used. The volume component relates to that of the substrate onto which e.g. a washcoat layer is applied. Typically, relatively low concentration components are given as "$g\ ft^{-3}$" to make the amount meaningful without needing to refer to $100^{th}$s or $1000^{th}$s of a quantity, whereas higher concentration amounts are given in "$g\ in^{-3}$", such as for the amount of total washcoat application. By convention in the common general knowledge, the "volume" component of the units of loading assumes that a substrate is a solid, e.g. the total volume of a cylinder, and ignores the fact that the substrate has channels extending therethrough defined by walls made of the substrate composition, or that the substrate composition is inherently porous.

The term "comprising" is intended to mean that the named elements are essential, but other elements may be added and still form a construct within the scope of the claim.

The expression "consisting essentially" as used herein can be exchanged for the broader definition "comprising" and limits the scope of a feature to include the specified materials or steps, and any other materials or steps that do not materially affect the basic and novel characteristics and functions of that feature or that feature in combination with the other claim features. Where a catalyst washcoat zone consists essentially of platinum, this means that it is intended to consist of platinum but other platinum group metal(s) e.g. palladium may be present in the catalyst washcoat zone of the finished product unintentionally e.g. because of migration of palladium into the catalyst washcoat zone during manufacture. In this context "consisting essentially of" does not exclude the unintended presence of palladium in a catalyst washcoat zone defined as consisting essentially of platinum. The term "consisting essentially of" embraces the expression "consisting of" and is interchangeable with either "comprising" or "consisting of". "Consisting of" closes the claim to the inclusion of materials other than those recited except for impurities ordinarily associated therewith.

With regard to the composite oxidation catalyst according to the invention, the basic and novel characteristics of the invention are a substrate of at least two catalyst washcoat zones arranged axially in series on and along the substrate surface wherein a first catalyst washcoat zone defined at one end by the substrate inlet end includes a refractory metal oxide support material, both platinum and palladium at a Pt:Pd weight ratio of >1 and barium and the second catalyst washcoat zone includes a refractory metal oxide support material and either platinum as the only platinum group metal present or both platinum and palladium at a Pt:Pd weight ratio greater than in the first catalyst washcoat zone.

In the context of the expression "platinum group metal" (e.g. first platinum group metal or second platinum group metal), it is to be appreciated that it is often difficult to characterise the exact catalytic species in a catalyst and the platinum group metal may not be present in elemental, metallic form. Any reference to "consisting essentially of a platinum group metal . . . " embraces a "platinum group metal moiety" in an elemental form of the platinum group metal, an alloy containing the platinum group metal or a compound comprising the platinum group metal (e.g. an oxide of the platinum group metal). Preferably, any such "platinum group metal moiety" is an elemental form of the platinum group metal or an alloy containing the platinum group metal, more preferably an elemental form of the platinum group metal.

With reference to the reference catalyst of FIG. 1 wherein the first and second catalyst washcoat layers abut one another "without there being substantially any overlap between the first and second washcoat layers", the term "substantially any overlap" is intended to cover products wherein there is no gap between the first catalyst washcoat coating and the second catalyst washcoat coating. In practice, it is practically very difficult to achieve a perfect "no gap" coating without also having some overlap between the two composite washcoat layers at the join therebetween. Therefore, in practice products made by methods embraced by the fourth aspect of the invention may have an unintended overlap of from 1-2 mm to up to 15% axial length, such as up to 14%, 13%, 12%, 11%, 10%, 9%, 8%, 7%, 8%, 6%, 5%, 4%, 3%, 2% or 1%. Accordingly, the composite oxidation catalyst such as the reference catalyst of FIG. 1 can have up to this dimension of unintended overlap.

EXAMPLES

The invention will now be illustrated by the following non-limiting examples. For the avoidance of doubt all coating steps were done using the methods and apparatus disclosed in Applicant's WO 99/47260, i.e. comprising the steps of (a) locating a containment means on top of a substrate, (b) dosing a pre-determined quantity of a liquid component into said containment means, either in the order (a) then (b) or (b) then (a), and (c) by applying vacuum, drawing the entirety of said quantity of liquid component into at least a portion of the substrate, and retaining substantially all of said quantity within the substrate, without recycle.

Example 1 (Comparative)

A bare cordierite honeycomb flow-through substrate monolith of 62 cells per square centimetre (400 cells per square inch), a wall thickness of 0.15 mm (6 thousandths of an inch (6 mil)) and a total length of 10.16 cm (4 inches) was coated with catalyst washcoat in a zoned arrangement as follows. A first catalyst washcoat slurry containing aqueous salts (as nitrates) of platinum and palladium and a 5 wt. % silica-doped alumina support was coated onto the substrate monolith to an axial length of 75% of the total substrate monolith length from one end labelled as the inlet end. The concentrations of platinum and palladium salts were selected to achieve a loading in the coating of 6.67Pt:3.33Pd gft$^{-3}$ at a weight ratio of platinum to palladium in the first catalyst washcoat coating of 2:1. This inlet coating was then dried in a conventional oven for 1 hour at 100° C. to remove excess water and other volatile species.

A second catalyst washcoat slurry containing an aqueous platinum nitrate salt as the only platinum group metal present and a 5 wt. % silica-doped alumina support was coated onto the substrate from the end of the substrate monolith opposite to the end from which the first coating was applied, i.e. the outlet end. The axial length of coating of the second catalyst washcoat was 50% of the total substrate length, i.e. 25% of the second washcoat catalyst coating overlapped with the first washcoat catalyst coating. The concentration of platinum salt used was selected to achieve a 0.071 g/L (2 gft$^{-3}$) Pt loading in the 50% axial substrate length coated. The substrate coated with both the first and the second washcoat coatings was dried in a conventional oven for 1 hour at 100° C. and then the dried part was calcined for 1 hour at 500° C. to decompose the platinum and palladium salts and fix the platinum and palladium to the silica-doped alumina support.

An aqueous medium comprising salts of both platinum nitrate and palladium nitrate at a 1:1 weight ratio was then impregnated onto the coating of the first catalyst washcoat to an axial length of the substrate of 25% measured from the substrate inlet end. The concentrations of the salts were selected to achieve a weight of 0.883 g/L (25 gft$^{-3}$) for each of the platinum and palladium in the impregnated length of the substrate. This gave a high PGM loading in a zone at the inlet end with an additional loading of 1.766 g/L (50 gft$^{-3}$) over and above that of the underlying first catalyst washcoat coating. The impregnated part was oven dried and calcined as described above.

All washcoats and impregnation solutions were naturally acidic and there was no pH adjustment thereof.

The final product comprised a substrate monolith comprising three catalyst washcoat zones arranged axially in series: a first, high loaded front zone defined as about 25% of the axial length of the substrate monolith measured from the inlet end and having a total platinum group metal loading which was a combination of the underlying 2Pt:1Pd first catalyst washcoat and the impregnated 1:1 Pt:Pd, followed axially in series by a second catalyst washcoat zone comprised of the 2Pt:1Pd first catalyst washcoat of approximately 50% of the axial length of the substrate monolith at a lower total platinum group metal loading than the first catalyst washcoat zone and finally a third Pt-only zone at the outlet end comprised of the second catalyst washcoat coating of approximately 25% of the axial length of the substrate monolith at a lower total platinum group metal loading than either the first or the second catalyst washcoat zones. The total platinum group metal loading on the substrate monolith as a whole was 0.706 g/L (20 gft$^{-3}$) at a total Pt:Pd weight ratio of 11.8:4, equivalent to 2.95:1.

Using EPMA-WDX (electron microprobe analysis-wavelength dispersive x-ray) image analysis, the first catalyst washcoat zone prepared in this manner, which contained a high concentration of both platinum and palladium, was found to have a non-uniform distribution of Pd in a direction perpendicular to the surface of the substrate, i.e. an amount of Pd decreased in a perpendicular direction toward the surface of the substrate. In other words, the Pd concentration at the upper surface of the washcoat layer in contact with gas entering the inlet end of the substrate was higher than in the washcoat layer at the substrate surface. To a lesser extent, the platinum also was found to follow the same trend as the palladium. However, the non-uniform distribution of the Pd in a direction perpendicular to the surface of the substrate in the first catalyst washcoat zone was most pronounced. This effect is referred to herein as the formation of a so-called "crust" of Pd in the first catalyst washcoat zone.

Example 2

An identical product to that disclosed in Comparative Example 1 was prepared, except in that, in addition to aqueous salts of platinum and palladium, the first catalyst washcoat slurry contained an aqueous barium acetate salt, according to the invention. The concentration of the barium acetate was selected so that the barium loading in the first catalyst washcoat coating was 2.83 g/L (80 gft$^{-3}$) for the 75% axial length of the first catalyst washcoat coating. That is, the first and second catalyst washcoat zones comprised barium at a loading of 2.83 g/L (80 gft$^{-3}$). The total platinum group metal loading and Pt:Pd weight ratio on the substrate monolith as a whole was the same as in Example 1, i.e. 0.706 g/L (20 gft$^{-3}$).

Using EPMA-WDX image analysis, the first catalyst washcoat zone prepared in this manner, was found to have an amount of Pd that decreased in a perpendicular direction toward the surface of the substrate, and to a lesser extent the same for Pt, but also a relatively strong non-uniform distribution of barium that decreases in a perpendicular direction toward the surface of the substrate. In other words, both the Pd and the Ba (and to a lesser extent Pt) formed a "crust" at the surface of the of the washcoat layer in contact with gas entering the inlet end of the substrate.

Example 3—Test Method & Results for Comparison of with and without Barium in Inlet Zone A thermal analysis of each composite oxidation catalyst prepared according to Examples 1 and 2 inclusive was performed using a laboratory bench-mounted diesel engine. The engine was fueled with EUVI B7 fuel (7% Bio fuel) for both engine operation and exhaust gas hydrocarbon enrichment (exotherm generation), running at 2200 rpm and was fitted with an exhaust system including exhaust piping and demountable canning into which each of the composite oxidation catalysts could be inserted for testing with the inlet end/first catalyst, high-loaded washcoat zone oriented to the upstream side. The engine was a 7-litre capacity EU-V 6 cylinder engine, producing 235 kW at 2500 rpm and the exhaust system included a "7$^{th}$ injector" disposed to inject hydrocarbon fuel directly into the exhaust gas piping downstream from the engine manifold and upstream from the composite oxidation catalyst to be tested. This injector is named the "7$^{th}$ injector" because it is additional to the six fuel injectors associated with the cylinders of the engine. Thermocouples were located at the inlet to the composite oxidation catalyst and were inserted at various axial locations along the centre line of the substrate monolith of each composite oxidation catalyst.

Each catalyst was conditioned for 10 minutes at an inlet exhaust gas temperature of 490° C. at an exhaust gas flow-rate of 1000 kg/hour followed by a rapid cooling step. The exhaust gas flow rate was then set to 720 kg/hour (corresponding to 120,000 hr$^{-1}$ space velocity for the size and volume of substrate tested) with the engine load controlled so that a stable set inlet exhaust gas temperature of about 270° C. was achieved for approximately 1800 seconds.

The ability for the composite oxidation catalyst to generate an exotherm at each stabilised set temperature was then tested by injecting hydrocarbon fuel via the 7$^{th}$ injector targeting both 600° C. and a stable hydrocarbon "slip" at the outlet of the composite oxidation catalyst substrate via downstream thermocouple and hydrocarbon sensors. The test was stopped if the hydrocarbon slip measured downstream from the composite oxidation catalyst exceeded 1000 ppm $C_3$, i.e. no matter what the length of the hydrocarbon chain in the detected hydrocarbons—the modal carbon chain length in a typical diesel fuel is $C_{16}$—the test would be stopped if the equivalent of 1000 ppm $C_3$ was detected. So, if 187.5 ppm $C_{16}$ were detected, this was equivalent to 1000 ppm $C_3$ ($C_{16}$ is equivalent to 5⅓×$C_3$ hydrocarbons).

Following the test at the about 270° C. set inlet temperature, the system was again preconditioned at an inlet exhaust gas temperature of 490° C. for 10 minutes at a flow rate of 1000 kg/hour followed by a rapid cooling and an exotherm test at a second set temperature, e.g. about 260° C. This cycle was repeated to test exotherm generation at set temperatures of about 250° C., 240° C. and 230° C. The test was stopped when either the composite oxidation catalyst cannot generate a stable exotherm of 600° C. at the composite oxidation catalyst outlet end or the hydrocarbon slip measured at the composite oxidation catalyst outlet exceeds 1000 ppm ($C_3$).

The results for these tests performed on Examples 1 and 2 are set out in Table 1 below. It will be understood that the lower the inlet temperature at which a stable exotherm can be achieved at acceptable hydrocarbon slip, the more advantageous. This is because the design flexibility in the system is increased in that a filter regeneration event can be initiated from a lower inlet exhaust gas temperature, i.e. without needing to wait until the exhaust gas temperature under normal operating conditions is sufficiently high to initiate filter regeneration, which may occur less frequently in ordinary operation Also, it improves overall fuel economy because it is not necessary to inject as much hydrocarbon in order to achieve a desired exhaust gas temperature at the outlet to the composite oxidation catalyst.

TABLE 1

| Inlet temperature (° C.) | Comparative Example 1 (no barium) HC slip ($C_3$) | Example 2 (barium) |
|---|---|---|
| 270 | 550 | 425 |
| 260 | 550 | 450 |
| 250 | 1000 | 440 |

TABLE 1-continued

| Inlet temperature (° C.) | Comparative Example 1 (no barium) HC slip (C₃) | Example 2 (barium) |
|---|---|---|
| 240 | 1000 | 320 |
| 230 | n/a | 1000 |

Table 1 demonstrates that the conventional oxidation catalyst (Example 1) cannot achieve a stable exotherm at an inlet temperature of 250° C. or below, whereas the composite oxidation catalyst according to the invention can achieve a stable exotherm down to 230° C.

Example 4—Assessment of Guard Bed to Prevent Phosphorus and/or Zinc Poisoning of the Catalyst—Preparation of Samples A catalyst according to the invention having the construction shown in FIG. 5 was used to illustrate the functional principle of the guard bed feature. A cylindrical cordierite flow-through honeycomb monolith substrate having dimensions of length 26.67 cm×a diameter of 10.16 cm (10.5 inches×a diameter of 4 inches) was coated with a first catalyst washcoat layer (6) coated on the substrate comprising Pt and Pd in a 2:1 weight ratio and 2.83 g/L (80 gft$^{-3}$) barium supported on a 5 wt % silica-doped alumina particulate support at a 75% axial coating length from the inlet end (I) and the second washcoat layer (7) comprised Pt only supported on a 5 wt % silica-doped alumina particulate support (no barium) coated for 50% of the axial length of the substrate from the outlet end (O). A first catalyst washcoat zone was obtained by impregnating the first catalyst washcoat layer (6) with a solution of platinum and palladium salts sufficient to achieve a 1:1 weight ratio of Pt and Pd over 25% of the axial length of the substrate at an additional total PGM loading of 1.77 g/L (50 gft$^{-3}$). The composite oxidation catalyst as a whole had a total platinum group metal loading of 0.742 g/L (21 gft$^{-3}$) and a Pt:Pd weight ratio of 7:5, equivalent to 1.4:1. That is, the first catalyst washcoat zone in this Example 4 had a Pt:Pd weight ratio of >1:1.

Three samples were prepared. A first sample was used as a control, without any application of a guard bed. A second sample had a washcoat of 5 wt. % silica-doped alumina (no platinum group metal)—the same silica-doped alumina as was used in the first (6) and second (7) catalyst washcoat layers—coated over the first catalyst washcoat zone (1) at a washcoat loading of 0.018 g/L (0.5 gin$^{-3}$) and for a total of 30% of the substrate axial length from the inlet end of the substrate (I), i.e. the 25% of the axial length of the first catalyst washcoat zone was completely covered with the washcoat overlayer of silica-doped alumina "guard bed", i.e. 120% of the axial length of the first catalyst washcoat zone was coated with the washcoat overlayer. The mean pore diameter of the 5 wt. % silica-doped alumina used was about 19 nm.

A third sample was prepared identically to the second sample, except in that the washcoat loading of the 5 wt. % silica-doped alumina "guard bed" was 61.02 g/L (1.0 gin$^{-3}$).

The three samples were each oven-aged in air at 650° C. for 50 hours.

Example 5—Assessment of Guard Bed to Prevent Phosphorus and/or Zinc Poisoning of the Catalyst—Sample Testing The three coated substrate samples prepared according to Example 4 were canned together in parallel in a proprietary canning arrangement and the canned substrates were inserted into an exhaust system of a laboratory bench-mounted 16 litre heavy-duty diesel engine certified to the Euro 2 emission standard running MK1 fuel to which had been mixed a ZDTP fuel additive to a 1750 ppm concentration. The substrates were then engine aged using the following cycle, which had been calculated to expose the canned substrates as a whole to 0.5 g ZDTP per litre of catalyst substrate per cycle:

(i) minutes "soak" at an engine load producing a steady state of 470° C. substrate inlet temperature;
(ii) 15 minutes "soak" at an engine load producing a steady state of 210° C. substrate inlet temperature followed by 15 minutes at an inlet temperature of 250° C. and finally 10 minutes at an inlet temperature of 325° C.; and
(iii) Steps (i) and (ii) were repeated six (6) times.

The samples were then decanned and each was tested in turn using the engine described in Example 3 according to the following procedure.

A "continuous exotherm" test was conducted as follows. Each catalyst was conditioned at an inlet temperature of 490° C. for 20 minutes, followed by a fast cool-down to an inlet temperature of 320° C. at which the catalyst was held for 10 minutes. Hydrocarbon injection via the 7$^{th}$ injector was then begun at a rate to achieve an exotherm generating 600° C. at substrate outlet. This exotherm was maintained at steady state for 5 minutes. A hydrocarbon oxidation catalyst light-out temperature ramp-down was then begun by continuously adjusting the engine load to achieve a 1° C. inlet temperature drop per minute at a flow rate of 720 kg/h. The run was stopped when the temperature at a downstream catalysed soot filter inlet was below 425° C. or the hydrocarbon slip analyser limit of 1500 ppm C₃ was reached.

The washcoat coating in the first quarter of the substrate measured from the inlet end of each substrate sample was analysed using X-Ray fluorescence (XRF) to characterise the elemental composition of the washcoat and poisoning by phosphorus and zinc. The extent of detected poisoning was zeroed against an Omnian multi-element reference standard scan. The results are shown in the following Table 2.

TABLE 2

| Sample | Phosphorus (wt. %) | Zinc (wt. %) |
|---|---|---|
| Reference | 2.41 | 0.10 |
| 30.5 g/L (0.5 g/in³) guard bed sample | 2.23 | 0.11 |
| 61.0 g/L (1.0 g/in³) guard bed sample | 2.29 | 0.09 |

The phosphorus poisoning was consistent across all three parts, at a maximum of about an 8.0% difference between any two samples.

The skilled person will appreciate that the phosphorus poisoning achieved using the procedure used in this Example achieves a phosphorus poisoning that is more than has been reported in the field through normal use (see hereinabove, where a post-mortem catalyst sample was found to have a phosphorus poisoning at end of vehicle life of 1.0 to 1.5 wt. % phosphorus). However, the level of phosphorus poisoning obtained using the procedures described in this Example 5 was comparable to that seen empirically in normal operation at end of vehicle life.

The results of the continuous exotherm test are set out in the following Table 3.

TABLE 3

| Sample | Inlet temperature at <500° C. exotherm fail (° C.) | |
|---|---|---|
| | 650° C./50 h aged | Plus additional ZDTP aging |
| Reference | 232.4 | 302.8 |
| 30.5 g/L (0.5 g/in$^3$) guard bed sample | 237.2 | 301.9 |
| 61.0 g/L (1.0 g/in$^3$) guard bed sample | 237.6 | 270.6 |

From these results, it can be seen that there was a small, 5.2° C. (2.2%) increase in the inlet temperature required to obtain the ≥500° C. exotherm for the two samples including a guard bed feature compared with the reference catalyst without a guard bed feature. This shows that there is a small and practically insignificant increase in the inlet temperature at which engine management could begin an exotherm generation event for regeneration of a downstream filter component in an exhaust system according to the invention comprising a composite oxidation catalyst including the guard bed feature.

It can also be seen that the sample including the 61.0 g/L (1.0 g/in$^3$)-loaded guard bed retained significantly more hydrocarbon oxidation activity (only a 13.9% loss in inlet temperature required to achieve 500° C. exotherm compared to a 30.3% loss in inlet temperature for the reference sample) relative to the reference despite the same segments of the oxidation catalyst in the reference and the sample according to the invention having a similar quantity of poisoning phosphorus present (see Table 3). However, it can also be seen that the sample including 30.5 g/L (0.5 g/in$^3$) in the washcoat overlayer suffered a similar loss in activity to the reference.

Example 6—Further Assessment of Guard Bed to Prevent Phosphorus and/or Zinc Poisoning of the Catalyst A catalyst having a similar formulation and design as that of the catalyst described in Example 4 was prepared, except in that the composite oxidation catalyst as a whole had a total platinum group metal loading of 0.530 g/L (15 gft$^{-3}$) and a Pt:Pd weight ratio of 7.24:5 equivalent to 1.45:1, but wherein the first catalyst washcoat zone still had a Pt:Pd weight ratio of >1:1.

The following samples were prepared.

TABLE 4

| Example No. | Guard Bed Particulate Metal Oxide Material | Guard Bed Washcoat Loading g/L (g/in$^3$) | Guard Bed Pt:Pd loading g/L (g/ft$^3$) |
|---|---|---|---|
| 6.1 | None (Reference) | — | — |
| 6.2 | Gamma alumina | 61.0 (1.0) | — |
| 6.3 | 5 wt % silica-doped alumina | 61.0 (1.0) | — |
| 6.4 | 5 wt % silica-doped alumina | 91.5 (1.5) | — |
| 6.5 | 30 wt % silica-doped alumina | 61.0 (1.0) | — |
| 6.6 | "Wide pore alumina" | 61.0 (1.0) | — |
| 6.7 | AEI aluminosilicate zeolite | 61.0 (1.0) | — |
| 6.8 | Cu-ion exchanged AEI aluminosilicate zeolite | 61.0 (1.0) | — |
| 6.9 | Ceria | 91.5 (1.5) | — |
| 6.10 | 5 wt % silica-doped alumina | 61.0 (1.0) | 0.177 (5.0) |
| 6.11 | Gamma alumina | 91.5 (1.5) | 0.177 (5.0) |
| 6.12 | 5 wt % silica-doped alumina | 91.5 (1.5) | 0.177 (5.0) |
| 6.13 | 5 wt % silica-doped alumina | 91.5 (1.5) | 0.353 (10.0) |
| 6.14 | 5 wt % silica-doped alumina | 91.5 (1.5) | 0.530 (15.0) |

The fresh "gamma alumina" of Examples 6.2 and 6.11 had an intrinsic mean pore diameter of about 13 nm. The fresh "5 wt % silica-doped alumina" of Examples 6.3, 6.4 and 6.10 and 6.12-6.14 inclusive had an intrinsic mean pore diameter of 15 nm. The fresh "wide pore alumina" had an intrinsic mean pore diameter of about 20 nm. The fresh ceria of Example 6.9 had an intrinsic mean pore diameter of about 8 nm. The AEI aluminosilicate zeolite of Examples 6.7 and 6.8 had a silica-to-alumina ratio of about 20. The copper loading in the Cu ion-exchanged AEI aluminosilicate zeolite of Example 6.8 was about 3.8 wt. %. All particulate metal oxide materials used in this Example had a fresh specific surface area of >100 m$^2$/g.

The particulate metal oxide used in each guard bed Example was milled to have a D90 would be <20 μm, D50 (mean particle size)<8 μm, which combination Applicant's believe produces mean interparticle pore diameter in the guard be layer of ≥10 nm.

All samples were oven-aged in air at 650° C. for 50 hours. The Examples were tested in the same way as described in Example 5 hereinabove. The results are set out in Table 5 below.

TABLE 5

| Sample | Inlet temperature at <500° C. exotherm fail (° C.) | |
|---|---|---|
| | 650° C./50 h aged | Plus additional ZDTP aging |
| 6.1 | 239.3 | 285.9 |
| 6.2 | 256.0 | 269.3 |
| 6.3 | 250.7 | 272.8 |
| 6.4 | 251.2 | 265.3 |
| 6.5 | 254.6 | 271.6 |
| 6.6 | 247.7 | 266.1 |
| 6.7 | 252.6 | 272.4 |
| 6.8 | 257.0 | 276.7 |
| 6.9 | 245.3 | 273.9 |
| 6.10 | 250.2 | 262.5 |
| 6.11 | 246.2 | 265.9 |
| 6.12 | 247.8 | 263.0 |
| 6.13 | 247.1 | 260.8 |
| 6.14 | 242.5 | 254.9 |

From the results shown in Table 5 it can be seen that all Examples coated with a guard bed have reduced exotherm activity before phosphorus ageing relative to the control (reference) Example 6.1, which has an exotherm fail temperature of 239.0° C. However, all of Examples 6.2-6.14 inclusive including a guard bed performed better than the reference post-phosphorus ageing (285.9° C.). The best performing Examples were those that had a reasonable balance between performance pre-phosphorus ageing, e.g. <252.0° C. and post-phosphorus ageing, e.g. <273.0° C.

It can also be seen that higher washcoat loading samples (compare e.g. Examples 6.4 with 6.3) performed better, as did Examples wherein PGM was supported on the particulate oxide material of the guard bed.

Example 7—Investigation of Fresh-to-Aged "Delta" for NO Oxidation Catalyst Activity Through Compositional Changes to Outlet Catalyst Washcoat Zone A series of catalysts similar to those described in Example 4—but without the guard bed—and having the construction shown in FIG. 5 were prepared. The only other differences with the Example 4 catalyst samples were that the composite oxidation catalyst as a whole had a total platinum group metal loading of 1.06 g/L (30 gft$^{-3}$); and the formulation of the second washcoat layer (7) was modified to investigate the NO oxidation activity of the outlet zone, the details of which are set out in the Table 7 hereinbelow. The total platinum group metal loading in all samples in the second washcoat layer in this Example 7 was 0.44 g/L (12.5 gft$^{-3}$), the washcoat loading of the second washcoat layer in all samples tested was equivalent and none of the second washcoat layers tested included barium. The total Pt:Pd weight ratio in the composite oxidation catalyst as a whole was different from that of the Example 4 samples.

Each fresh catalyst was inserted into the test exhaust system of the laboratory bench-mounted diesel engine described in Example 3. The fresh catalyst was first "conditioned" for 30 minutes at an engine load and speed to generate a catalyst bed temperature of 550° C. The resulting "conditioned" catalyst was then allowed to cool to room temperature. The conditioned fresh catalyst was then tested over a load-ramped transient test cycle at constant 1400 rpm engine speed and increasing space velocity to determine the NO oxidation activity of the composite oxidation catalyst. Detected NO$_2$/NO$_x$ in exhaust gas downstream of the composite oxidation catalyst was recorded against substrate inlet temperature. The tested catalyst was then cooled, decanned and oven-aged hydrothermally in air/10% H$_2$O (steam) at 600° C. for 140 hours to simulate end-of-vehicle life oxidation activity. The aged catalyst was then remounted into the exhaust system of the laboratory bench-mounted diesel engine and re-conditioned and re-tested using the same protocol as described for the fresh catalyst.

TABLE 7

| Sample | Refractory metal oxide support material | Pt:Pd weight ratio (total PGM 0.441 g/L (12.5 g/ft$^3$)) | Fresh NO$_2$/NO$_x$ at 300° C. (%) | Hydrothermally Aged (600° C./140 hrs) NO$_2$/NO$_x$ at 300° C. (%) | Fresh-to-aged NO$_2$/NO$_x$ "delta" (%) |
|---|---|---|---|---|---|
| 7.1 | 5 wt % silica-doped alumina | 1:0 | 64.7 | 47.6 | 17.1 |
| 7.2 | 5 wt % silica-doped alumina | 2:1 | 54.8 | 40.4 | 14.4 |
| 7.3 | "Pre-formed" 3.2 wt % manganese†-/ 5 wt % silica-doped alumina | 1:0 | 49.1 | 42.8 | 6.3 |
| 7.4 | 5 wt % silica-doped alumina + 3.2 wt % manganese† (from impregnation)* | 1:0 | 50.1 | 40.3 | 9.8 |

†Equivalent to 5.0 wt % MnO$_2$ in the calcined material.

*5 wt % silica-doped alumina was impregnated with manganese nitrate solution at a sufficient concentration to achieve the desired calcined weight of manganese.

Example 8—Further Investigations into Fresh-to-Aged "Delta" for NO Oxidation Catalyst Activity Through Compositional Changes to Outlet Catalyst Washcoat Zone A series of catalysts similar to those described in Example 7 and having the construction shown in FIG. 5 were prepared. The only differences with the Example 7 catalyst samples were that the first catalyst washcoat zone was obtained by impregnating the first catalyst washcoat layer (6) with a solution of platinum and palladium salts sufficient to impregnate 25% of the axial length of the substrate with an additional 1.236 g/L (35 gft$^{-3}$) quantity of Pt and Pd at a weight ratio of 1:1 so that the composite oxidation catalyst as a whole had a total platinum group metal loading of 0.706 g/L (20 gft$^{-3}$); and the total platinum group metal loading in all samples in the second washcoat layer in this Example 8 was 0.265 g/L (7.5 gft$^{-3}$). The total Pt:Pd weight ratio in the composite oxidation catalyst of 1.9:1

Tests were conducted in the same way as is described in Example 7 hereinabove, except in that the ageing of the catalyst was different. In this Example 8, the fresh "conditioned" catalyst was oven-aged in air at 650° C. for 50 hours.

TABLE 8

| Sample | Refractory metal oxide support material | Fresh NO$_2$/NOx at 300° C. (%) | Aged (650° C./50 hrs) NO$_2$/NOx at 300° C. (%) | Fresh-to-aged NO$_2$/NOx "delta" (%) |
|---|---|---|---|---|
| 8.1 | 5 wt. % silica-doped alumina | 60.2 | 41.4 | 18.8 |
| 8.2 | "Pre-formed" 3.2 wt % manganese-/5 wt % silica-doped alumina | 52.1 | 32.8 | 19.3 |
| 8.3 | Mixed magnesium aluminium metal oxide containing 3.5 wt. % Mg† | 56.9 | 39.2 | 17.7 |
| 8.4 | "Pre-formed" 0.64 wt % manganese*[1]-doped mixed magnesium aluminium metal oxide containing 3.5 wt. % Mg† | 51.9 | 37.8 | 14.0 |
| 8.5 | "Pre-formed" 1.9 wt % manganese*[2]-doped mixed magnesium aluminium metal oxide containing 3.5 wt. % Mg† | 51.3 | 36.4 | 14.9 |
| 8.6 | "Pre-formed" 3.2. wt % manganese*[3]-doped mixed magnesium aluminium metal oxide containing 3.5 wt. % Mg† | 47.1 | 34.7 | 12.4 |

†Equivalent to 5.7 wt. % MgO/94.3 wt % Al$_2$O$_3$. The material is predominantly a single cubic phase spinel as determined by X-Ray Diffraction (XRD). Some excess Al$_2$O$_3$ may be present.
*[1]Equivalent to 1.0 wt % MnO$_2$.
*[2]Equivalent to 3.0 wt % MnO$_2$.
*[3]Equivalent to 5.0 wt % MnO$_2$.

Additionally, the composite oxidation catalysts of this Example 8 were tested according to the "continuous exotherm" test described in Example 5, but without ZDTP aging. The results are set out in the following Table 9.

TABLE 9

| Sample | 650° C./50 hour-aged catalyst inlet temperature at <500° C. exotherm fail (° C.) |
|---|---|
| 8.1 | 246.2 |
| 8.2 | 240.6 |
| 8.3 | 235.7 |
| 8.4 | 238.4 |
| 8.5 | 238.7 |
| 8.6 | 237.0 |

It can be seen from the results shown in Tables 8 and 9 that Samples 8.4, 8.5 and 8.6 including pre-formed manganese-doped mixed sub-stoichiometric magnesium aluminium metal oxides show a surprising and beneficial combination of lower fresh-to-aged NO oxidation activity and improved exotherm generation.

Example 9—First Catalyst Washcoat Zone Pt:Pd Weight Ratio Study

The current cost of palladium by weight is over twice the cost of platinum. In this Example 9, Applicant undertook a series of experiments to reduce the total quantity of palladium in the composite oxidation catalyst according to the invention.

A series of catalysts similar to those described in Example 8 and having the construction shown in FIG. 5 were prepared. The only differences with the Example 8 catalyst samples were that the composition of the impregnating solution for the first catalyst washcoat zone was varied sufficient to achieve a range of Pt:Pd weight ratios as set out in Table 10 below over 25% of the axial length of the substrate from an inlet substrate end at an additional total PGM loading of 1.236 g/L (35 gft$^{-3}$) and the composite oxidation catalyst as a whole had a total platinum group metal loading of 0.530 g/L (15 gft$^{-3}$); and the only platinum group metal in the second washcoat layer was platinum, i.e. a Pt:Pd weight ratio of 1:0 at a washcoat loading of 0.071 g/L (2.0 gft$^{-3}$).

Table 10 sets out the results for the "continuous exotherm" test for catalyst samples aged and tested as described in Example 8.

TABLE 10

| Sample | Pt:Pd weight ratio in first catalyst washcoat zone | Total composite oxidation catalyst Pt:Pd ratio | 650° C./50 hour-aged inlet temperature at <500° C. exotherm fail (° C.) |
|---|---|---|---|
| 9.1 | 1:1 | 1.45:1 | 258 |
| 9.2 | 2:1 | 2.21:1 | 256 |
| 9.3 | 3:1 | 2.8:1 | 260 |
| 9.4 | 4:1 | 3.28:1 | 262 |
| 9.5 | 1:0 | 7.55:1 | 280 |

It can be seen from the results shown in Table 10 that the weight ratio of platinum-to-palladium in the first catalyst washcoat zone can be increased without unduly affecting the ability of the composite oxidation catalyst to generate and sustain its exotherm. However, where the impregnation medium to obtain the first catalyst washcoat zone contains no palladium (Example 9.5), the exotherm fail is higher and so this arrangement is less preferred. Accordingly, it is preferred that the combined Pt:Pd weight ratio of the impregnation medium and underlying impregnated catalyst washcoat layer contains some palladium to stabilise the platinum, e.g. at 10:1≥1:1.

The invention claimed is:

1. A composite oxidation catalyst for use in an exhaust system for treating an exhaust gas produced by a vehicular compression ignition internal combustion engine and located upstream of a particulate matter filter in the exhaust system, the composite oxidation catalyst comprising:
a honeycomb flow-through substrate monolith having a total length L and a longitudinal axis and having a substrate surface extending axially between a first substrate end and a second substrate end;
two catalyst washcoat zones arranged axially in series on and along the substrate surface, wherein a first catalyst washcoat zone having a length $L_1$, wherein $L_1<L$, is defined at one end by the first substrate end and at a second end by a first end of a second catalyst washcoat zone having a length $L_2$, wherein $L_2<L$, wherein the second catalyst washcoat zone is defined at a second end thereof by the second substrate end, wherein the first catalyst washcoat zone comprises a first refractory metal oxide support material and two or more platinum group metal components supported thereon comprising both platinum and palladium at a weight ratio of platinum to palladium of $\geq 1$; and the second catalyst washcoat zone comprises a second refractory metal oxide support material and one or more platinum group metal components supported thereon; and
a washcoat overlayer extending axially from the first substrate end for protecting at least part of an underlying first catalyst washcoat zone from phosphorus and/or zinc poisoning when in use, which washcoat overlayer comprising a particulate metal oxide loading of $>0.8$ g/in$^3$, wherein the particulate metal oxide has a mean pore diameter of $\geq 10$ nm and/or the washcoat overlayer has a mean interparticle pore diameter of $>10$ nm,
wherein a total platinum group metal loading in the first catalyst washcoat zone defined in grams of platinum group metal per cubic foot of substrate volume (g/ft$^3$) is greater than a total platinum group metal loading in the second catalyst washcoat zone and wherein the first catalyst washcoat zone comprises a barium or strontium as a first alkaline-earth metal component supported on the first refractory metal oxide support material.

2. The composite oxidation catalyst according to claim 1, wherein a weight ratio of platinum to palladium in the first catalyst washcoat zone is less than or equal to 10:1 and greater than or equal to 1.5:1.

3. The composite oxidation catalyst according to claim 1, wherein a total platinum group metal loading in the first catalyst washcoat zone is $<100$ g/ft$^3$ calculated as elemental metal.

4. The composite oxidation catalyst according to claim 1, wherein the one or more platinum group metal component in the second catalyst washcoat zone comprises both platinum and palladium.

5. The composite oxidation catalyst according to claim 4, wherein a mass ratio of platinum to palladium in the second catalyst washcoat zone is greater than a mass ratio of platinum to palladium in the first catalyst washcoat zone.

6. The composite oxidation catalyst according to claim 1, wherein $L_1$ is $<50\%$ L.

7. The composite oxidation catalyst according to claim 1 comprising a total platinum group metal loading on the substrate as a whole of 5-60 g/ft$^3$ calculated as elemental metal.

8. The composite oxidation catalyst according to claim 1, wherein a total Pt: Pd weight ratio in the composite oxidation catalyst as a whole is 3:2 to 9:1.

9. The composite oxidation catalyst according to claim 1, wherein a total alkaline-earth metal loading in the first catalyst washcoat zone is 10-100 g/ft$^3$ calculated as elemental metal.

10. The composite oxidation catalyst according to claim 1, wherein a weight ratio of total elemental alkaline-earth metal to total elemental platinum group metal in the first catalyst washcoat zone is $<1:1$.

11. The composite oxidation catalyst according to claim 1, wherein at least the first refractory metal oxide support material comprises alumina doped with a heteroatom.

12. The composite oxidation catalyst according to claim 11, wherein at least the first refractory metal oxide support material comprises alumina doped with silica.

13. The composite oxidation catalyst according to claim 1, wherein the particulate metal oxide in the washcoat overlayer is selected from the group consisting of alumina, silica, titania, zirconia, ceria and a mixed or composite oxide of any two or more thereof or an aluminosilicate zeolite.

14. The composite oxidation catalyst according to claim 1, wherein the particulate metal oxide in the washcoat overlayer has a specific surface area of $>100$ m$^2$/g.

15. The composite oxidation catalyst according to claim 1, wherein the particulate metal oxide in the washcoat overlayer supports a platinum group metal, which is platinum or a combination of platinum and palladium at a Pt: Pd weight ratio of $\geq 1:1$.

16. An exhaust system for a vehicular compression ignition engine comprising a composite oxidation catalyst according to claim 1 and a soot filter substrate disposed downstream from the oxidation catalyst, wherein the first substrate end of the composite oxidation catalyst is oriented to an upstream side.

17. A compression ignition internal combustion engine for a heavy-duty diesel vehicle comprising an exhaust system according to claim 16, wherein the first substrate end of the composite oxidation catalyst is oriented to an upstream side.

18. A heavy-duty diesel vehicle comprising a compression ignition internal combustion engine according to claim 17.

19. A method of using a composite oxidation catalyst according to claim 1 for heating a soot filter disposed downstream from the composite oxidation catalyst in an exhaust system of a vehicular compression ignition internal combustion engine by generating an exotherm from an increased concentration of hydrocarbon fuel in exhaust gas flowing in the exhaust system relative to normal operating conditions by contacting the oxidation catalyst with exhaust gas comprising the increased concentration of hydrocarbon fuel.

20. A method of making a composite oxidation catalyst for use in an exhaust system for treating an exhaust gas produced by a vehicular compression ignition internal combustion engine, wherein the composite oxidation catalyst comprises:
a honeycomb flow-through substrate monolith having a total length L and a longitudinal axis and having a substrate surface extending axially between a first substrate end and a second substrate end;
two catalyst washcoat zones arranged axially in series on and along the substrate surface, wherein a first catalyst washcoat zone having a length $L_1$, wherein $L_1<L$, is defined at one end by the first, substrate end and at a second end by a first end of a second catalyst washcoat zone having a length $L_2$, wherein $L_2<L$, wherein the second catalyst washcoat zone is defined at a second end thereof by the second substrate end, wherein the first catalyst washcoat zone comprises a first refractory metal oxide support material and two or more platinum group metal component supported thereon comprising both platinum and palladium at a weight ratio of platinum to palladium of ≥1; and the second catalyst washcoat zone comprises a second refractory metal oxide support material and one or more platinum group metal component supported thereon, and a washcoat overlayer extending axially from the first substrate end for protecting at least part of an underlying first catalyst washcoat zone from phosphorus and/or zinc poisoning when in use, which washcoat overlayer comprising a particulate metal oxide loading of >0.8 g/in$^3$, wherein the particulate metal oxide has a mean pore diameter of ≥10 nm and/or the washcoat overlayer has a mean interparticle pore diameter of ≥10 nm, wherein a total platinum group metal loading in the first catalyst washcoat zone defined in grams of platinum group metal per cubic foot of substrate volume (g/ft$^3$) is greater than a total platinum group metal loading in the second catalyst washcoat zone and wherein the first catalyst washcoat zone comprises a barium or strontium as a first alkaline-earth metal component supported on the first refractory metal oxide support material, which method comprising the steps of:

(a) applying a catalyst washcoat layer to the substrate surface for a length extending from one end of the substrate to less than the total length of the substrate, which catalyst washcoat layer comprising a refractory metal oxide support material and one or more platinum group metal components; and (b) impregnating the catalyst washcoat layer in a zone of length Li defined at one end by the first substrate end with a solution containing one or more platinum group metal, which method further comprising a step (a') before step (a) or after step (a) but in either case before step (b) of applying a second catalyst washcoat layer to the substrate for a length extending from the second substrate end to less than the total length of the substrate, such that the first catalyst washcoat layer in part overlaps the second catalyst washcoat layer or the second catalyst washcoat layer in part overlaps the first catalyst washcoat layer, wherein the second catalyst washcoat layer comprises a refractory metal oxide support material and one or more platinum group metal components, wherein the barium or strontium alkaline-earth metal component is present in the catalyst washcoat layer of step (a) and/or an impregnation solution used in step (b).

* * * * *